(12) United States Patent
Bickford

(10) Patent No.: US 6,917,839 B2
(45) Date of Patent: Jul. 12, 2005

(54) SURVEILLANCE SYSTEM AND METHOD HAVING AN OPERATING MODE PARTITIONED FAULT CLASSIFICATION MODEL

(75) Inventor: Randall L. Bickford, Orangevale, CA (US)

(73) Assignee: Intellectual Assets LLC, Lake Tahoe, NV (US)

( * ) Notice: Subject to any disclaimer, the term of this patent is extended or adjusted under 35 U.S.C. 154(b) by 185 days.

(21) Appl. No.: 10/600,721

(22) Filed: Jun. 20, 2003

(65) Prior Publication Data

US 2004/0002776 A1 Jan. 1, 2004

Related U.S. Application Data

(63) Continuation-in-part of application No. 09/591,140, filed on Jun. 9, 2000, now Pat. No. 6,609,036.

(51) Int. Cl.[7] .............................................. G05B 13/02
(52) U.S. Cl. ........................... 700/30; 700/28; 700/31; 700/40; 700/46; 700/47; 700/48; 706/14; 706/15; 706/16; 701/2; 701/3; 701/11; 701/13; 702/179; 702/182; 702/183
(58) Field of Search .............................. 700/28, 29, 30, 700/31, 32, 40–49, 50–51; 701/1–4, 11, 14, 23; 706/14–17; 702/179, 182, 183

(56) References Cited

U.S. PATENT DOCUMENTS

| | | | |
|---|---|---|---|
| 4,295,128 A | 10/1981 | Hashemian et al. | |
| 4,478,783 A | 10/1984 | Broadwater | |
| 4,761,748 A | 8/1988 | Le Rat et al. | |
| 4,937,763 A | 6/1990 | Mott | |
| 4,975,968 A | 12/1990 | Yukl | |
| 5,009,833 A | 4/1991 | Takeuchi et al. | |
| 5,223,207 A | 6/1993 | Gross et al. | |
| 5,274,572 A | 12/1993 | O'Neil et al. | |
| 5,381,140 A | 1/1995 | Kuroda et al. | |
| 5,392,320 A | 2/1995 | Chao | |
| 5,402,521 A | 3/1995 | Niida et al. | |
| 5,410,492 A | 4/1995 | Gross et al. | |
| 5,459,675 A | 10/1995 | Gross et al. | |
| 5,465,321 A | 11/1995 | Smyth | |
| 5,506,794 A | 4/1996 | Lange | |
| 5,586,066 A | 12/1996 | White et al. | |
| 5,602,886 A | 2/1997 | Gross et al. | |
| 5,629,872 A | 5/1997 | Gross et al. | |
| 5,661,735 A | 8/1997 | Fischer | |
| 5,680,409 A | 10/1997 | Qin et al. | |
| 5,706,321 A | 1/1998 | Chen et al. | |
| 5,740,033 A | 4/1998 | Wassick et al. | |
| 5,745,382 A | 4/1998 | Vilim et al. | |
| 5,761,090 A | * 6/1998 | Gross et al. | ................... 714/26 |
| 5,764,509 A | 6/1998 | Gross et al. | |
| 5,774,379 A | 6/1998 | Gross et al. | |
| 5,774,569 A | 6/1998 | Waldenmaier | |
| 5,864,773 A | 1/1999 | Barna et al. | |
| 5,877,999 A | * 3/1999 | Holt et al. | ................... 367/131 |
| 5,950,147 A | 9/1999 | Sarangapani et al. | |

(Continued)

OTHER PUBLICATIONS

Bickford, R.L., Phase Partioning the Multivariate State Estimation Technique (MSET) Process for Improved Paramenter Estimation Performance and Processing Speed, New Technology Report, Jan. 13, 2000, Printed in USA by Expert Microsystems, Inc.

(Continued)

*Primary Examiner*—Ramesh Patel
(74) *Attorney, Agent, or Firm*—Dennis A. DeBoo

(57) ABSTRACT

A system and method which partitions a parameter estimation model, a fault detection model, and a fault classification model for a process surveillance scheme into two or more coordinated submodels together providing improved diagnostic decision making for at least one determined operating mode of an asset.

32 Claims, 36 Drawing Sheets

U.S. PATENT DOCUMENTS

| | | | |
|---|---|---|---|
| 5,987,399 A | | 11/1999 | Wegerich et al. |
| 5,991,525 A | * | 11/1999 | Shah et al. ..................... 703/2 |
| 6,016,465 A | * | 1/2000 | Kelly .......................... 702/116 |
| 6,073,262 A | | 6/2000 | Larkin et al. |
| 6,107,919 A | | 8/2000 | Wilks et al. |
| 6,119,111 A | | 9/2000 | Gross et al. |
| 6,131,076 A | | 10/2000 | Wegerich et al. |
| 6,181,975 B1 | | 1/2001 | Gross et al. |
| 6,202,038 B1 | * | 3/2001 | Wegerich et al. ........... 702/183 |
| 6,240,372 B1 | | 5/2001 | Gross et al. |
| 6,246,972 B1 | * | 6/2001 | Klimasauskas ................ 703/2 |
| 6,415,276 B1 | | 7/2002 | Heger et al. |
| 6,421,667 B1 | * | 7/2002 | Codd et al. ..................... 707/4 |
| 6,442,663 B1 | * | 8/2002 | Sun et al. .................... 711/202 |
| 6,466,858 B1 | | 10/2002 | Adibhatla et al. |
| 6,502,085 B1 | | 12/2002 | Adibhatla et al. |
| 6,532,412 B2 | | 3/2003 | Adibhatla et al. |
| 6,535,865 B1 | | 3/2003 | Skaaning et al. |
| 6,539,783 B1 | | 4/2003 | Adibhatla |
| 6,553,334 B2 | | 4/2003 | Gross et al. |
| 6,556,939 B1 | | 4/2003 | Wegerich |
| 6,839,655 B2 | * | 1/2005 | Gross et al. ................ 702/179 |
| 2001/0049590 A1 | | 12/2001 | Wegerich |
| 2002/0042692 A1 | | 4/2002 | Gross et al. |
| 2002/0055826 A1 | | 5/2002 | Wegerich et al. |
| 2002/0087290 A1 | | 7/2002 | Wegerich et al. |
| 2002/0091499 A1 | | 7/2002 | Wegerich et al. |
| 2002/0128731 A1 | | 9/2002 | Wegerich et al. |
| 2002/0133320 A1 | | 9/2002 | Wegerich et al. |
| 2002/0152056 A1 | | 10/2002 | Herzog et al. |
| 2002/0183971 A1 | | 12/2002 | Wegerich et al. |
| 2002/0188423 A1 | | 12/2002 | Gross et al. |
| 2002/0193933 A1 | | 12/2002 | Adibhatla et al. |
| 2003/0028349 A1 | | 2/2003 | Gross et al. |
| 2003/0055607 A1 | | 3/2003 | Wegerich et al. |

OTHER PUBLICATIONS

Herzog, J.P., System Classification Using A Learning Vector Quantization (LVQ) Neural Network New Technology Report, Jan. 13, 2000, Printed in USA by Argonne National Laboratory.

Herzog, J.P., et al, MSET Modeling of Crystal River–3 Venturi Flow Meters, 6th International Conference on Nuclear Engineering, 1998, Printed in USA by ASME.

Herzog, J.P., et al. Dynamics Sensor Validation For Reusable Launch Vehicle Propulsion, 34th AIAA/ASME/SAE/ASEE Joint Propulsion Conference, 1998, Printed in USA by Argonne National Laboratory & Expert Microsystems.

Gross, K.C., et al, Application of a Model–based Fault Detection System to Nuclear Plant Signals, International Conference on Intellegent System Application To Power Systems, Jul. 1997,Printed in USA by Argonne National Laboratory & Florida Power Corporation.

Singer, R.M., et al, Model–Based Nuclear Power Plant Monitoring And Fault Detection: Theoretical Foundations, International Conference On Intelligent Systems, Jul. 1997, Printed in USA by Argonne National Laboratory.

Hylko, J.M., New AI Technique Detects Instruments, Power, Nov. 1998, Printed in USA by Power.

Deyst, J.J., Sensor Validation: Method To Enhance The Quality Of The Man/Machine Interface in Nuclear Power Stations, IEEE Transactions On Nuclear Science, Feb. 1981, Printed in USA by IEEE Transactions On Nuclear Science.

Gross, K.C., et al, Sequential Probability Ratio Test For Nuclear Plant Component Surveillance, Nuclear Technology, 1990, Printed in USA by Argonne National Laboratory.

Racz, A., Comments On The Sequential Probability Ratio Testing Methods, Ann. Nuclear Energy, 1995, Printed in USA by KFKI–Atomic Energy Research Institute Applied Reactor Physics Laboratory.

Kulacsy, K., Further Comments On The Sequential Probability Ratio Testing Methods, Annals Of Nuclear Energy, 1996, Printed in USA by KFKI Atomic Energy Research Institute.

Bickford, R.L., et al, Real–Time Space Shuttle Main Engine Sensor. Validation, National Aeronautics and Space Administration, Aug. 1995, Printed in USA by ExperTech & Intelligent Software Associates, Inc.

Bickford, R.L., et al, Real–Time Flight Data Validation For Rocket Engines, AIAA, 1996, Printed in USA by ExperTech & NYMA, Inc.

Bickford, R.L., et al, Real–Time Sensor Validation for Autonomous Flight Control, AIAA, Jul. 1997, Printed in USA by Expert Microsystems, Inc. & Intelligent Software Associates, Inc. & Beoing Defense and Space Group.

Bickford, R.L., et al, Real–Time Sensor Validation For Propulsion Systems, American Institute of Aeronautics and Astronautics, 1998, printed in USA by Expert Microsystems, Inc & Dynacs Engineering Co.

Bickford, R.L., et al, Real–Time Sensor Data Validation For Space Shuttle Main Engine Telemetry Monitoring, AIAA, Jun. 1999, Printed in USA by Expert Microsystems, Inc.& Intelligent Software Associates, Inc. & Dynacs Engineering Company & NASA Glenn Research Center.

Mott, J.E., et al, EBR–II System Surveillance Using Pattern Recognition Software, ANS/ENS Mtg. on Operability of Nuclear Power Systems, Sep. 1986, Printed in USA by Saratoga Engineering Consultants and Argonne National Laboratory.

Mott, J.E., et al, A Generalized System State Analyzer for Plant Surveillance, ANS/ENS Mtg. on Artificial Intelligence Applications in the Nuclear Industry, Aug. 1987 Printed in USA by El International, Inc. and Argonne National Laboratory.

Mott, J.E., et al, Pattern–Recognition Software for Plant Surveillance, ANS Transactions, 1987, Printed in USA by the American Nuclear Society.

Mott, J.E., et al, Pattern–Recognition Software for Plant Surveillance, ANS Intl. Mtg. on Nuclear Power Plant Operation, Aug. 1987, Printed in USA by El International, Inc. and Argonne National Laboratory.

Mott, J.E., et al, Pattern–Recognition Software Detecting the Onset of Failures In Complex Systems, 42nd Mtg. of Mech. Failures Prevention Group, Sep. 1987, Printed in USA by El International, Inc. and Argonne National Laboratory.

King, R.W., et al, Pattern–Recognition System Application to EBR–II Plant–Life Extension, ANS Mtg. on Nuclear Power Plant Life Extention, Jul. 1988, Printed in USA by Argonne National Laboratory and El International, Inc.

Singer, R.M., et al, Use of a Pattern Recognition Scheme to Compensate for Critical Sensor Failures, 1st Intl. Machinery Monitoring and Diagnostic Conf., Sep. 1989, Printed in USA by Argonne National Laboratory.

Mott, J.E., et al, A Universal, Fault Tolerant, Non–Linear Analytic Network for Modeling and Fault Detection, 8th Power Plant Dynamics, Control & Testing Symposium, May 1992, Printed in USA by Advanced Modeling Techniques Corporation and Argonne National Laboratory.

Mott, J.E., et al, Feedwater Flow Estimation via Sample-Based Modeling, 8th Power Plant Dynamics, Control & Testing Symposium, May 1992, Printed in USA by Advanced Modeling Techniques Corporation and Northeast Utilities.

Harris, T.J., et al, Empirical Models for Intelligent Data Validation, 35th POWID Symposium, Jun. 1992, Printed in USA by Halliburton NUS and Entergy Operations, Inc.

Huang, C., et al, Inference in Belief Networks: A Procedural Guide, Intl. Journal of Approximate Reasoning, 11:1–45, 1994, Printed in USA by Elsevier Science, Inc.

Singer, R.M., et al, A Pattern–recognition–based, Fault–tolerant Monitoring and Diagnostic Technique, 7th Symp. on Nuclear.Reactor Surveillance, Jun. 1995, Printed in USA by Argonne National Laboratory.

Singer, R.M., et al, Power Plant Surveillance and Fault Detection: Applications to a Commercial PWR, Intl. Atomic Energy Commission, IAEA–TECDOC–1054, pp. 185–200, Sep. 1997, Printed in USA by Argonne National Laboratory.

Miron, A., et al, The Effects of Parameter Variation on MSET Models of the Crystal River–3 Feedwater Flow System, ANS Annual Meeting, Jun. 1998, Printed in USA by Argonne National Laboratory.

Bickford, R.L., et al, Sensor Validation Tools and SSME Network, Final Report, Apr. 2000, Printed in USA by Expert Microsystems, Inc.

Zavaljevski, N., et al, Support Vector Machines for Nuclear Reactor State Estimation, ANS Topical Mtg. on Advances in Reactor Physics, May 2000, Printed in USA by Argonne National Laboratory.

Zavaljevski, N., et al, Sensor Fault Detection in Nuclear Power Plants Using Multivariate State Estimation Technique and Support Vector Machines, 3rd Intl. Conf. of Yugoslav Nuclear Society, Oct. 2000, Printed in USA by Argonne National Laboratory.

Wegerich, S., et al, Challenges Facing Equipment Condition Monitoring Systems, MARCOM 2001, May 2001, Printed in USA by SmartSignal Corporation.

Bickford, R.L., et al, Online Signal Validation for Assured Data Integrity, 47th International Instrumentation Symposium, May 2001, Printed in USA by Expert Microsystems, Inc., and NASA Glenn Research Center.

Davis, E., et al, On–Line Monitoring at Nuclear Power Plants—Results from the EPRI On–Line Monitoring Implementation Project, 45th ISA POWID Symposium, Jun. 2002, Printed in USA by Edan Engineering Corporation, Expert Microsystems, Inc., and Electric Power Research Institute.

Bickford, R.L., et al, Development of an Online Predictive Monitoring System for Power Generating Plants, 45th ISA POWID Symposium, Jun. 2002, Printed in USA by Edan Engineering Corporation, Expert Microsystems, Inc., and Electric Power Research Institute.

Bickford, R.L., et al, Development of A Real–Time Turbine Engine Diagnostic System, AIAA Joint Propulsion Conference, Jul. 2002, Printed in USA by Expert Microsystems, Inc., and Arnold Engineering Development Center.

Gross, K.C., et al, Proactive Detection of Software Aging Mechanisms in Performance–Critical Computers, IEEE/NASA Software Engineering Symposium, Dec. 2002, Printed in USA by Sun Microsystems.

Hussey, A., et al, Automated Equipment Condition Monitoring, 13th ISA/EPRI Controls and Instrumentation Conf., Jun. 2003, Printed in USA by Electric Power Research Institute.

Davis, E., et al, DOE–EPRI On–Line Monitoring Implementation Guidelines, Interim Technical Report, Jan. 2003, Printed in USA by Electric Power Research Institute.

Hansen, E.J., et al, Similarity Based Regression: Applied Advanced Pattern Recognition for Power Plant Analysis, 1994 EPRI Heat Rate improvement Conference. Printed in USA by Performance Consulting Services, Inc.

Griebenow, R.D., et al, Applied Pattern Recognition for Plant Monitoring and Data Validation, 5th International POWID Controls and Instrumentation Conference, Jun. 1995. Printed in USA by Performance Consulting Services, Inc.

* cited by examiner

| LVQ Neural Network Parameter | Design Value |
|---|---|
| Input Signals | MCC_PC_AVG<br>(PC_CNTL_REF − MCC_PC_AVG)<br>($\Delta$PC_CNTL_REF / $\Delta$TIME) |
| Number of Classes | 9 (one for each operating mode defined in Figure 21) |
| Number of Output Nodes per Class ($N_{class}$) | 8 (for each operating mode) |
| Learning Algorithm | LVQ2.1 |
| Maximum Number of Epochs ($n_{eps}$) | 250 |
| Initial Value of the Learning Rate ($\lambda_0$) | 0.02 |
| Window Size ($\varepsilon$) | 0.5 |
| Number of Training Vector Pairs ($n_{LVQ}$) | 500 |

Figure 17

| SSME Signal Parameter ID | SSME Signal Parameter Name |
|---|---|
| PID40 | OPOV_ACT_POS_A |
| PID42 | FPOV_ACT_POS_A |
| PID52 | HPFP_DS_P_A |
| PID58 | FPB_PC_A |
| PID63 | MCC_PC_AVG |
| PID90 | HPOP_DS_P |
| PID100 | FUEL_FLOW_AVG |
| PID105 | HPFT_DS_T_A2 |
| PID106 | HPFT_DS_T_A3 |
| PID107 | HPFT_DS_T_B2 |
| PID108 | HPFT_DS_T_B3 |
| PID200 | MCC_PC_A_AVG |
| PID201 | MCC_PC_B_AVG |
| PID205 | HPOT_DS_T_A2 |
| PID206 | HPOT_DS_T_A3 |
| PID207 | HPOT_DS_T_B2 |
| PID208 | HPOT_DS_T_B3 |

Figure 18

| Space Shuttle Flight ID | Engine Position |
|---|---|
| STS077 | E2 |
| STS078 | E1 |
| STS081 | E3 |
| STS082 | E1 |
| STS085 | E1 |
| STS085 | E2 |
| STS086 | E2 |
| STS087 | E2 |
| STS087 | E3 |
| STS090 | E1 |

Figure 19

| Model Description | Number of Signals | Modeled Operating Modes | Number of Process Mem Vectors | Parameter Estimation Method | Fault Detection Method |
|---|---|---|---|---|---|
| LVQ mode-partitioned (Model PD) | 17 (defined in Figure 18) | Start01<br>Start12<br>Start24<br>SteadyFull<br>SteadyLow<br>Upthrust<br>Downthrust | 150<br>150<br>150<br>150<br>150<br>150<br>150 | MSET | SPRT mean pos & neg |
| All-modes (Model A150) | 17 (same) | All | 150 | MSET | SPRT mean pos & neg |
| All-modes (Model A300) | 17 (same) | All | 300 | MSET | SPRT mean pos & neg |

Figure 20

| Mode Name | Operating Mode Criteria |
|---|---|
| PREFIRE | All observations preceding the vehicle start command to the engine. Considered a non-operating mode. |
| START01 | Controller cycles 0 through 24 after receipt of the engine start command. |
| START12 | Controller cycles 25 through 49 after receipt of the engine start command. |
| START24 | Controller cycle 50 through detection of steady-state operation (typically at controller cycle ~110). The rule for transition to STEADY_FULL is: If in START24 and if $\|PC\_CNTL\_REF - MCC\_PC\_AVG\| <= (5 * 3.35)$, and $PC\_CNTL\_REF >= 2500$ transition to STEADY_FULL |
| STEADY_FULL | STEADY_FULL is declared when either: 1) the last cycle's state was STEADY_FULL and the commanded PC is both unchanged and greater than 2500 psi, e.g., $\| PC\_CNTL\_REF - LAST\_PC\_CNTL\_REF \| < 3.35$ and $PC\_CNTL\_REF >= 2500$; or 2) when the last cycle's state was a transient state and $\| PC\_CNTL\_REF - MCC\_PC\_AVG \| <= (5 * 3.35)$ and $PC\_CNTL\_REF >= 2500$. |
| STEADY_LOW | STEADY_LOW is declared when either: 1) the last cycle's state was STEADY_LOW and the commanded PC is both unchanged and less than 2500 psi, e.g., $\| PC\_CNTL\_REF - LAST\_PC\_CNTL\_REF \| < 3.35$ and $PC\_CNTL\_REF < 2500$; or 2) when the last cycle's state was a transient state and $\| PC\_CNTL\_REF - MCC\_PC\_AVG \| <= (5 * 3.35)$ and $PC\_CNTL\_REF < 2500$. |
| UPTHRUST | UPTHRUST is declared when 1) the commanded PC has increased since the last cycle, and 2) $\| PC\_CNTL\_REF - MCC\_PC\_AVG \| > (5 * 3.35)$ |
| DOWNTHRUST | DOWNTHRUST is declared when 1) the commanded PC has decreased since the last cycle, and 2) $\| PC\_CNTL\_REF - MCC\_PC\_AVG \| > (5 * 3.35)$ |
| SHUTDOWN | All observations following the vehicle shutdown command to the engine. Considered a non-operating mode. |

Figure 21

| Test No. | Test Description | Sensor Failures | One Cycle Alarms | Total Avg Error % | Avg Cycle Time |
|---|---|---|---|---|---|
| PD-01 | STS077E1. Nominal flight data. | 0 | 2 | 0.408% | 4.88 msec |
| PD-02 | STS077E2. Nominal flight data. | 0 | 0 | 0.217% | 4.90 msec |
| PD-03 | STS078E1. Nominal flight data. | 0 | 0 | 0.352% | 4.98 msec |
| PD-04 | STS078E2. Nominal flight data. | 0 | 1 | 0.296% | 4.94 msec |
| PD-05 | STS081E1. Nominal flight data. | 0 | 2 | 0.400% | 5.01 msec |
| PD-06 | STS081E3. Nominal flight data. | 0 | 0 | 0.281% | 5.07 msec |
| PD-07 | STS082E2. Nominal flight data. | 0 | 1 | 0.286% | 4.96 msec |
| PD-08 | STS085E3. Nominal flight data. | 0 | 0 | 0.282% | 4.98 msec |
| PD-09 | STS086E2. Nominal flight data. | 0 | 0 | 0.254% | 5.02 msec |
| PD-10 | STS087E2. Nominal flight data. | 0 | 0 | 0.246% | 5.02 msec |
| | *Average for All Tests* | *0* | *1* | *0.302%* | *4.98 msec* |

Figure 22

| T..t No. | T.st D.scription | S..nsor Failures | On Cycle Alarms | Tim to Detect | Error at Detect |
|---|---|---|---|---|---|
| PD-11 | Drift PID40. 0.14 pct/sec beginning at 10.0 sec. | 1 (PID40) | 5 | 28.88 sec | 5.8% |
| PD-12 | Noise PID40. ±5 pct random beginning at 10.0 sec. | 1 (PID40) | 38 | 10.76 sec | N/A |
| PD-13 | Drift PID42. 0.16 pct/sec beginning at 10.0 sec. | 1 (PID42) | 9 | 29.32 sec | 5.9% |
| PD-14 | Noise PID42. ±5 pct random beginning at 10.0 sec. | 1 (PID42) | 66 | 42.04 sec | N/A |
| PD-15 | Drift PID52. 11.9 psi/sec beginning at 10.0 sec. | 1 (PID52) | 4 | 12.24 sec | 2.4% |
| PD-16 | Drift PID58. 10.2 psi/sec beginning at 10.0 sec. | 1 (PID58) | 5 | 9.44 sec | 1.9% |
| PD-17 | Drift PID90. 8.2 psi/sec beginning at 10.0 sec. | 1 (PID90) | 9 | 8.12 sec | 1.6% |
| PD-18 | Drift PID100. 31.9 gpm/sec beginning at 10.0 sec. | 1 (PID100) | 5 | 12.12 sec | 2.4% |
| PD-19 | Drift PID105. 3.4 degR/sec beginning at 10.0 sec. | 1 (PID105) | 11 | 16.16 sec | 3.2% |
| PD-20 | Drift PID200. 6.3 psi/sec beginning at 10.0 sec. | 1 (PID200) | 4 | 3.40 sec | 0.7% |
| PD-21 | Drift PID205. 2.7 degR/sec beginning at 10.0 sec. | 1 (PID205) | 4 | 18.28 sec | 3.7% |
| | Average for All Drift Tests | | | 15.3 sec | 3.1% |

Figure 23

| Test No. | Test Description | Sensor Failures | One Cycl Alarms | Total Avg Error % | Avg Cycle Time |
|---|---|---|---|---|---|
| A150-01 | STS077E1. Nominal flight data. | 0 | 0 | 0.556% | 5.27 msec |
| A150-02 | STS077E2. Nominal flight data. | 0 | 9 | 0.458% | 5.28 msec |
| A150-03 | STS078E1. Nominal flight data. | 0 | 0 | 0.593% | 4.90 msec |
| A150-04 | STS078E2. Nominal flight data. | 0 | 0 | 0.396% | 5.28 msec |
| A150-05 | STS081E1. Nominal flight data. | 0 | 0 | 0.685% | 4.67 msec |
| A150-06 | STS081E3. Nominal flight data. | 0 | 0 | 0.480% | 4.77 msec |
| A150-07 | STS082E2. Nominal flight data. | 1 (PID58) False Alarm | 13 | 0.720% | 5.28 msec |
| A150-08 | STS085E3. Nominal flight data. | 0 | 0 | 0.519% | 4.73 msec |
| A150-09 | STS086E2. Nominal flight data. | 0 | 0 | 0.410% | 4.77 msec |
| A150-10 | STS087E2. Nominal flight data. | 0 | 0 | 0.399% | 5.22 msec |
| | *Average for All Tests* | *0* | *2* | *0.522%* | *5.02 msec* |

Figure 24. Comparative Results

| Test No. | Test Description | Sensor Failures | One Cycl Alarms | Time to Detect | Error at Detect |
|---|---|---|---|---|---|
| A150-11 | Drift PID40. 0.14 pct/sec beginning at 10.0 sec. | 1 (PID40) | 19 | 125.68 sec | 25.1% |
| A150-12 | Noise PID40. ±5 pct random beginning at 10.0 sec. | 1 (PID40) | 12 | 95.04 sec | N/A |
| A150-13 | Drift PID42. 0.16 pct/sec beginning at 10.0 sec. | 1 (PID42) | 12 | 154.92 sec | 31.0% |
| A150-14 | Noise PID42. ±5 pct random beginning at 10.0 sec. | 0 (Missed Alarm) | 0 | Missed Alarm | N/A |
| A150-15 | Drift PID52. 11.9 psi/sec beginning at 10.0 sec. | 1 (PID52) | 4 | 27.40 sec | 5.5% |
| A150-16 | Drift PID58. 10.2 psi/sec beginning at 10.0 sec. | 1 (PID58) | 6 | 18.92 sec | 3.8% |
| A150-17 | Drift PID90. 8.2 psi/sec beginning at 10.0 sec. | 1 (PID90) | 4 | 60.32 sec | 12.1% |
| A150-18 | Drift PID100. 31.9 gpm/sec beginning at 10.0 sec. | 2 (PID100) & (PID58 False Alarm) | 23 | 43.24 sec | 8.6% |
| A150-19 | Drift PID105. 3.4 degR/sec beginning at 10.0 sec. | 1 (PID105) | 10 | 46.20 sec | 9.2% |
| A150-20 | Drift PID200. 6.3 psi/sec beginning at 10.0 sec. | 1 (PID200) | 4 | 22.72 sec | 4.5% |
| A150-21 | Drift PID205. 2.7 degR/sec beginning at 10.0 sec. | 1 (PID205) | 8 | 89.04 sec | 17.8% |
| | *Average for All Drift Tests* | | | *65.4 sec* | *13.1%* |

Figure 25. Comparative Results

| Test No. | Test Description | Sensor Failures | One Cycle Alarms | Total Avg Error % | Avg Cycle Time |
|---|---|---|---|---|---|
| A300-01 | STS077E1. Nominal flight data. | 0 | 0 | 0.488% | 17.84 msec |
| A300-02 | STS077E2. Nominal flight data. | 0 | 0 | 0.379% | 17.75 msec |
| A300-03 | STS078E1. Nominal flight data. | 0 | 0 | 0.424% | 19.40 msec |
| A300-04 | STS078E2. Nominal flight data. | 0 | 0 | 0.359% | 19.02 msec |
| A300-05 | STS081E1. Nominal flight data. | 0 | 0 | 0.633% | 17.69 msec |
| A300-06 | STS081E3. Nominal flight data. | 0 | 0 | 0.501% | 17.80 msec |
| A300-07 | STS082E2. Nominal flight data. | 0 | 0 | 0.620% | 19.01 msec |
| A300-08 | STS085E3. Nominal flight data. | 0 | 2 | 0.521% | 17.73 msec |
| A300-09 | STS086E2. Nominal flight data. | 0 | 1 | 0.340% | 17.78 msec |
| A300-10 | STS087E2. Nominal flight data. | 0 | 0 | 0.319% | 18.10 msec |
| | Average for All Tests | 0 | 0 | 0.458% | 18.21 msec |

Figure 26. Comparative Results

| Test No. | Test Description | Sensor Failures | One Cycle Alarms[1] | Time to Detect | Error at Detect |
|---|---|---|---|---|---|
| A300-11 | Drift PID40. 0.14 pct/sec beginning at 10.0 sec. | 1 (PID40) | 39 | 138.80 sec | 27.8% |
| A300-12 | Noise PID40. ±5 pct random beginning at 10.0 sec. | 0 (Missed Alarm) | 2 | Missed Alarm | N/A |
| A300-13 | Drift PID42. 0.16 pct/sec beginning at 10.0 sec. | 1 (PID42) | 26 | 139.08 sec | 27.8% |
| A300-14 | Noise PID42. ±5 pct random beginning at 10.0 sec. | 0 (Missed Alarm) | 2 | Missed Alarm | N/A |
| A300-15 | Drift PID52. 11.9 psi/sec beginning at 10.0 sec. | 1 (PID52) | 9 | 26.04 sec | 5.2% |
| A300-16 | Drift PID58. 10.2 psi/sec beginning at 10.0 sec. | 1 (PID58) | 8 | 16.92 sec | 3.4% |
| A300-17 | Drift PID90. 8.2 psi/sec beginning at 10.0 sec. | 1 (PID90) | 6 | 58.12 sec | 11.6% |
| A300-18 | Drift PID100. 31.9 gpm/sec beginning at 10.0 sec. | 1 (PID100) | 9 | 23.36 sec | 4.7% |
| A300-19 | Drift PID105. 3.4 degR/sec beginning at 10.0 sec. | 1 (PID105) | 6 | 28.32 sec | 5.7% |
| A300-20 | Drift PID200. 6.3 psi/sec beginning at 10.0 sec. | 1 (PID200) | 6 | 18.52 sec | 3.7% |
| A300-21 | Drift PID205. 2.7 degR/sec beginning at 10.0 sec. | 1 (PID205) | 12 | 64.32 sec | 12.9% |
| | *Average for All Drift Tests* | | | *57.1 sec* | *11.4%* |

Figure 27. Comparative Results

| Node Name | States | Parents | Prior Probabilities | Threshold |
|---|---|---|---|---|
| Sensor1 | good<br>bad | none | P(good)=0.95, P(bad)=0.05 | 0.6 |
| HR1 element | good<br>bad | none | P(good)=0.9, P(bad)=0.1 | 0.6 |
| LR1 element | good<br>bad | none | P(good)=0.9, P(bad)=0.1 | 0.6 |
| T1 element | good<br>bad | none | P(good)=0.9, P(bad)=0.1 | 0.6 |
| HR1 alarm | normal<br>abnormal | HR1 element<br>Sensor1 | P(normal \| HR1 element=good, Sensor1=good)=0.95<br>P(abnormal \| HR1 element=good, Sensor1=good)=0.05<br>P(normal \| HR1 element=good, Sensor1=bad)=0.05<br>P(abnormal \| HR1 element=good, Sensor1=bad)=0.95<br>P(normal \| HR1 element=bad, Sensor1=good)=0.05<br>P(abnormal \| HR1 element=bad, Sensor1=good)=0.95<br>P(normal \| HR1 element=bad, Sensor1=bad)=0.01<br>P(abnormal \| HR1 element=bad, Sensor1=bad)=0.99 | 0.9 |
| LR1 alarm | normal<br>abnormal | LR1 element<br>Sensor1 | P(normal \| LR1 element=good, Sensor1=good)=0.95<br>P(abnormal \| LR1 element=good, Sensor1=good)=0.05<br>P(normal \| LR1 element=good, Sensor1=bad)=0.05<br>P(abnormal \| LR1 element=good, Sensor1=bad)=0.95<br>P(normal \| LR1 element=bad, Sensor1=good)=0.05<br>P(abnormal \| LR1 element=bad, Sensor1=good)=0.95<br>P(normal \| LR1 element=bad, Sensor1=bad)=0.01<br>P(abnormal \| LR1 element=bad, Sensor1=bad)=0.99 | 0.9 |
| T1 alarm | normal<br>abnormal | T1 element<br>Sensor1 | P(normal \| T1 element=good, Sensor1=good)=0.95<br>P(abnormal \| T1 element=good, Sensor1=good)=0.05<br>P(normal \| T1 element=good, Sensor1=bad)=0.05<br>P(abnormal \| T1 element=good, Sensor1=bad)=0.95<br>P(normal \| T1 element=bad, Sensor1=good)=0.05<br>P(abnormal \| T1 element=bad, Sensor1=good)=0.95<br>P(normal \| T1 element=bad, Sensor1=bad)=0.01<br>P(abnormal \| T1 element=bad, Sensor1=bad)=0.99 | 0.9 |

Figure 31

| Node Name | States | Parents | Prior Probabilities | Threshold |
|---|---|---|---|---|
| Sensor2 | good<br>bad | none | P(good)=0.95, P(bad)=0.05 | 0.6 |
| HR2 element | good<br>bad | none | P(good)=0.9, P(bad)=0.1 | 0.6 |
| LR2 element | good<br>bad | none | P(good)=0.9, P(bad)=0.1 | 0.6 |
| T2 element | good<br>bad | none | P(good)=0.9, P(bad)=0.1 | 0.6 |
| HR2 alarm | normal<br>abnormal | HR2 element<br>Sensor2 | P(normal \| HR2 element=good, Sensor2=good)=0.95<br>P(abnormal \| HR2 element=good, Sensor2=good)=0.05<br>P(normal \| HR2 element=good, Sensor2=bad)=0.05<br>P(abnormal \| HR2 element=good, Sensor2=bad)=0.95<br>P(normal \| HR2 element=bad, Sensor2=good)=0.05<br>P(abnormal \| HR2 element=bad, Sensor2=good)=0.95<br>P(normal \| HR2 element=bad, Sensor2=bad)=0.01<br>P(abnormal \| HR2 element=bad, Sensor2=bad)=0.99 | 0.9 |
| LR2 alarm | normal<br>abnormal | LR2 element<br>Sensor2 | P(normal \| LR2 element=good, Sensor2=good)=0.95<br>P(abnormal \| LR2 element=good, Sensor2=good)=0.05<br>P(normal \| LR2 element=good, Sensor2=bad)=0.05<br>P(abnormal \| LR2 element=good, Sensor2=bad)=0.95<br>P(normal \| LR2 element=bad, Sensor2=good)=0.05<br>P(abnormal \| LR2 element=bad, Sensor2=good)=0.95<br>P(normal \| LR2 element=bad, Sensor2=bad)=0.01<br>P(abnormal \| LR2 element=bad, Sensor2=bad)=0.99 | 0.9 |
| T2 alarm | normal<br>abnormal | T2 element<br>Sensor2 | P(normal \| T2 element=good, Sensor2=good)=0.95<br>P(abnormal \| T2 element=good, Sensor2=good)=0.05<br>P(normal \| T2 element=good, Sensor2=bad)=0.05<br>P(abnormal \| T2 element=good, Sensor2=bad)=0.95<br>P(normal \| T2 element=bad, Sensor2=good)=0.05<br>P(abnormal \| T2 element=bad, Sensor2=good)=0.95<br>P(normal \| T2 element=bad, Sensor2=bad)=0.01<br>P(abnormal \| T2 element=bad, Sensor2=bad)=0.99 | 0.9 |

Figure 32

| Partitioned Model Under OPERATING Conditions |||
|---|---|---|
| Fault Simulated | Fault Classified | Fault Classification Probabilities |
| H1 Drift High | H1 Element Fault | P(H1 Element = ABNORMAL)= 0.6779<br>P(L1 Element = ABNORMAL)= 0.0058<br>P(T1 Element = ABNORMAL)= 0.0058<br>P(Sensor1= ABNORMAL)= 0.0010 |
| L1 Drift High | L1 Element Fault | P(L1 Element = ABNORMAL)= 0.6779<br>P(H1 Element = ABNORMAL)= 0.0058<br>P(T1 Element = ABNORMAL)= 0.0058<br>P(Sensor1= ABNORMAL)= 0.0010 |
| T1 Drift High | T1 Element Fault | P(T1 Element = ABNORMAL)= 0.6779<br>P(H1 Element = ABNORMAL)= 0.0058<br>P(L1 Element = ABNORMAL)= 0.0058<br>P(Sensor1= ABNORMAL)= 0.0010 |
| H1 & L1 Drift High | H1 Element Fault<br>L1 Element Fault | P(H1 Element = ABNORMAL)= 0.6121<br>P(L1 Element = ABNORMAL)= 0.6121<br>P(Sensor1= ABNORMAL)= 0.1156<br>P(T1 Element = ABNORMAL)= 0.0077 |
| H1, L1 & T1 Drift High | Sensor1 Fault | P(Sensor1= ABNORMAL)= 0.9433<br>P(H1 Element = ABNORMAL)= 0.1363<br>P(L1 Element = ABNORMAL)= 0.1363<br>P(T1 Element = ABNORMAL)= 0.1363 |

Figure 33

| Partitioned Model Under VENTING Conditions |||
|---|---|---|
| Fault Simulated | Fault Classified | Fault Classification Probabilities |
| H1 Drift High | H1 Element Fault | P(H1 Element = ABNORMAL)= 0.6779<br>P(L1 Element = ABNORMAL)= 0.0058<br>P(T1 Element = ABNORMAL)= 0.0058<br>P(Sensor1= ABNORMAL)= 0.0010 |
| L1 Drift High | L1 Element Fault | P(L1 Element = ABNORMAL)= 0.6779<br>P(H1 Element = ABNORMAL)= 0.0058<br>P(T1 Element = ABNORMAL)= 0.0058<br>P(Sensor1= ABNORMAL)= 0.0010 |
| T1 Drift High | T1 Element Fault | P(T1 Element = ABNORMAL)= 0.6779<br>P(H1 Element = ABNORMAL)= 0.0058<br>P(L1 Element = ABNORMAL)= 0.0058<br>P(Sensor1= ABNORMAL)= 0.0010 |
| H1 & L1 Drift High | H1 Element Fault<br>L1 Element Fault | P(H1 Element = ABNORMAL)= 0.6121<br>P(L1 Element = ABNORMAL)= 0.6121<br>P(Sensor1= ABNORMAL)= 0.1156<br>P(T1 Element = ABNORMAL)= 0.0077 |
| H1, L1 & T1 Drift High | Sensor1 Fault | P(Sensor1= ABNORMAL)= 0.9433<br>P(H1 Element = ABNORMAL)= 0.1363<br>P(L1 Element = ABNORMAL)= 0.1363<br>P(T1 Element = ABNORMAL)= 0.1363 |

Figure 34

| Unpartitioned Model Under OPERATING Conditions | | |
|---|---|---|
| Fault Simulated | Fault Classified | Fault Classification Probabilities |
| H1 Drift High | H1 Element Fault | P(H1 Element = ABNORMAL)= 0.6779<br>P(L1 Element = ABNORMAL)= 0.0058<br>P(T1 Element = ABNORMAL)= 0.0058<br>P(Sensor1= ABNORMAL)= 0.0010 |
| L1 Drift High | L1 Element Fault | P(L1 Element = ABNORMAL)= 0.6779<br>P(H1 Element = ABNORMAL)= 0.0058<br>P(T1 Element = ABNORMAL)= 0.0058<br>P(Sensor1= ABNORMAL)= 0.0010 |
| T1 Drift High | T1 Element Fault | P(T1 Element = ABNORMAL)= 0.6779<br>P(H1 Element = ABNORMAL)= 0.0058<br>P(L1 Element = ABNORMAL)= 0.0058<br>P(Sensor1= ABNORMAL)= 0.0010 |
| H1 & L1 Drift High | H1 Element Fault<br>L1 Element Fault | P(H1 Element = ABNORMAL)= 0.6121<br>P(L1 Element = ABNORMAL)= 0.6121<br>P(Sensor1= ABNORMAL)= 0.1156<br>P(T1 Element = ABNORMAL)= 0.0077 |
| H1, L1 & T1 Drift High | Sensor1 Fault | P(Sensor1= ABNORMAL)= 0.9433<br>P(H1 Element = ABNORMAL)= 0.1363<br>P(L1 Element = ABNORMAL)= 0.1363<br>P(T1 Element = ABNORMAL)= 0.1363 |

Figure 35  Comparative Results

| Unpartitioned Model Under VENTING Conditions |||
|---|---|---|
| Fault Simulated | Fault Classified | Fault Classification Probabilities |
| H1 Drift High | H1 Element Fault | P(H1 Element = ABNORMAL)= 0.6779<br>P(L1 Element = ABNORMAL)= 0.0058<br>P(T1 Element = ABNORMAL)= 0.0058<br>P(Sensor1= ABNORMAL)= 0.0010 |
| L1 Drift High | *Not Detected* | P(L1 Element = ABNORMAL)= 0.1000<br>P(H1 Element = ABNORMAL)= 0.1000<br>P(T1 Element = ABNORMAL)= 0.1000<br>P(Sensor1= ABNORMAL)= 0.0500 |
| T1 Drift High | T1 Element Fault | P(T1 Element = ABNORMAL)= 0.6779<br>P(H1 Element = ABNORMAL)= 0.0058<br>P(L1 Element = ABNORMAL)= 0.0058<br>P(Sensor1= ABNORMAL)= 0.0010 |
| H1 & L1 Drift High | H1 Element Fault<br>(L1 Fault Not Detected) | P(H1 Element = ABNORMAL)= 0.6779<br>P(L1 Element = ABNORMAL)= 0.0058<br>P(T1 Element = ABNORMAL)= 0.0058<br>P(Sensor1= ABNORMAL)= 0.0010 |
| H1, L1 & T1 Drift High | H1 Element Fault<br>T1 Element Fault<br>(L1 Fault Not Detected) | P(H1 Element = ABNORMAL)= 0.6121<br>P(T1 Element = ABNORMAL)= 0.6121<br>P(Sensor1= ABNORMAL)= 0.1156<br>P(L1 Element = ABNORMAL)= 0.0077 |

Figure 36 Comparative Results

SURVEILLANCE SYSTEM AND METHOD HAVING AN OPERATING MODE PARTITIONED FAULT CLASSIFICATION MODEL

CROSS-REFERENCE TO RELATED APPLICATIONS

This application is a continuation in part patent application of U.S. patent application Ser. No. 09/591,140, filed Jun. 9, 2000, now U.S. Pat. No. 6,609,036.

STATEMENT REGARDING FEDERALLY SPONSORED RESEARCH OR DEVELOPMENT

The invention described herein was made in the performance of work under NASA Small Business Innovation Research (SBIR) Contracts NAS4-99012 and NAS13-01001, and is subject to the provisions of Public Law 96-517 (35 USC 202) and the Code of Federal Regulations 48 CFR 52.227-11 as modified by 48 CFR 1852.227-11, in which the contractor has elected to retain title.

FIELD OF THE INVENTION

The instant invention relates generally to a system and method for fault classification using operating mode partitioning and, in particular, to a system and method for performing high sensitivity surveillance of an asset such as a process and/or apparatus preferably having at least two distinct modes of operation wherein surveillance is performed using an operating mode partitioned fault classification model of the asset.

BACKGROUND OF THE INVENTION

Conventional process surveillance schemes are sensitive only to gross changes in the mean value of a process signal or to large steps or spikes that exceed some threshold limit value. These conventional methods suffer from either a large number of false alarms (if thresholds are set too close to normal operating levels) or from a large number of missed (or delayed) alarms (if the thresholds are set too expansively). Moreover, most conventional methods cannot perceive the onset of a process disturbance or sensor signal error that gives rise to a signal below the threshold level or an alarm condition. Most conventional methods also do not account for the relationship between a measurement by one sensor relative to another sensor. Further, most conventional methods provide no means to assess the most likely cause of a process disturbance or sensor signal error. For example, a process disturbance could result from any combination of an instrumentation problem, an equipment problem, or the process operating in a new or unexpected way.

Recently, improved methods for process surveillance have developed from the application of certain aspects of artificial intelligence technology. Specifically, parameter estimation methods have been developed using either statistical, mathematical or neural network techniques to learn a model of the normal patterns present in a system of process signals. After learning these patterns, the learned model is used as a parameter estimator to create one or more virtual signals given a new observation of the actual process signals. Further, high sensitivity surveillance methods have been developed for detecting process and signal faults by analysis of a mathematical comparison between the actual process signal and its virtual signal counterpart. Moreover, automated decision making methods have been developed for reasoning about the cause of events or problems on the basis of their symptoms as represented in data.

Parameter estimation based surveillance schemes have been shown to provide improved surveillance relative to conventional schemes for a wide variety of assets including industrial, utility, business, medical, transportation, financial, and biological systems. However, parameter estimation based surveillance schemes have in general shown limited success when applied to complex processes. Applicant recognizes and believes that this is because the parameter estimation model for a complex process must characterize the entire operating state space of the process to provide effective surveillance. Moreover, a review of the known prior-art discloses that virtually all such systems developed to date utilize a single model of the process to span the entire set of possible operating modes. Hence, a significant shortcoming of the known prior-art is that, inter alia, statistically derived models become extremely large and neural network models become difficult or impractical to train when the process operating state space is complex. The implication for statistically derived models is that the parameter estimation method and system becomes computationally expensive to operate thereby limiting the utility of the method for on-line or real-time surveillance. An alternative for statistically derived models is to constrain the size of the model; however this constraint limits the accuracy of the parameter estimation method and thereby limits the sensitivity of the surveillance method. The implication for mathematical and neural network models is simply that the parameter estimation method and system becomes less accurate thereby degrading the sensitivity of the surveillance method. These shortcomings in parameter estimation and the dependent capability for fault detection also reduce the utility, performance and benefit of automated decision making methods. Further, automated decision making itself becomes a much more complex and less reliable procedure when the process operating state space is complex. Automated decision making when the process operating state space is complex often leads to conflicting and incompatible decision objectives and fault patterns when considering multiple operating modes of the process. In fact, automated decision making when the process operating state space is complex can become combinatorially infeasible to accomplish with the reliability and confidence needed for practical use.

Many attempts to apply parameter estimation, fault detection, and fault classification techniques to assets such as industrial, utility, business, medical, transportation, financial, and biological processes have met with poor results in part because the techniques used were expected to characterize the entire operating state space of the process. In one example, a multivariate state estimation technique (MSET) based surveillance system for the Space Shuttle Main Engine's telemetry data was found to produce numerous false alarms when the learned MSET parameter estimation model was constrained to a size suitable for on-line, real-time surveillance. In this case, the surveillance system false alarm rate could be reduced by desensitizing the surveillance threshold parameters; however, the missed alarm rates then became too high for practical use in the telemetry data monitoring application. In another case, a Bayesian belief network fault classification system for the X-33 Single Stage to Orbit Demonstrator vehicle was found to classify fault indications incorrectly when multiple operating modes of the system were represented in a single decision model.

Moreover, current parameter estimation, fault detection, and fault classification techniques for surveillance of assets such as industrial, utility, business, medical, transportation, financial, and biological processes fail to recognize the surveillance performance limitations that occur when it becomes necessary to trade-off decision processing speed against decision accuracy. This may be attributed, in part, to the relative immaturity of the field of artificial intelligence and computer-assisted surveillance with regard to real-world process control applications. Additionally, a general failure to recognize the specific limitations of trading off decision processing speed against decision accuracy for computer-assisted surveillance is punctuated by an apparent lack of known prior art teachings that address potential methods to overcome this limitation. In general, the known prior-art teaches computer-assisted surveillance solutions that are either applied globally to all operating modes of an asset or applied only to a single predominant operating mode, for example, applied only to steady state operations while neglecting all transient operating states of the asset.

For the foregoing reasons, there is a need for a surveillance system and method that overcomes the significant shortcoming of the known prior-art as delineated hereinabove.

BRIEF SUMMARY OF THE INVENTION

The instant invention is distinguished over the known prior art in a multiplicity of ways. For one thing, one embodiment of the invention provides a surveillance system and method that partitions decision models of an asset for overcoming a performance limiting trade-off between decision processing speed and decision accuracy that has been generally unrecognized by the known prior art. Additionally, one embodiment of the invention can employ any one of a plurality of parameter estimation methods, fault detection methods, and fault classification methods and the decision models used therewith for improving surveillance performance. Furthermore, one embodiment of the invention provides a surveillance system and method that provides an operating mode partitioned decision model that can be accomplished by observation and analysis of a time sequence of process signal data and by a combination of a plurality of techniques.

Moreover, one embodiment of the invention provides a surveillance system and method that provides an operating mode partitioning of the decision model which enables different parameter estimation methods, fault detection methods, and fault classification methods to be used for surveillance within each individual operating mode of an asset. This ability enables surveillance to be performed by the instant invention with lower false alarm rates and lower missed alarm rates than can be achieved by the known prior-art methods.

Hence, one embodiment of the invention provides a surveillance system and method that performs its intended function much more effectively by enabling higher decision processing speed without a concomitant reduction in decision accuracy. Conversely, one embodiment of the invention alternately enables improved decision accuracy without a concomitant reduction in decision processing speed. Additionally, these competing criteria may be traded-off to achieve the optimal performance solution for a specific surveillance application. Furthermore, and in contrast to the known prior art, and in one embodiment of the invention, parameter estimation methods, fault detection methods, and fault classification methods may be individually tailored for each operating mode of the asset thereby providing additional capability to reduce decision error rates for the surveillance system.

In one embodiment of the invention, the instant invention provides a surveillance system and method that creates and uses, for the purpose of asset surveillance, a coordinated collection of decision submodels wherein each decision submodel in the coordinated collection is optimized for a single operating mode or subset of operating modes of an asset.

In another embodiment of the invention, an asset surveillance system is comprised of an operating mode partitioned fault classification model of an asset comprised of a plurality of fault classification submodels each having an asset operating mode associated thereto; a fault indication means for determining one or more fault indications given a set of observed asset signals from the asset; means for determining at least one operating mode of the asset for the set of observed asset signals; a first selection means for selecting at least one of the fault classification submodels from the operating mode partitioned fault classification model as a function of at least the one determined operating mode for providing a fault classification of determined fault indications for performing asset surveillance. The fault indication means further includes an operating mode partitioned parameter estimation model comprised of a plurality of parameter estimation submodels each having an asset operating mode associated thereto and a second selection means for selecting at least one of the parameter estimation submodels from the operating mode partitioned parameter estimation model as a function of at least the one determined operating mode. The fault indication means further includes means for processing the observed asset signals as a function of at least the one selected parameter estimation submodel for defining parameter estimated data. Additionally, the fault indication means includes an operating mode partitioned fault detection model comprised of a plurality of fault detection submodels each having an asset operating mode associated thereto. Furthermore, the fault indication means further includes a third selection means for selecting at least one of the fault detection submodels from the operating mode partitioned fault detection model as a function of at least the one determined operating mode. Moreover, the fault indication means further includes means for processing the parameter estimated data as a function of at least the one selected fault detection submodel for determining the one or more fault indications used for providing the fault classification of determined fault indications by the first selection means selecting at least one of the fault classification submodels from the operating mode partitioned fault classification model as a function of at least the one determined operating mode for providing the fault classification of determined fault indications for performing asset surveillance.

In another embodiment of the invention, a method for determining asset status includes the steps of creating an operating mode partitioned fault classification model comprised of a plurality of fault classification submodels each having an asset operating mode associated thereto; acquiring a set of observed signal data values from an asset; determining at least one fault indication as a function of the observed signal data values; determining at least one operating mode of the asset for the set of observed asset signals; selecting at least one fault classification submodel from the operating mode partitioned fault classification model as a function of at least the one determined operating mode, and using at least the one fault indication and at least the one selected fault classification submodel for classifying faults for performing asset surveillance.

In another embodiment of the invention, a method for determining asset status includes the steps of partitioning a decision model into a plurality of partitions, each partition having an operating mode associated thereto: employing a plurality of different methods from a plurality of parameter estimation methods, a plurality of fault detection methods, and a plurality of fault classification methods for different partitions; determining at least one operating mode of an asset; selecting at least one the plurality of partitions as a function of the determined operating mode for tailoring the plurality of parameter estimation methods, the plurality of fault detection methods, and the plurality of fault classification methods to perform asset surveillance as a function of the at least one determined operating mode.

In another embodiment of the invention, a method for determining asset status includes the steps of acquiring a set of observed signal data values from an asset; producing a calculated set of estimated signal data values correlative to the set of observed signal data values acquired from the asset; comparing the set of observed signal data values to the calculated set of estimated signal data values; determining a presence of a disagreement between the set of observed signal data values and the calculated set of estimated signal data values on the basis of the comparison step, and determining a cause of a determined presence of disagreement between the set of observed signal data values and the calculated set of estimated signal data values for performing asset surveillance. The method further including the step of performing asset control as a function of the determined cause of the determined presence of disagreement.

In another embodiment of the invention, a method and system for determining asset status includes the steps of creating a fault detection model comprised of a plurality of fault detection submodels each having an operating mode associated thereto; creating a fault classification model comprised of a plurality of fault classification submodels each having an operating mode associated thereto; acquiring a set of observed signal data values from an asset; determining at least one operating mode of the asset for the set of observed signal data values; selecting at least one fault detection submodel from the fault detection model as a function of at least the one determined operating mode; determining at least one fault indication as a function of the observed signal data values; selecting at least one fault classification submodel from the fault classification model as a function of at least the one determined operating mode, and using at least the one fault indication and at least the one selected fault classification submodel for classifying faults for performing asset surveillance. The method and system of further including the step of creating a parameter estimation model comprised of a plurality of parameter estimation submodels each correlative to at least one training data subset partitioned from an unpartitioned training data set and each having an operating mode associated thereto and wherein the step of determining at least one fault indication as a function of the observed signal data values includes the step of determining at least one fault indication as a function of both the estimated signal values determined using the parameter estimation model and the observed signal data values.

Moreover, having thus summarized the invention, it should be apparent that numerous modifications and adaptations may be resorted to without departing from the scope and fair meaning of the present invention as set forth hereinbelow by the claims.

BRIEF DESCRIPTION OF THE DRAWINGS

FIG. 17 lists the learning vector quantization neural network operating mode determiner design characteristics used for feasibility testing of an embodiment of the invention.

FIG. 18 lists the Space Shuttle Main Engine parameters used for feasibility testing in an embodiment of the invention.

FIG. 19 lists the Space Shuttle Main Engine flight telemetry data sets used for feasibility testing of an embodiment of the invention.

FIG. 20 lists the parameter estimation model and submodel configurations used for feasibility testing of an embodiment of the invention.

FIG. 21 lists the Space Shuttle Main Engine operating mode partitioning rules used for feasibility testing of an embodiment of the invention.

FIG. 22 lists the feasibility test results for nominal flight data using an embodiment of an operating mode partitioned MSET estimation model for the Space Shuttle Main Engine in an embodiment of the invention.

FIG. 23 lists the feasibility test results for signal drift failure detection simulations using an embodiment of an operating mode partitioned MSET estimation model for the Space Shuttle Main Engine in an embodiment of the invention.

FIG. 24 lists the comparative test results for nominal flight data using an unpartitioned MSET estimation model for the Space Shuttle Main Engine containing one hundred fifty observation vectors.

FIG. 25 lists the comparative test results for signal drift failure detection using a unpartitioned MSET estimation model for the Space Shuttle Main Engine containing one hundred fifty observation vectors.

FIG. 26 lists the comparative test results for nominal flight data using a unpartitioned MSET estimation model for the Space Shuttle Main Engine containing three hundred observation vectors.

FIG. 27 lists the comparative test results for signal drift failure detection using a unpartitioned MSET estimation model for the Space Shuttle Main Engine containing three hundred observation vectors.

FIG. 31 illustrates faults and their probable causes for hydrogen sensor 1 using a Bayesian Belief Network in an embodiment of the invention.

FIG. 32 illustrates faults and their probable causes for hydrogen sensor 2 using a Bayesian Belief Network in an embodiment of the invention.

FIG. 33 lists the feasibility test results for a partitioned model under operating conditions in an embodiment of the invention.

FIG. 34 lists the feasibility test results for a partitioned model under venting conditions in an embodiment of the invention.

FIG. 35 lists the comparative test results for an unpartitioned model under operating conditions.

FIG. 36 lists the comparative test results for an unpartitioned model under venting conditions.

DETAILED DESCRIPTION OF THE INVENTION

Figure 1:
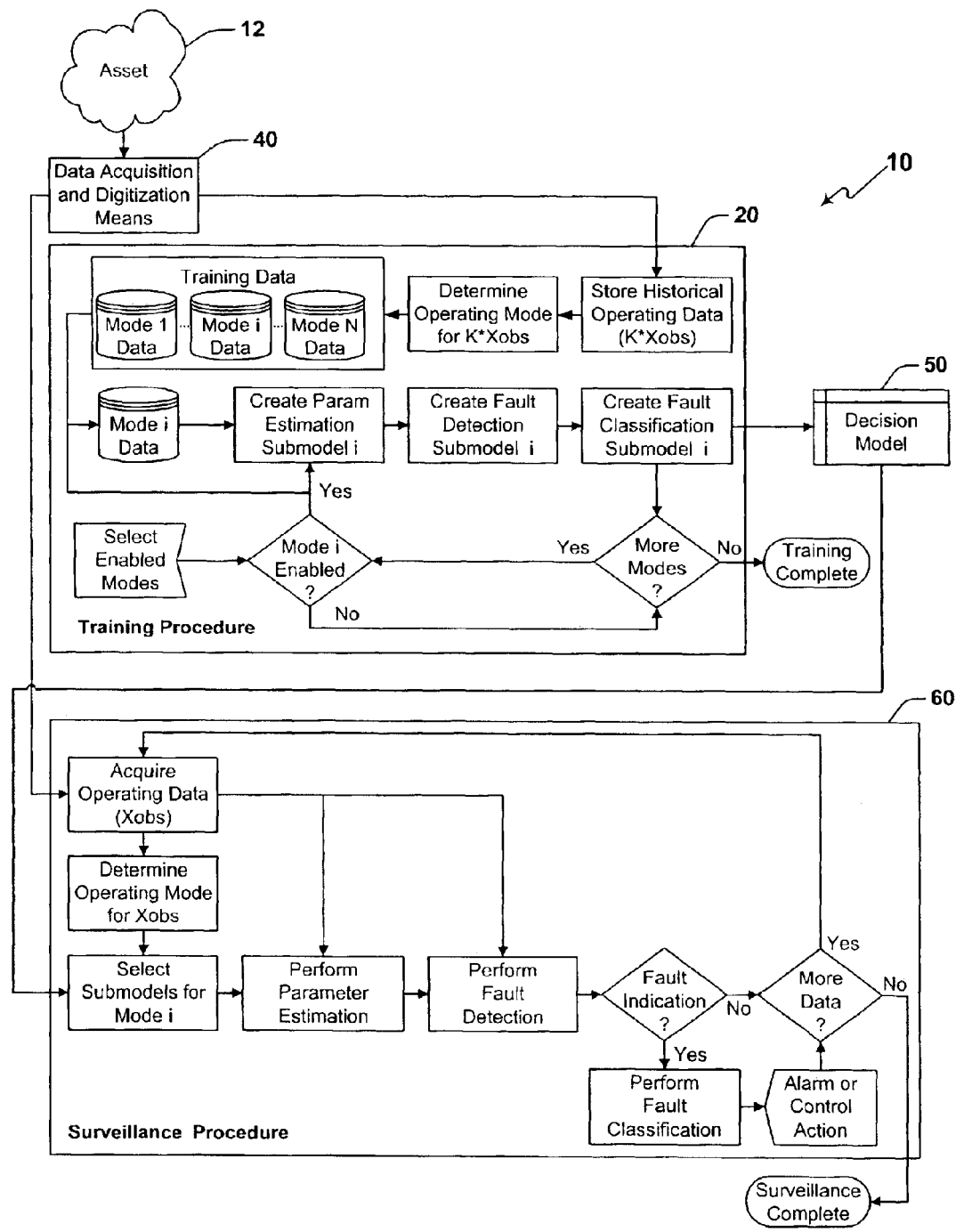
FIG. 1 is a schematic functional flow diagram of an embodiment of the invention.

Considering the drawings, wherein like reference numerals denote like parts throughout the various drawing figures, reference numeral 10 is directed to the system according to the instant invention.

In its essence, and referring to FIG. 1, the system 10 is generally comprised of a method and apparatus for performing high sensitivity surveillance of a wide variety of assets including industrial, utility, business, medical, transportation, financial, and biological processes and apparatuses wherein such process and/or apparatus asset preferably has at least two distinct modes or domains of operation (e.g., transient and steady state modes or domains). The system includes a training procedure 20 wherein a decision model 50 of an asset 12 (e.g., a process and/or apparatus) is derived from historical operating data using at least one of a plurality of computer-assisted techniques. Historical operating data includes a set of observations from normal operation of the asset 12 that is acquired and digitized by a data acquisition means 40 using any combination of electronic data acquisition hardware and signal processing software known to those having ordinary skill in the art, and informed by the present disclosure. Additionally, and as delineated infra, one hallmark of the instant invention is an operating mode partitioning method of a decision model 50 for the asset 12 that is performed during the training procedure 20.

The system 10 further includes a surveillance procedure 60 wherein the operating mode partitioned decision model 50 is used for high sensitivity computer-assisted surveillance of the asset 12 for the purpose of determining whether a process fault or failure necessitates an alarm or control action. Another hallmark of the instant invention, as delineated hereinbelow, is the use of the operating mode partitioned decision model 50 as an element of the surveillance procedure 60. The system 10 described herein is useful for ultra-sensitive detection of the onset of sensor or data signal degradation, component performance degradation, and process operating anomalies.

Figure 2:
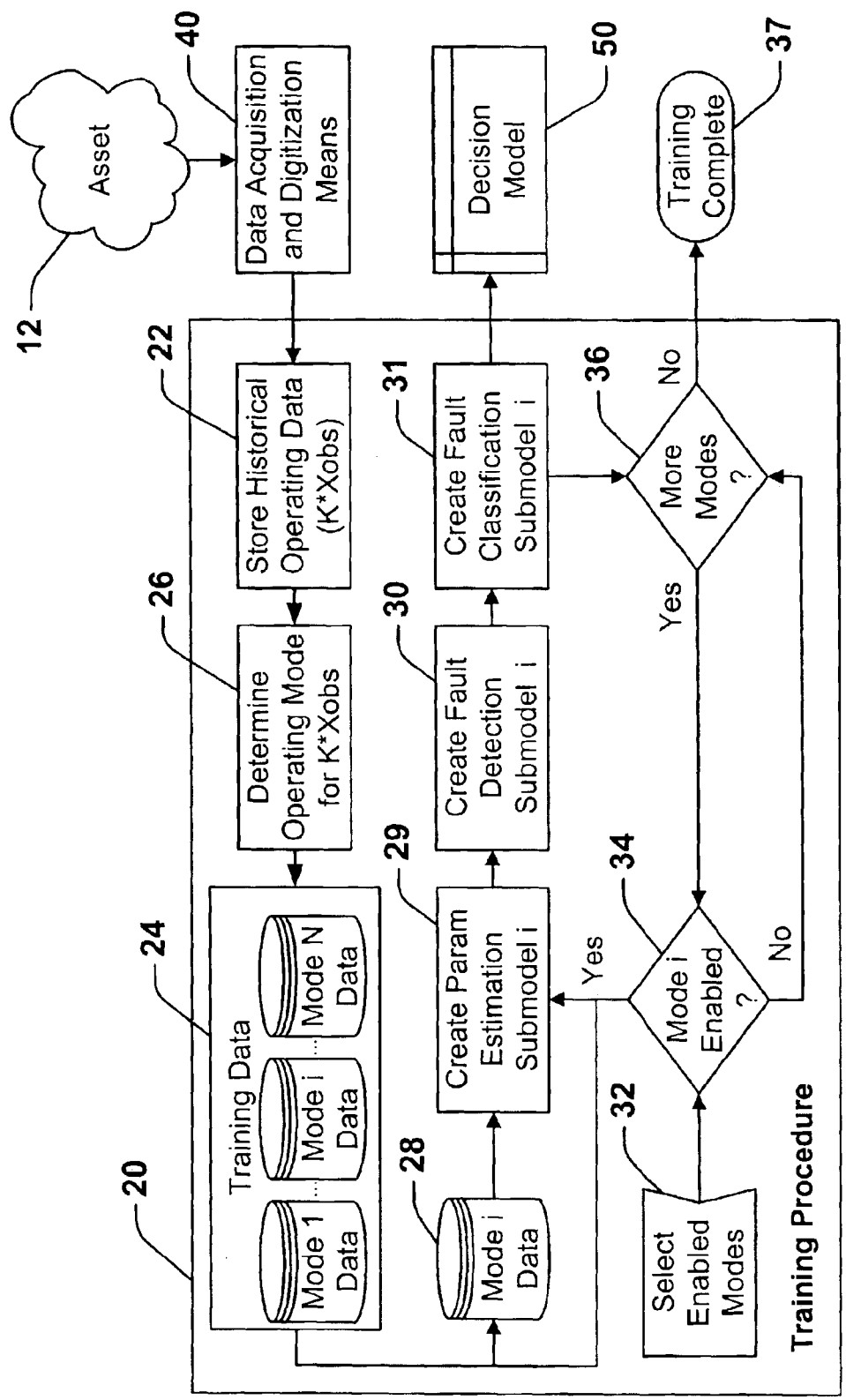
FIG. 2 is a schematic functional flow diagram of a method and system for training an operating mode partitioned decision model using recorded observations of the actual process signals in an embodiment of the invention.

Description of the Training Procedure:

More specifically, and referring to FIG. 2, the training procedure 20 of the system 10 includes a method and apparatus for training or preparing the decision model 50 using historical operating data from the asset 12 that has been acquired by the data acquisition means 40 using any combination of conventional electronic data acquisition hardware and signal processing software as is well known in the art. Upon acquiring the data, the model designer proceeds to implement the unique method for the training procedure 20 in accordance with instant invention. The historical operating data is acquired in digital format and stored using a data storage procedure 22. The unique method for the training procedure 20 uses an operating mode determination procedure 26 to partition the historical operating data into one or more training data subsets 28 that together comprise a training data set 24 wherein each training data subset 28 is representative of a single operating mode i ($M_i$) wherein $M_i$ is any mode between Mode 1 ($M_1$) to Mode N ($M_N$) where N is a positive integer or each training data subset 28 is representative of a subset of operating modes of the asset 12. The training data set 24 includes at least K discrete observations of the asset 12 wherein each single observation, herein denoted $X_{obs}$, is comprised of a vector of data values for at least each signal parameter to be included in the decision model 50. For the purposes of the training procedure 20, the number of observations, K, acquired is at least great enough to adequately bound the operating state space of the asset 12. Thus, the training data set 24 provides a representative sample of the signals produced by the asset 12 during all normal modes of operation.

Again referring to FIG. 2, the unique method for the training procedure 20 also includes at least one of a parameter estimation submodel creation procedure 29, a fault detection submodel creation procedure 30, or a fault classification submodel creation procedure 31 for creating at least one decision submodel for inclusion in the decision model 50 using at least one training data subset 28. In practice, the designer first selects the operating modes that will be included in the decision model 50 by means of an operating mode enable procedure 32. The method thereafter is comprised of a training loop wherein each possible operating mode of the asset 12 is assessed for inclusion in the decision model 50.

The training loop is in general controlled by two decision procedures. The mode enabled decision procedure 34 determines whether the designer intends a specific operating mode to be included in the decision model 50. If the operating mode is not to be included, no further processing is required and the training loop proceeds to the next possible operating mode as controlled by the more modes decision procedure 36. If the operating mode is to be included, the training data subset 28 associated with the currently selected operating mode is selected from the training data set 24. Depending on the preference of the designer implementing the training loop, the operating mode determination and training data subset extraction procedures may be, in general, performed as needed or in advance of the submodel creation loop. The submodel creation loop shown in FIG. 2 illustrates operating mode determination and training data subset extraction in advance of implementing the submodel creation loop but is not intended to constrain the method to preclude determination and extraction on an as needed basis. The result of each submodel creation loop is the addition of one or more submodels to the decision model 50.

Still referring to FIG. 2, the operating mode determination procedure 26 used to classify each observation included in the training data set 24 may be, in general, performed using any method suitable for determining the operating mode of the asset 12 given an observation or series of observations therefrom. Methods suitable for the operating mode determination procedure 26 include, but are not limited to, a plurality of mathematical or logic sequence techniques, a plurality of expert system techniques, a plurality of fuzzy logic techniques, a plurality of determined similarity techniques, a plurality of clustering techniques, and a plurality of neural network techniques.

Continuing to refer to FIG. 2, the parameter estimation submodel creation procedure 29 may be, in general, performed using any method suitable for defining a parameter estimation model useful for estimating the values of one or more observed signals. Methods suitable for the parameter estimation submodel creation procedure 29 include, but are not limited to, a plurality of multivariate state estimation techniques, a plurality of neural network techniques, a plurality of mathematical model techniques, a plurality of autoregressive moving average techniques, a plurality of principal component analysis techniques, a plurality of independent component analysis techniques, a plurality of determined similarity techniques, and a plurality of Kalman filter techniques. Each parameter estimation submodel contained in the decision model 50 may be created to implement any of a plurality of parameter estimation techniques. Further, the parameter estimation technique implemented for an individual submodel is not constrained to be the same as the parameter estimation technique implemented for any other submodel contained in the decision model 50.

Continuing to refer to FIG. 2, the fault detection submodel creation procedure 30 may be, in general, performed using any method suitable for defining a fault detection model useful for detecting fault indications on the basis of the values of one or more observed signals. Methods suitable for the fault detection submodel creation procedure 30 include, but are not limited to, a plurality of sequential probability ratio test techniques, a plurality of hypothesis test techniques, a plurality of neural network techniques, a plurality of mathematical model techniques, a plurality of comparison threshold techniques, a plurality of limit comparison techniques, a plurality of determined similarity techniques, and a plurality of trend analysis techniques. Each fault detection submodel contained in the decision model 50 may be created to implement any of a plurality of fault detection techniques. Further, the fault detection technique implemented for an individual submodel is not constrained to be the same as the fault detection technique implemented for any other submodel contained in the decision model 50.

Continuing to refer to FIG. 2, the fault classification submodel creation procedure 31 may be, in general, performed using any method suitable for defining a fault classification model useful for determining the presence, source or cause of an unacceptable asset status or condition on the basis of one or more fault indications. Methods suitable for the fault classification submodel creation procedure 31 include, but are not limited to, a plurality of Bayesian belief network techniques, a plurality of neural network techniques, a plurality of decision tree techniques, a plurality of expert system techniques, a plurality of rule-based techniques, a plurality of determined similarity techniques, a plurality of hypothesis test techniques, and a plurality of procedural logic techniques. Each fault classification submodel contained in the decision model 50 may be created to implement any of a plurality of fault classification techniques. Further, the fault classification technique implemented for an individual submodel is not constrained to be the same as the fault classification technique implemented for any other submodel contained in the decision model 50.

The unique method for the training procedure 20 is completed at training complete point 37 when all expected operating modes of the asset 12 have been assessed. At this point, the decision model 50 includes parameter estimation, fault detection, and/or fault classification submodels for each operating mode enabled by the designer. The decision model 50 is thereafter useful for performing surveillance of the asset 12.

Figure 3:
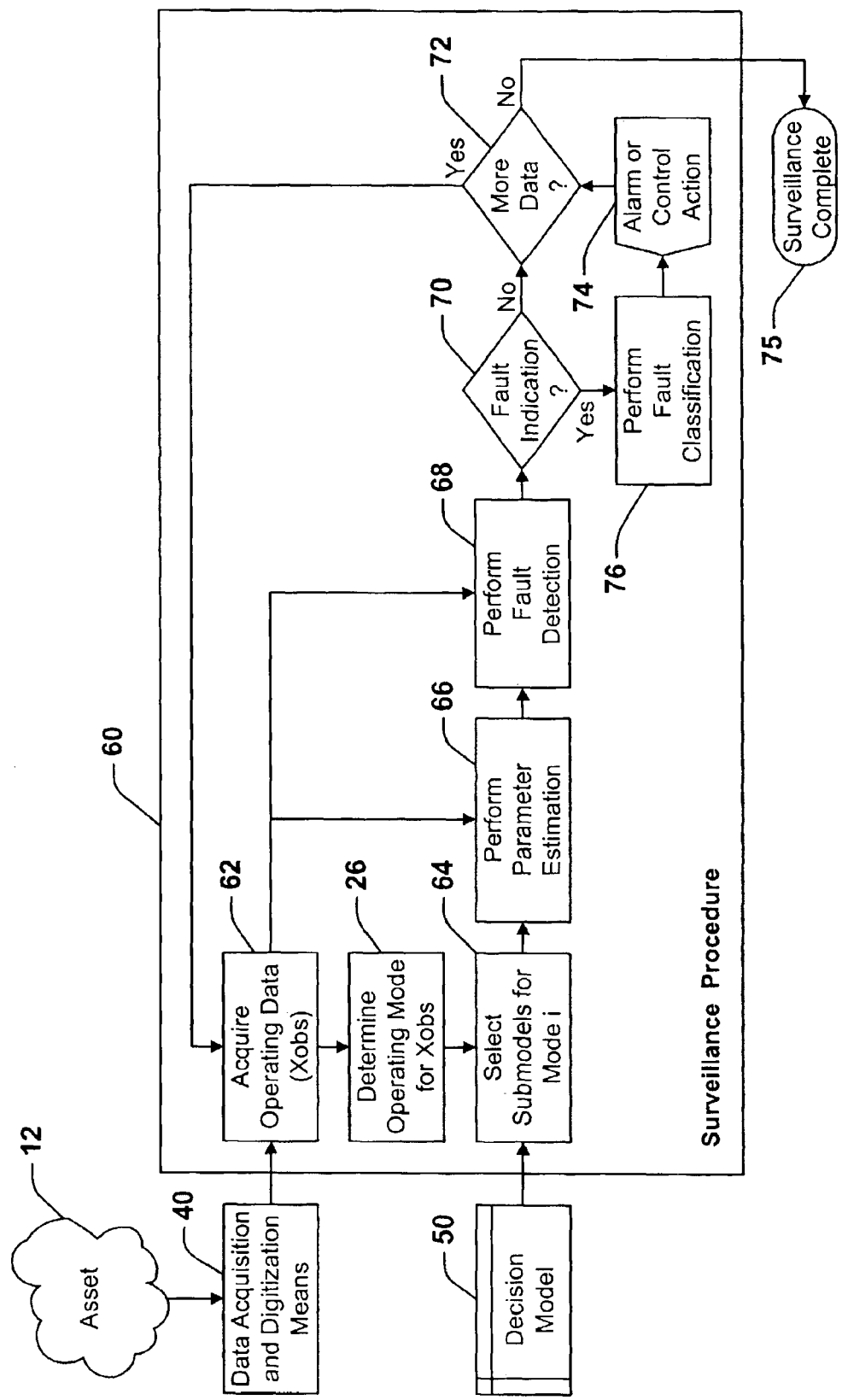
FIG. 3 is a schematic functional flow diagram of a method and system for performing surveillance of an asset using an operating mode partitioned decision model in an embodiment of the invention.

Description of the Surveillance Procedure:

More specifically, and referring to FIG. 3, the surveillance procedure 60 is comprised of acquiring successive vectors of operating data and determining for each such observation vector whether the operating data is indicative of an unacceptable status or condition of the asset 12. The surveillance procedure 60 further includes implementing an alarm or control action for the purpose of notifying an operator or taking a corrective action in response to a detected unacceptable status or condition of the asset 12. The surveillance procedure 60 is in general an open-ended data acquisition and analysis loop that continues until such time as the operator chooses to terminate the surveillance.

Again referring to FIG. 3, the surveillance procedure begins with an observation acquisition procedure 62 for acquiring a vector of observed signal data values, herein denoted $X_{obs}$. Signal data values are acquired by the data acquisition means 40 using any combination of conventional electronic data acquisition hardware and signal processing software as noted supra. Next the operating mode determination procedure 26 is used to determine the operating mode for the vector of observed signal data values, $X_{obs}$. It is essential only that the operating mode determination procedure 26 used during the surveillance procedure 60 is the same operating mode determination procedure 26 used during the training procedure 20. Upon determination of the operating mode associated with the observed signal data, the decision submodels for the current operating mode are selected from the collection of submodels contained in the decision model 50 using a decision submodel selection procedure 64. The selected decision submodels for the current operating mode may then be used with a parameter estimation procedure 66 to produce a current vector of estimated signal data values, herein denoted $X_{est}$. It is essential only that the parameter estimation procedure 66 used during the surveillance procedure 60 is the same parameter estimation procedure 66 for which the decision submodel was trained using the parameter estimation submodel creation procedure 29 during the training procedure 20. The current vector of estimated signal data values, $X_{est}$, in general includes at least one estimated signal data value corresponding to at least one actual signal data value included in the current vector of observed signal data values, $X_{obs}$. A series of estimated signal data values produced by successive observation and parameter estimation cycles is termed herein a "virtual signal" for the signal parameter.

Still referring to FIG. 3, the current vector of estimated signal data values, $X_{est}$, may be in general compared to the current vector of observed signal data values, $X_{obs}$, using a fault detection procedure 68. The fault detection procedure 68 serves the useful purpose of determining whether the current vector of observed signal data values indicates an unacceptable status or condition of the asset 12. The fault detection procedure 68 may be performed using any one of a plurality of comparative techniques.

The results of the fault detection procedure 68 might detect faults based on the current vector of observed signal data values. In many cases, fault detection quality is improved by using a fault indication decision procedure 70 that incorporates logic for considering one or more fault detection results in making the fault indication decision. The fault indication decision procedure 70 may be in general performed using any method suitable for ascertaining a fault indication given a fault detection result or series of fault detection results. Methods suitable for the fault indication decision procedure 70 include, but are not limited to, single observation techniques (e.g., alarm on every detected fault), multi-observation voting techniques (e.g., alarm when X out of Y observations contain a fault indication), and conditional probability techniques (e.g., compute the fault probability given a series of fault detection results).

When faults are indicated by the fault indication decision procedure 70, the unique method for the surveillance procedure 60 provides for a fault classification procedure 76. The fault classification procedure is useful for determining the presence, source or cause of an unacceptable asset status or condition on the basis of one or more fault indications. The classified fault is then provided to the alarm or control action procedure 74 for the useful purpose of enabling an automated or operator directed corrective action or warning.

Upon completing the fault indication decision procedure 70 or the alarm or control action procedure 74, the surveillance procedure then repeats for as long as a more data decision procedure 72 determines that additional surveillance data are available or terminates at surveillance complete step 75 when no more surveillance data are available.

Continuing to refer to FIG. 3, the usefulness of the instant invention is, inter alia, the improvement achieved in the accuracy of the fault decision made by the fault classification procedure 76. Improving the accuracy of the fault classification procedure 76 accomplishes a reduction in the number of false alarms sent to a process operator or control system that can in turn result in an erroneous alarm or control action by the alarm or control action procedure 74. Further, improving the accuracy of the fault classification procedure 76 accomplishes a reduction in the number of missed alarms thereby accomplishing more timely alarm or control action by the alarm or control action procedure 74. The instant invention thereby enables improved operating safety, improved efficiency and performance, and reduced maintenance costs for a wide variety of industrial, utility, business, medical, transportation, financial, and biological processes and apparatuses wherein such process and/or apparatus asset 12 preferably has at least two distinct modes or domains of operation.

Figure 4:
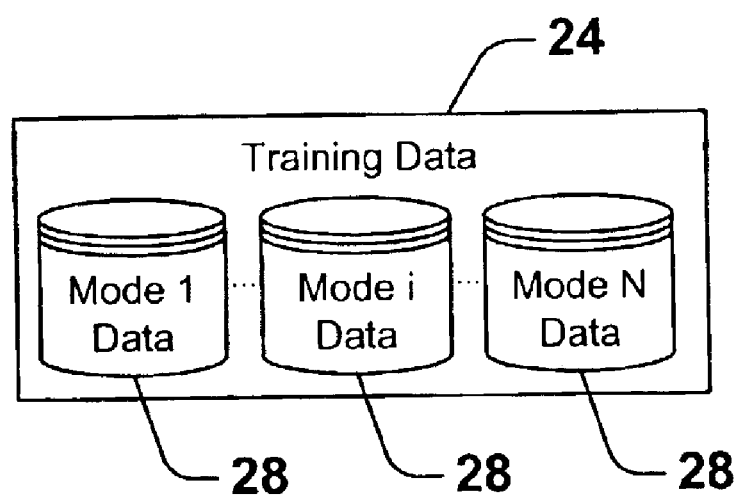
FIG. 4 is a functional schematic of an operating mode partitioned training data set.

FIG. 4 shows the training data set 24 partitioned into a plurality of training data subsets 28 wherein the operating mode associated with each training data subset 28 is determined using the operating mode determination procedure 26.

Figure 5:
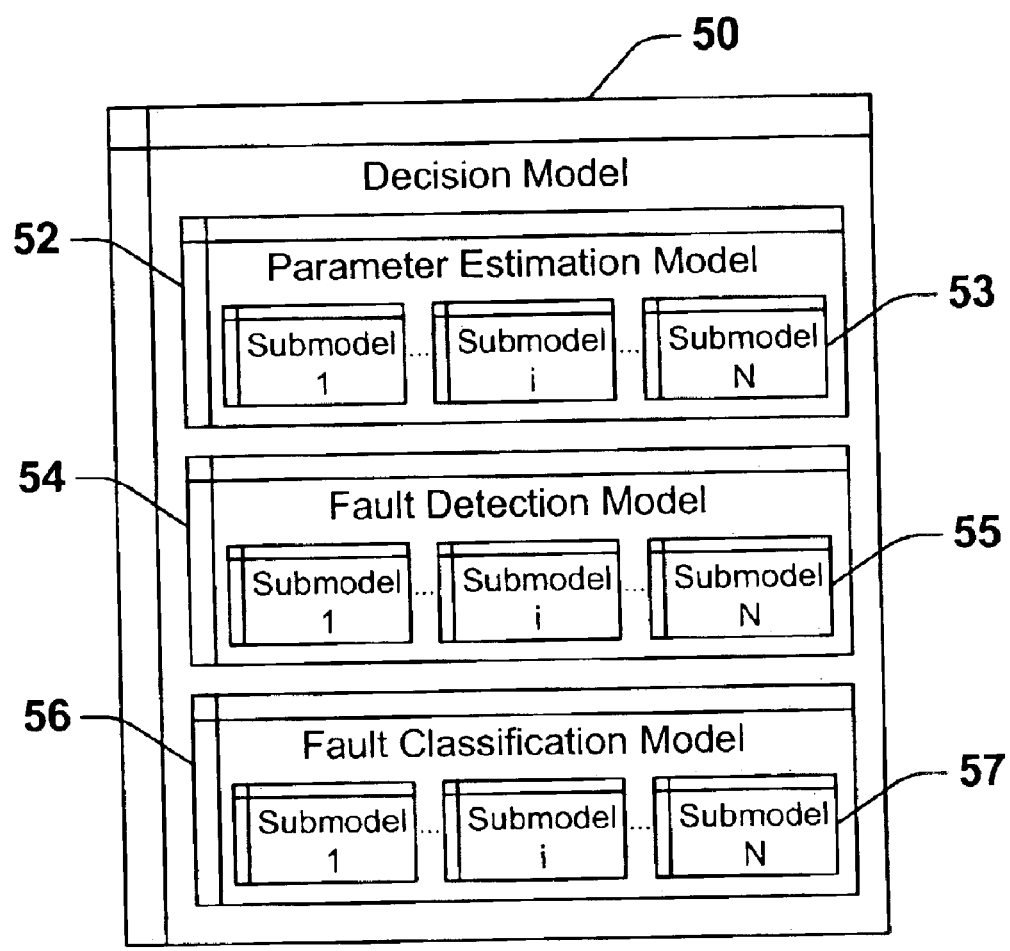
FIG. 5 is a functional schematic of an operating mode partitioned decision model having an operating mode partitioned parameter estimation model, an operating mode partitioned fault detection model, and an operating mode partitioned fault classification model.

FIG. 5 shows an example of the decision model 50 that is comprised of the parameter estimation model 52, the fault detection model 54, and the fault classification model 56. FIG. 5 further shows that the parameter estimation model 52 is comprised of at least one parameter estimation submodel 53, that the fault detection model 54 is comprised of at least one fault detection submodel 55, and that the fault classification model 56 is comprised of at least one fault detection submodel 57.

Figure 6:
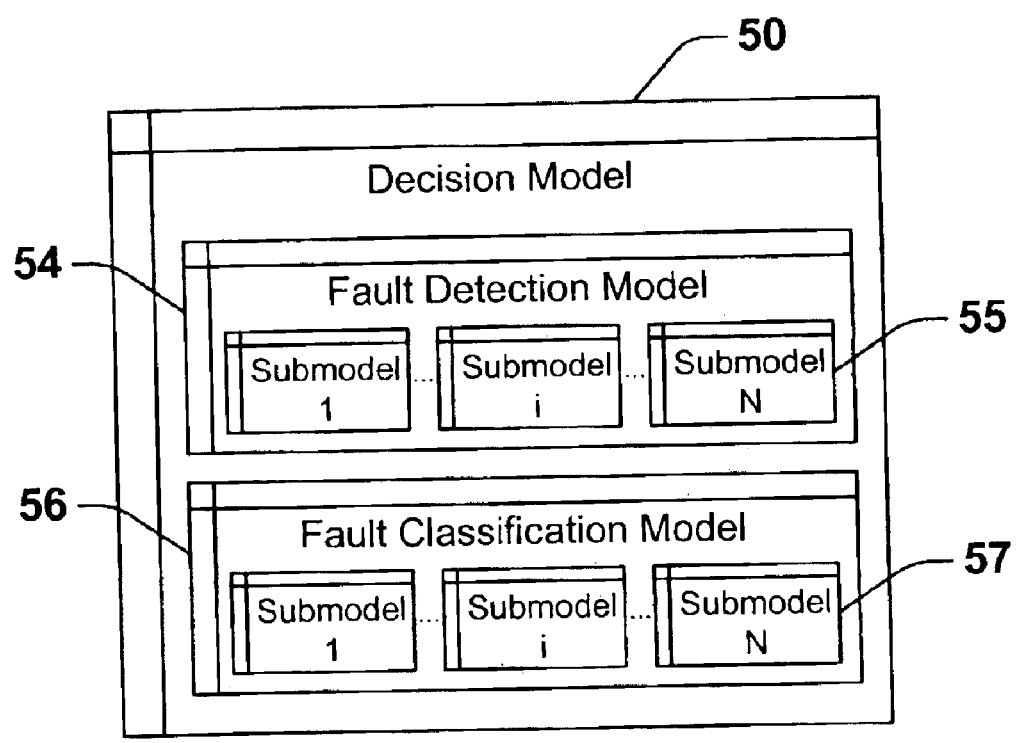
FIG. 6 is a functional schematic of an operating mode partitioned decision model having an operating mode partitioned fault detection model, and an operating mode partitioned fault classification model.

FIG. 6 shows an example of the decision model 50 that is comprised of the fault detection model 54 and the fault classification model 56. FIG. 6 is intended to illustrate that any of the parameter estimation model 52, the fault detection model 54, and/or the fault classification model 56 might not be used in some cases for accomplishing the asset surveillance function.

Figure 7:
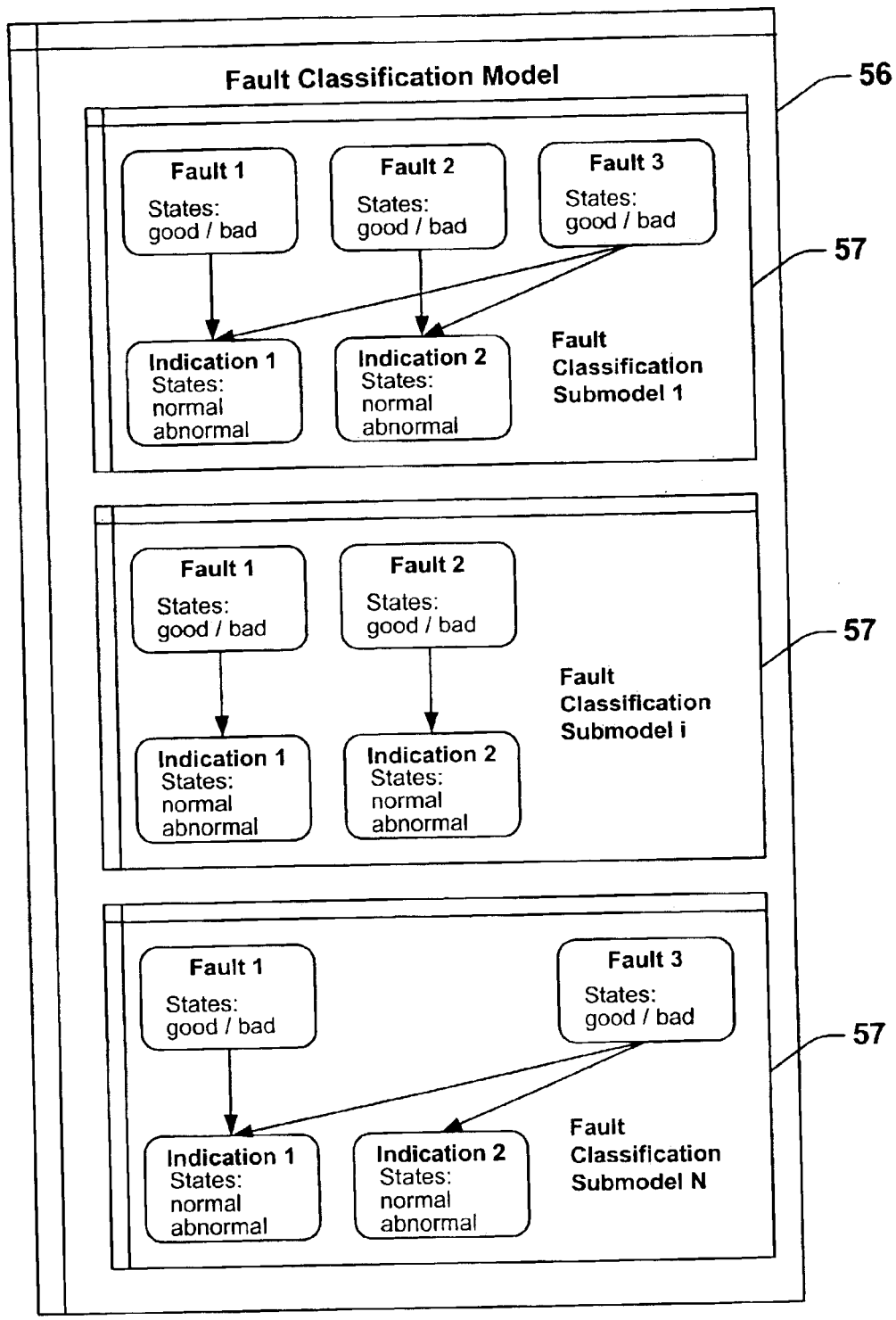
FIG. 7 is a functional schematic of an operating mode partitioned fault classification model.

FIG. 7 shows an example of the fault classification model 56. FIG. 7 is intended to illustrate that the each of the fault detection submodels 57 might be uniquely configured to more accurately accomplish the asset surveillance function for a particular operating mode. For example, in FIG. 7 each of the fault classification submodels shown are uniquely configured.

Referring to FIG. 7, Submodel 1 will typically operate as follows. If only Indication 1 is abnormal the condition will be classified as Fault 1. If only Indication 2 is abnormal the condition will be classified as Fault 2. If both Indication 1 and Indication 2 are abnormal the condition will be classified as Fault 3.

In contrast and still referring to FIG. 7, Submodel i will typically operate as follows. If only Indication 1 is abnormal the condition will be classified as Fault 1. If only Indication 2 is abnormal the condition will be classified as Fault 2. If both Indication 1 and Indication 2 are abnormal the condition will be classified as both Fault 1 and Fault 2.

In additional contrast and still referring to FIG. 7, Submodel N will typically operate as follows. If only Indication 1 is abnormal the condition will be classified as Fault 1. If only Indication 2 is abnormal the condition will be classified as either Fault 3 or as no fault depending on the importance of Indication 1 for confirming the presence of Fault 3. If both Indication 1 and Indication 2 are abnormal the condition will be classified as Fault 3.

Thus, still referring to FIG. 7, the behavior of the fault classification procedure 76 using the fault classification model 56 can be tailored to suit the decision model 50 designer's requirements for the asset surveillance function.

Figure 8:
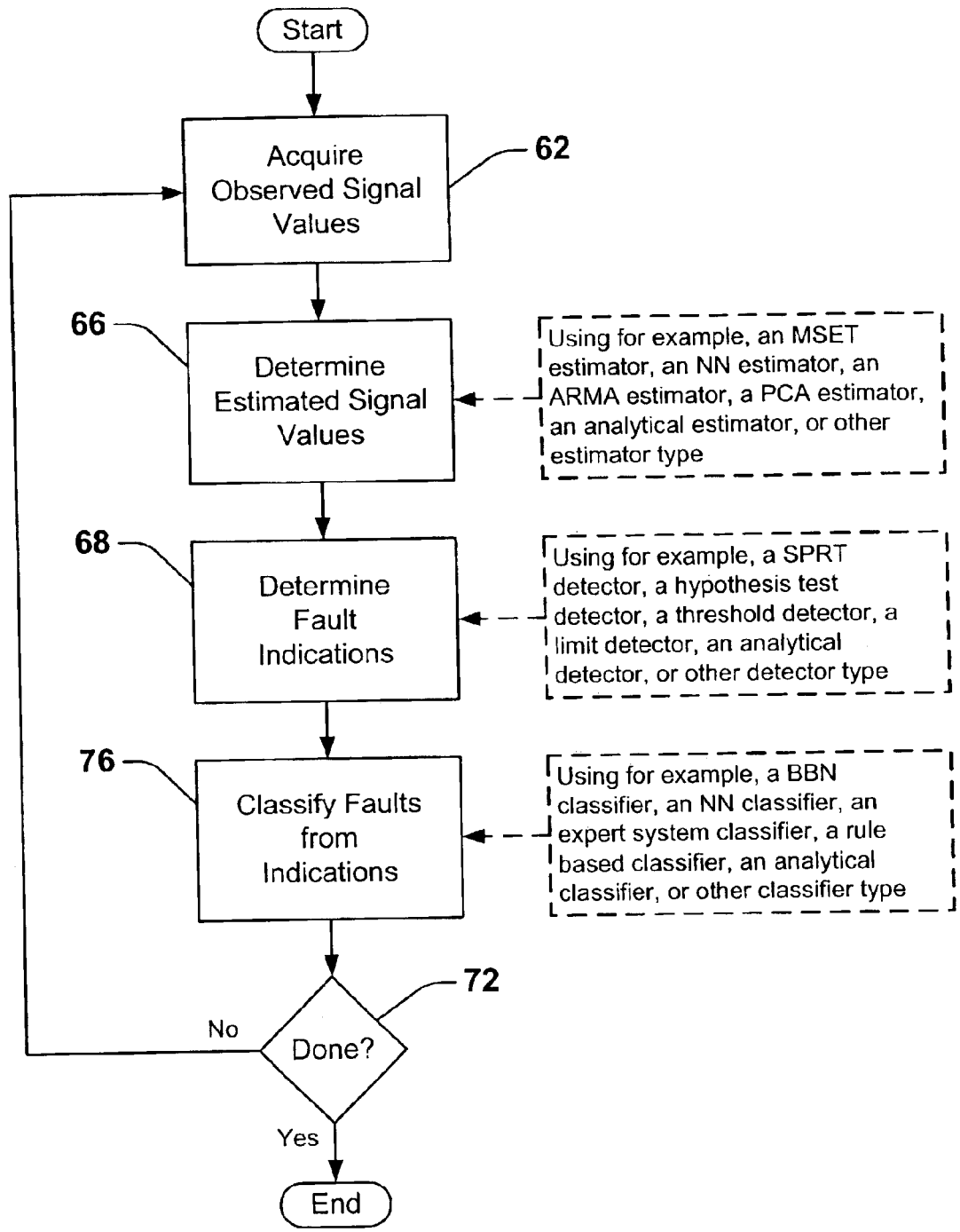
FIG. 8 is a schematic functional flow diagram of a preferred method and system for classifying faults based on observed signal values for performing asset surveillance.

FIG. 8 shows the steps used to determine the status or condition of the asset 12 using the classification of faults during asset surveillance. The first step is to acquire observed signal values from the asset 12 using the observation acquisition procedure 62. The second step is to determine corresponding estimated signal values using the parameter estimation procedure 66. The third step is to determine the presence of any fault indications using the fault detection procedure 68. The fourth step is to classify the presence, source and/or cause of the fault indications, if any, using the fault classification procedure 76. These steps repeat until terminated by the more data decision procedure 72.

Figure 9:
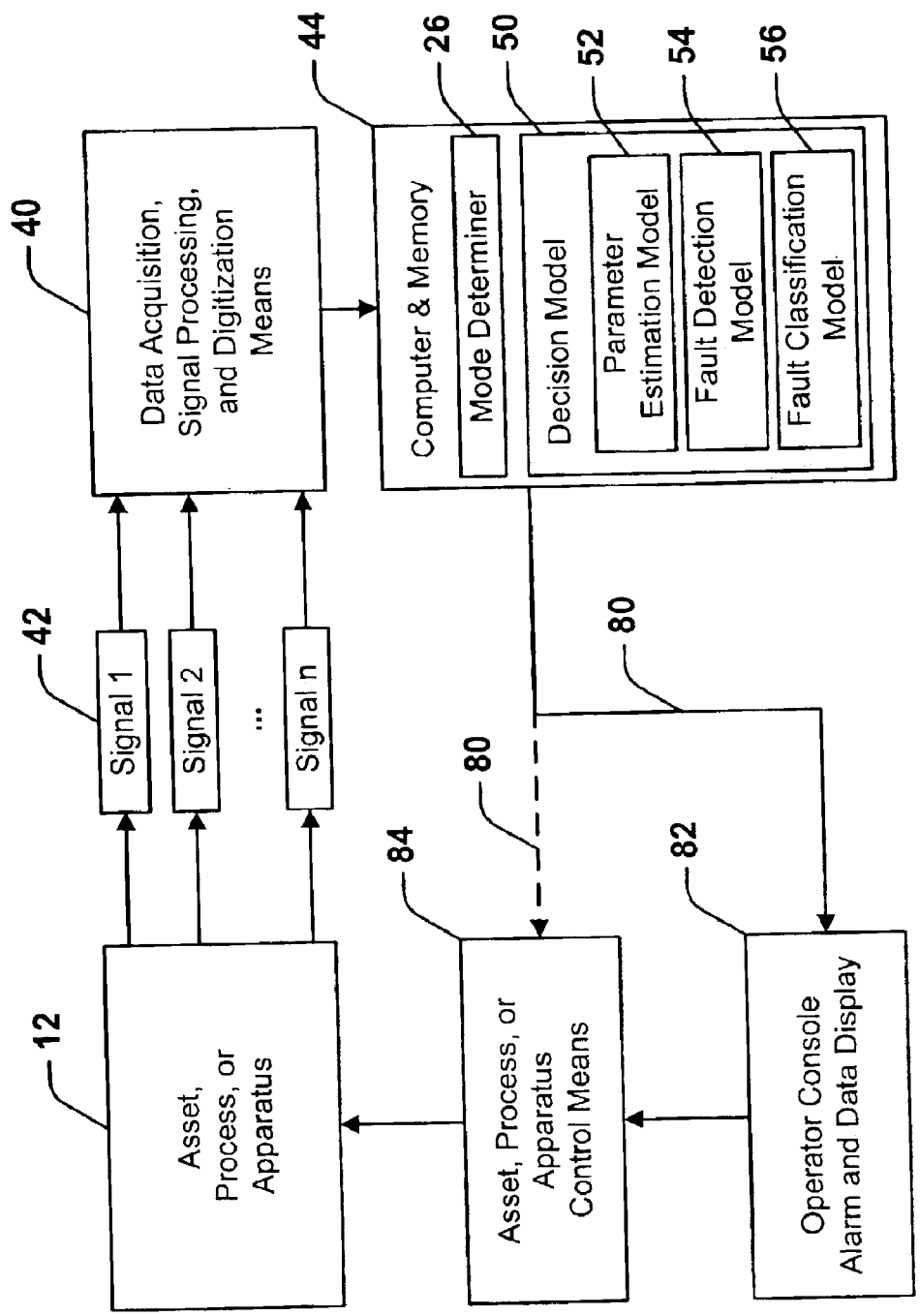
FIG. 9 is a schematic functional flow diagram of a surveillance system using an operating mode partitioned decision model in an embodiment of the invention.

FIG. 9 outlines a general surveillance procedure of the system 10 when employing the operating mode partitioned decision model 50. In a typical surveillance procedure, the asset 12 is the source of at least one signal source 42 that is acquired and digitized using conventional data acquisition means 40 for providing the data acquisition procedure for the purpose of computer-assisted surveillance. The digitized signal data is generally evaluated using a computer 44 having computer software modules implementing the various procedures describe supra, such as the operating mode determination procedure 26, and further providing the memory means for the decision model 50. The operating mode determination procedure 26 is used to determine the current operating mode of the asset 12 given the acquired process signal data. The decision model 50 provides the operating mode partitioned parameter estimation model 52 that in turn provides the parameter estimation submodel 53 that is used to produce an estimated signal value for at least one signal source 42 emanating from the asset 12. The parameter estimation submodel 53 in general uses the parameter estimator procedure 66 to produce the estimated signal values. The parameter estimation submodel 53 selected from the decision model 50 and used by the parameter estimation procedure 66 is dependent on the operating mode determined by the operating mode determination procedure 26.

The observed signal values and/or the estimated signal values are then generally evaluated to identify the presence of any unacceptable status or condition of the asset 12. The decision model 50 provides the operating mode partitioned fault detection model 54 that in turn provides the fault detection submodel 55 that is used to detect the indications of any unacceptable status or condition of the asset 12. The fault detection submodel 55 in general uses the fault detection procedure 68 to detect the indications of faults. The fault detection submodel 55 selected from the decision model 50 and used by the fault detection procedure 68 is dependent on the operating mode determined by the operating mode determination procedure 26.

The fault indications, if any, are then generally evaluated to classify the presence, source and/or cause of any unacceptable status or condition of the asset 12. The decision model 50 provides the operating mode partitioned fault classification model 56 that in turn provides the fault classification submodel 57 that is used to classify any unacceptable status or condition of the asset 12. The fault classification submodel 57 in general uses the fault classification procedure 76 to classify the indications of faults. The specific fault classification submodel 57 selected from the decision model 50 and used by the fault classification procedure 76 is dependent on the operating mode determined by the operating mode determination procedure 26.

The results of the fault classification are thereafter communicated by a conventional communications link 80 (as is known to those having ordinary skill in the art, and informed by the present disclosure) to an operator console 82 or automated process control system 84 for possible alarm and/or control action.

The computer 44 along with its typically associated memory means can also be employed to perform the training and surveillance procedures 20, 60 as delineated supra and to store all the data associated with these procedures, for example, the historical operating data, the training data and decision model.

MSET Procedure:

In an embodiment of the invention, the method used for parameter estimation is a multivariate state estimation technique (MSET) procedure. The US Department of Energy's Argonne National Laboratory developed the implementation of MSET described herein for surveillance of sensors and components in nuclear power plant applications. However, other implementations of a multivariable state modeling technique, for example multivariable linear regression, are possible and useful in conjunction with the instant invention. MSET is in general a statistically derived parameter estimation algorithm that uses advanced pattern recognition techniques to measure the similarity or overlap between signals within a defined operational domain wherein the domain is defined by a set of operating examples. MSET "learns" patterns among the signals by numerical analysis of historical process operating data. These learned patterns or relationships among the signals are then used to estimate the expected signal values that most closely corresponds with a new signal data observation. By quantifying the relationship between the current and learned states, MSET estimates the current expected response of the process signals. MSET parameter estimates are then used with a form of statistical hypothesis testing, such as the sequential probability ratio test (SPRT) or similar probability ratio test algorithm (as shown in U.S. Pat. No. 5,459,675 and which is hereby incorporated by reference in its entirety) to compare the current estimated value of a signal with its observed value. The statistical hypothesis comparison test provides a sensitive and widely applicable method to detect a fault or failure in an asset. However, other implementations of the comparison test are possible and useful in conjunction with the instant invention.

An MSET parameter estimation model is created for the asset 12 using the MSET training algorithms to learn the inherent data relationships within a set of historical process operating data. A SPRT fault detection model is calibrated using the MSET parameter estimation model and the set of historical process operating data. The trained MSET model is then used with the MSET parameter estimation procedure and the SPRT fault detection procedure to perform the process surveillance function when presented with a new observation of signal data values. The following sections will first provide a mathematical overview of the MSET algorithms and procedures useful for training a parameter estimation model and for using this trained model for process surveillance. The description is followed by a detailed description of a preferred embodiment of the instant invention using a novel operating mode partitioned parameter estimation model for asset surveillance.

Description of the MSET Training and Surveillance Procedures:

The MSET methods are generally described in the following two US Government documents produced and maintained by the US Department of Energy's Argonne National Laboratory, Argonne, Ill., disclosure of which is incorporated in its entirety herein by reference. The MSET methods were embodied in MSET software provided by Argonne National Laboratory under NASA Contracts NAS4-99012 and NAS13-01001 and were not modified or in themselves improved for the purposes of a-preferred embodiment.

J. P. Herzog, S. W. Wegerich, R. M. Singer, and K. C. Gross, "Theoretical Basis of the Multivariate State Estimation Technique (MSET)," Argonne National Laboratory, ANL-NT-49, December 1997.

J. P. Herzog, S. W. Wegerich, K. C. Gross, and R. M. Singer, "MSET: Code Structure and Interface Development Guide," ANL-NT-48, August 1997.

The MSET algorithm uses pattern recognition with historical operating data from an asset to generate one form of a parameter estimation model. If data are collected from a process over a range of operating points, these data can be arranged in matrix form, where each column vector (a total of m) in the matrix represents the measurements made at a particular point. Thus, this matrix will have the number of columns equal to the number of operating points at which observations were made and the number of rows equal to the number of measurements (a total of n signal data values) that were available at each observation. We begin by defining the set of measurements taken at a given time $t_j$ as an observation vector $X(t_j)$, $$\vec{X}(t_j) = [x_1(t_j), x_2(t_j), \ldots, x_n(t_j)]^T \quad (1)$$

where $x_i(t_j)$ is the measurement from signal i at time $t_j$. We then define the data collection matrix as the process memory matrix D:

$$\vec{D} = \begin{bmatrix} d_{1,1} & d_{1,2} & \cdots & d_{1,m} \\ d_{2,1} & d_{2,2} & \cdots & d_{2,m} \\ & & \vdots & \\ d_{n,1} & d_{n,2} & \cdots & d_{n,m} \end{bmatrix} \equiv [\vec{X}(t_1), \vec{X}(t_2), \ldots, \vec{X}(t_m)] \quad (2)$$

Each of the column vectors $(X(t_j))$ in the process memory matrix represents an operating point of the process. Any number of observation vectors can be assigned to the process memory matrix. Training an MSET model includes collecting enough unique observation vectors from historical operation of the process during normal conditions such that the process memory matrix encompasses the full dynamic operating range of the process. Computation of the D matrix is the first of three steps in the method for training an MSET model based on historical operating data.

One of at least two algorithms is used by MSET to select the vectors in the D matrix. The MinMax algorithm extracts vectors that bound the vector space defined by the training data and returns the smallest process memory matrix that will produce an effective system model (see also U.S. Pat. No. 5,764,509 and which is hereby incorporated by reference in its entirety). The Vector Ordering algorithm selects and includes representative vectors from the inner regions of the vector space producing a more accurate system model.

Once the process memory matrix has been constructed, MSET is used to model the dynamic behavior of the system. For each current observation of the system $(X_{obs})$, MSET compares the observation vector to the stored operating points to calculate an estimate of the process parameter values. The parameter estimate of the current process state $(X_{est})$ is an n-element vector that is given by the product of the process memory matrix and a weight vector, W:

$$\vec{X}_{est} = \vec{D} \cdot \vec{W} \quad (3)$$

The weight vector represents a measure of similarity between the estimate of the current operating point and the elements of the process memory matrix. To obtain the weight vector, we minimize the error vector, R, where:

$$\vec{R} = \vec{X}_{obs} - \vec{X}_{est} \quad (4)$$

The error is minimized for a given operating point when:

$$\vec{W} = (\vec{D}^T \otimes \vec{D})^{-1} \cdot (\vec{D}^T \otimes \vec{X}_{obs}) \quad (5)$$

This equation represents a "least squares" minimization when the pattern recognition operator $\otimes$ is the matrix dot product. The Argonne MSET software includes a choice of several pattern recognition operators that provide excellent parameter estimation performance (for example, see U.S. Pat. No. 5,764,509 and U.S. Pat. No. 5,987,399 each hereby incorporated by reference in their entirety).

Once the weight vector is found, the resulting current estimate of the signal data values (i.e., the parameter estimate vector) is given by:

$$\vec{X}_{est} = \vec{D} \cdot (\vec{D}^T \otimes \vec{D})^{-1} \cdot (\vec{D}^T \otimes \vec{X}_{obs}) \quad (6)$$

The first application of the pattern recognition operator in equation (6) ($D^T \otimes D$) involves a comparison between the row vectors in the $D^T$ matrix and each of the column vectors in the D matrix. If we define $G = D^T \otimes D$, then G, the similarity matrix, is an m by m matrix. The element in the i-th row and j-th column of the matrix ($g_{i,j}$) represents a measure of the similarity between the i-th and j-th column vectors (i.e., memorized operating points) in the process memory matrix. The second application of the pattern recognition operator in equation (6) ($D^T \otimes X_{obs}$) involves a comparison between the row vectors in the $D^T$ matrix and each of the elements in the observation vector $X_{obs}$. If we define $A = D^T \otimes X_{obs}$, then A, the similarity vector, is an m by 1 vector. Each element in the similarity vector is a measure of the similarity between the observation vector and the i-th column vector (i.e., memorized operating points) in the process memory matrix.

Note that the similarity matrix is a function of the process memory matrix only. Thus, the similarity matrix and its inverse $Ginv = (D^T \otimes D)^{-1}$ can be calculated as soon as the process memory matrix has been derived thereby making the application of MSET to an on-line surveillance system more computationally efficient. Computation of the Ginv matrix initializes the parameter estimation model and completes the second of three steps in the procedure for training an MSET model based on historical operating data.

The third and final step in the training procedure includes analyzing the historical training data using equation (6) to characterize the expected statistical mean and variance of the residual error vector, R, for each signal parameter in the observation vector. The resulting mean vector, M, is later used in the surveillance procedure to normalize the residual error for each observation evaluated using the statistical hypothesis test fault detection procedure. The resulting variance vector, V, is later used at the beginning of the surveillance procedure to initialize the fault detection threshold values used in the statistical hypothesis test fault detection procedure.

Figure 10:
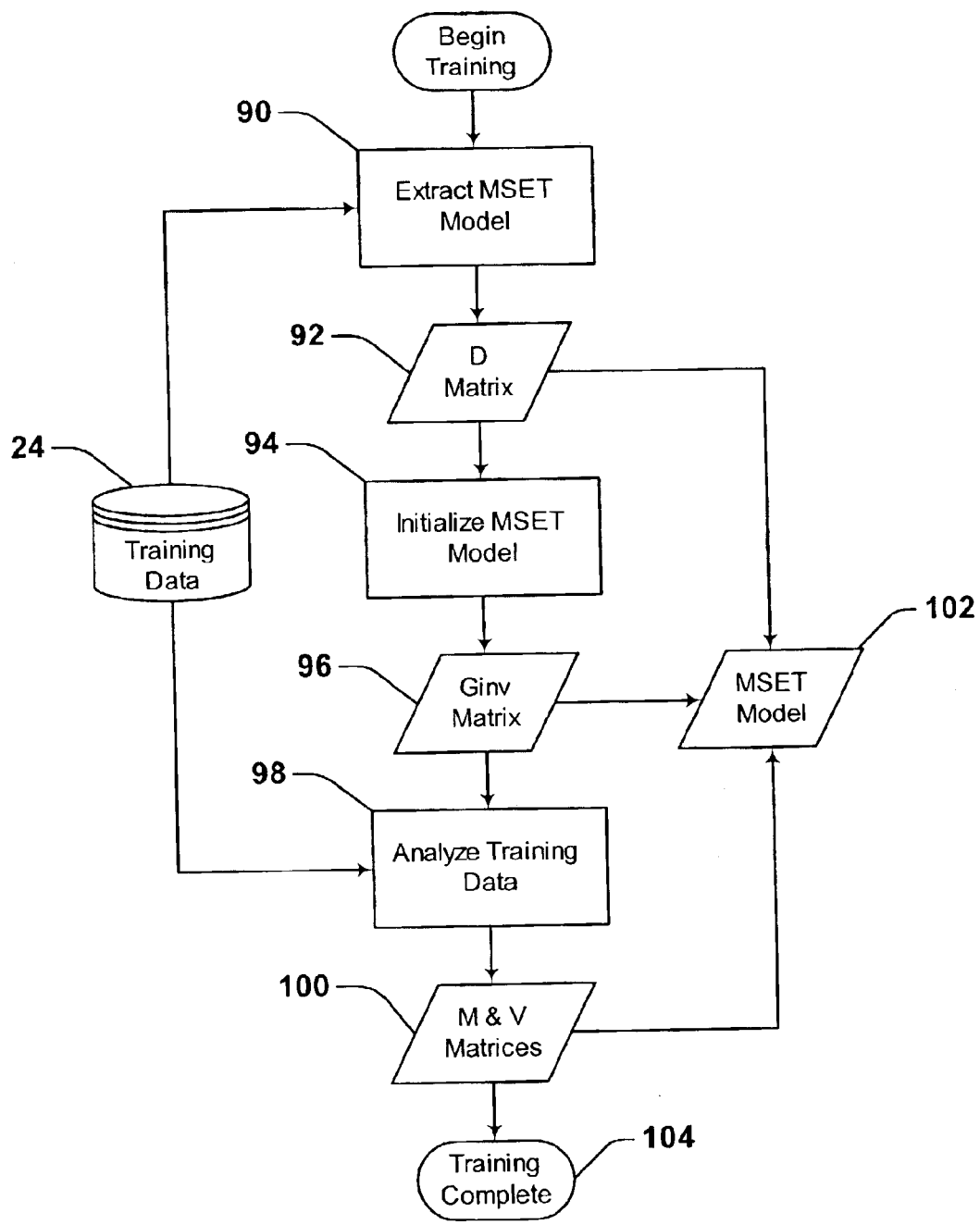
FIG. 10 is a schematic functional flow diagram of a method and system for an unpartitioned MSET training procedure.

FIG. 10 illustrates the procedure for training an MSET parameter estimation model. The procedure is used to produce an unpartitioned MSET model 102 that is not partitioned by operating mode. The MSET training procedure developed by Argonne National Laboratory (ANL) as described herein is embodied in one instance within the ANL software modules known as train.c and sys_mod.c. As described herein above, the MSET training procedure begins with a MSET model extraction procedure 90 used to populate a process memory matrix 92 (D) from the training data set 24 (historical process operating data). The MSET model extraction procedure 90 makes use of at least one of a plurality of observation vector extraction methods embodied in one instance within the ANL train.c software module, including but not limited to the MinMax method, and the Vector Ordering method. A MSET model initiation procedure 94 is the second step of the method and is used to initialize the MSET decision model by the computation of a inverse similarity matrix 96 (Ginv). The MSET model initiation procedure 94 makes use of at least one of a plurality of pattern recognition operator methods embodied in one instance within the ANL sys_mod.c software module, including but not limited to the SSA method, the BART method, the VPR method, the VSET method, and the PSEM method. The third step of the MSET training procedure uses the process memory matrix 92 and the inverse similarity matrix 96 to perform a MSET training data analysis procedure 98 using the training data set 24. The training data analysis procedure 98 uses the MSET model to computes the residual error mean and variance vectors 100 (M and V, respectively) over the training data. The training procedure is in general performed once for the training data set 24 thus preparing an unpartitioned MSET model 102 for use in the MSET surveillance procedure.

In the MSET surveillance procedure, new operating data observations are evaluated sequentially using the unpartitioned MSET model 102 for the purposes of validating the data or discerning an anomalous (not normal) process operating condition. For each new observation vector, $X_{obs}$, presented to the MSET parameter estimation method, the expected operating state having the greatest similarity to the current observed state is returned as a parameter estimate vector, $X_{est}$. Diagnostic decisions are then made on the basis of the difference (residual error) between the observed and estimated values for at least one process signal parameter contained in the estimate vector. Fault indications are determined using at least one of a plurality of fault detection methods including, but not limited to, a threshold limit test method, a Sequential Probability Ratio Test (SPRT) method, and a Bayesian Sequential Probability (BSP) test method to produce a fault indication based on the value of the residual error for at least one process parameter.

Figure 11:
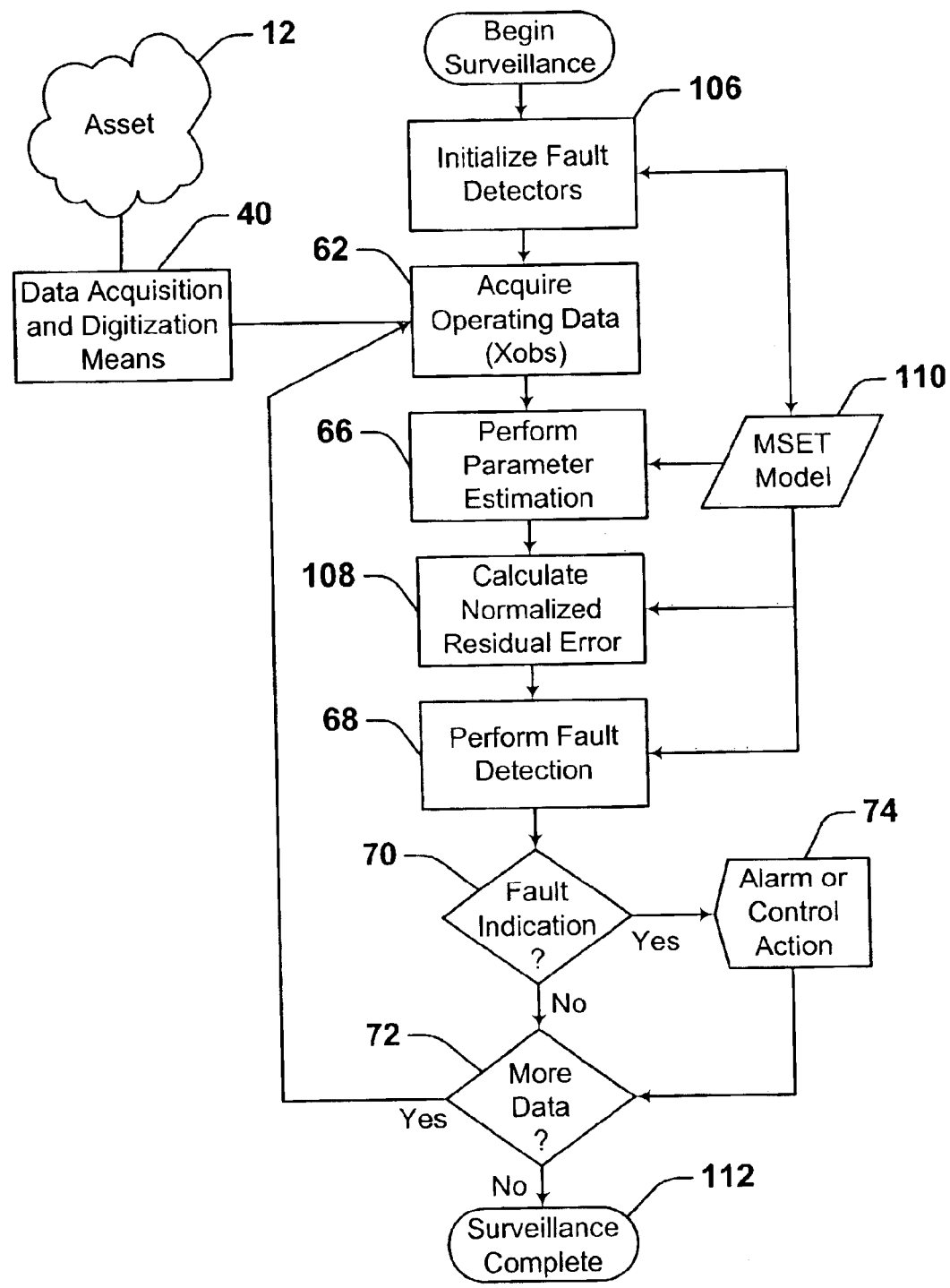
FIG. 11 is a schematic functional flow diagram of a method and system for an unpartitioned MSET surveillance procedure.

FIG. 11 illustrates the method and system for MSET-based surveillance. The MSET surveillance methods as described herein are embodied in one instance within the ANL software modules known as sys_mod.c and fault_detect.c. Prior to performing surveillance for new operating data observations, a MSET fault detector initialization procedure 106 is performed. The MSET fault detector initialization procedure 106 takes the variance (V) vector 100 and several other constants as its arguments. The initialization procedure makes use of one of a plurality of fault detection methods embodied in one instance within the ANL fault_detect.c software module, including but not limited to the SPRT method, and the BSP method. The MSET surveillance procedure then proceeds by sequentially acquiring and evaluating each new data observation until such time as surveillance is completed. Data observations are acquired using the observation acquisition procedure 62. For each new observation vector, $X_{obs}$, a parameter estimate vector, $X_{est}$, is produced by the parameter estimation procedure 66 using the unpartitioned MSET model 102 with the same pattern recognition operator that was used in the MSET training procedure. The residual error vector, R, is computed and is then normalized using a residual value normalization procedure 108 that includes subtracting the mean (M) vector 100 from the value of the residual error. The normalized residual vector is then evaluated using the same fault detection procedure 68 that was initialized at the start of the MSET surveillance procedure. If the fault detection procedure 68 results in a fault determination by the fault indication decision procedure 70, the alarm or control action procedure 74 communicates the fault information by the conventional communications link 80 (not shown) to the operator console 82 (not shown) and/or automated process control system 84 (not shown) for corrective action. In the fault indication decision procedure 70, a Bayesian conditional probability test is in general used to reach a fault decision based on a series of fault detection results from the fault detection procedure 68. The surveillance procedure then repeats for as long as the more data decision procedure 72 determines that additional surveillance data is available.

Limitations of the MSET Training and Surveillance Method and System:

In the method and system described above, MSET is trained by the construction of a process memory matrix, D, based on historical operating data containing a collection of normal operating points of the process. MSET creates the process memory matrix by selecting representative process data observations (herein termed observation vectors) that characterize the dynamic patterns inherent across all operating points of the process. However, if the process can operate in two or more distinct modes of operation, then the totality of operating points for all possible operating modes must be represented in the process memory matrix to produce an effective MSET model. As the number of distinct operating modes of process operation represented in the training data increases, one of two limitations occur:

Limitation 1. If the total number of observation vectors in the process memory matrix is fixed, then the number of data patterns used to represent any single operating mode of a process decreases. This directly reduces the accuracy of MSET's parameter estimates, which may result in false alarms or reduce the ability of the fault detection procedure to reliably detect subtle sensor failures or other process anomalies.

Figure 12:
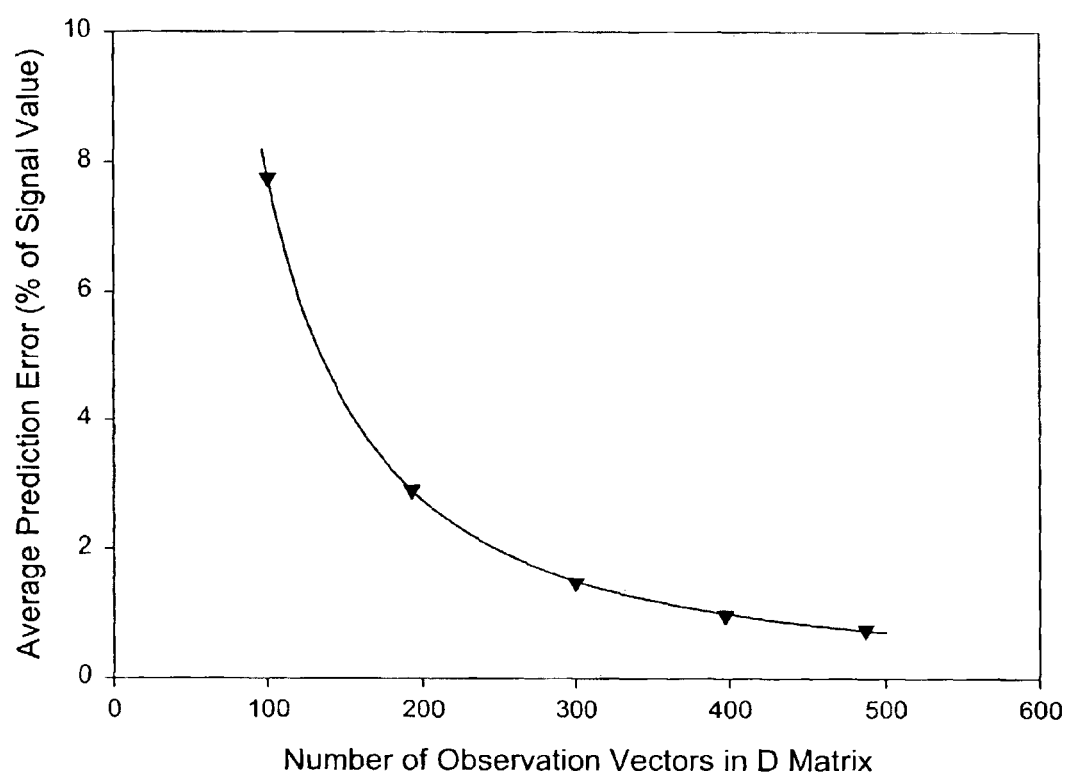
FIG. 12 illustrates the relationship between the overall MSET parameter estimation error and the number of observation vectors used in the process memory matrix when unpartitioned parameter estimation methods are used for MSET training and surveillance.

The parameter estimation accuracy of the MSET algorithm is in general an inverse power law function of the number of vectors in the process memory matrix. Limitation 1 is evident in the example of FIG. 12 that illustrates the overall parameter estimation error versus the number of vectors in the process memory matrix for an unpartitioned MSET model of six Space Shuttle Main Engine sensors.

Limitation 2. Allowing the number of observation vectors in the process memory matrix to increase ameliorates Limitation 1 above, but incurs a computational performance cost. The number of computer operations required for MSET to produce a parameter estimate scales with the square of the number of observation vectors stored in the process memory matrix. This is because the MSET parameter estimation algorithm must perform pattern matching between the current operating data vector and each element of the process memory matrix. Pattern matching uses the Ginv matrix, the size of which increases as the square of the number of observation vectors. Processing time for MSET parameter estimation has been empirically shown to follow a square law equation of the form:

$$\text{Observation processing time (msec)} = A + B*[\text{Number of observation vectors in } D]^2 \quad (7)$$

Figure 13:
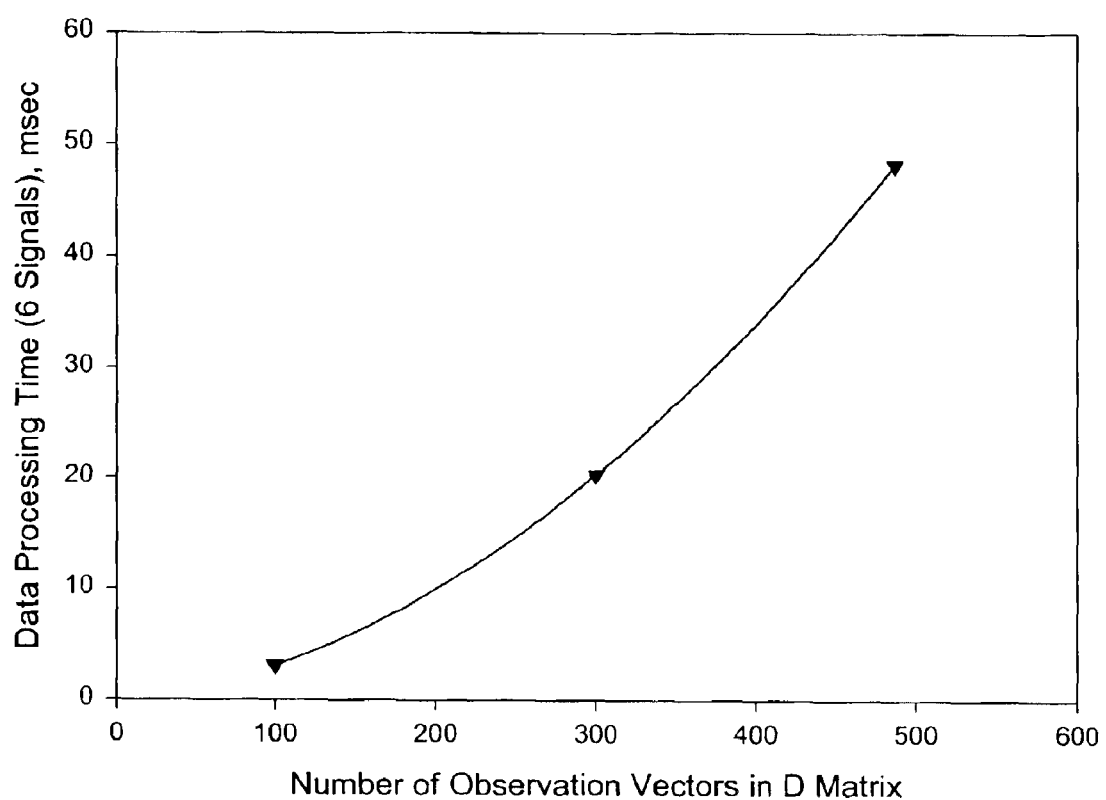
FIG. 13 illustrates the relationship between the data processing time required for producing an MSET parameter estimate and the number of observation vectors used in the process memory matrix when unpartitioned parameter estimation methods are used for MSET training and surveillance.

Limitation 2 is evident in the example of FIG. 13 that illustrates the overall MSET parameter estimation processing time on a 300-MHz Pentium II desktop computer versus the number of vectors in the D matrix for an unpartitioned MSET model of six Space Shuttle Main Engine sensors.

Novel Improvements to the MSET Training and Surveillance Procedures:

Having described the MSET training and surveillance methods herein above, this section describes the novel improvements made by the instant invention when used for MSET training and surveillance, the improvements being applicable to any asset preferably having at least two distinct modes of operation. It is explained herein above that it is beneficial to minimize the number of vectors in the process memory matrix in order to optimize the processing speed of the MSET algorithm. It is further explained herein above that the MSET methods require a trade-off to be made between processing time and parameter estimation accuracy. In the worst case, this trade-off results in unacceptable performance for a process surveillance application. The novel solution to this problem made by the instant invention is to use multiple coordinated MSET parameter estimation submodels, with each submodel trained over a limited operating mode state space. With the instant invention, each submodel may be defined to contain only the minimum number of observation vectors required to adequately characterize a single specific operating mode or related subset of modes. Since only one submodel must be evaluated for each data observation presented to MSET during the surveillance procedure, both parameter estimation accuracy and processing speed are greatly improved.

The following example illustrates an unobvious benefit of the instant invention. Consider a process that requires on-line surveillance across multiple modes of operation. Further consider that the safety or other critical nature of the surveillance requires fault decision performance within a time interval that allows for on-line MSET processing with a process memory matrix containing at most 100 vectors. However, further suppose that the desired fault detection accuracy requires on-line MSET parameter estimation with a process memory matrix containing 300 vectors to adequately characterize the operating mode state space. In the prior art, both criteria could not be simultaneously satisfied. The instant invention solves this problem for many types of processes and apparatuses by enabling the decision model designer to partition the operating mode state space and thus produce three 100 vector submodels providing the desired level of fault detection sensitivity (300 vectors) while having a processing speed comparable to the 100 vector model. This implementation requires only the addition of an operating mode determination procedure that selects the appropriate submodel for each new observation presented to the system and does not require a change to the MSET method itself.

Improved Training Procedure:

The combination of an MSET parameter estimation model 52 with an associated SPRT fault detection model 54 is herein termed an MSET decision model 50. An MSET decision model is one of a plurality of possible implementation specific instances of the decision model 50.

Figure 14:
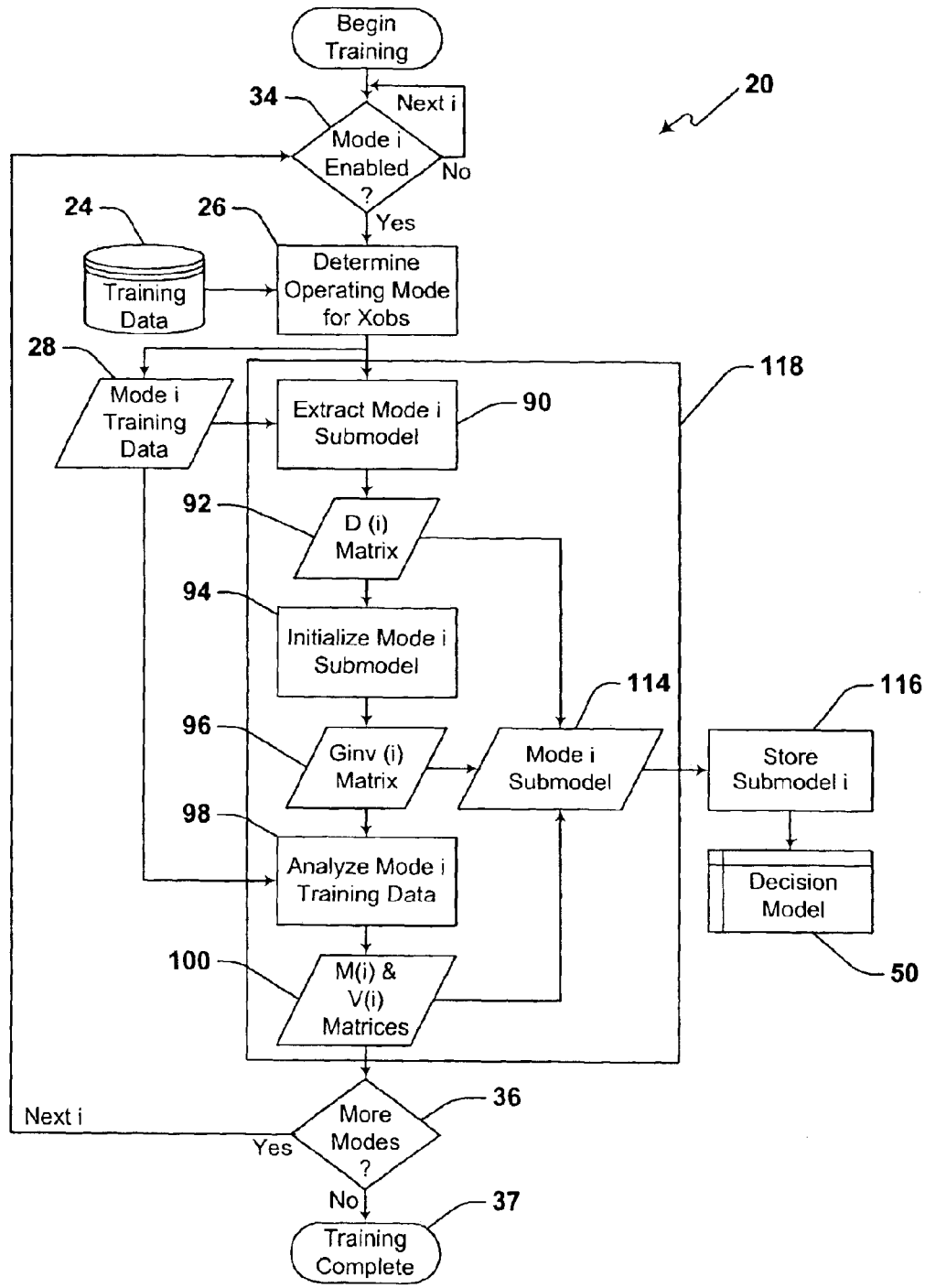
FIG. 14 is a schematic functional flow diagram of the training procedure for an embodiment using an operating mode partitioned collection of MSET parameter estimation submodels in an embodiment of the invention.

FIG. 14 illustrates the training procedure 20 useful for producing one form of decision model 50 or specifically a MSET decision model 50 in accordance with the instant invention. The training procedure includes and modifies the MSET training methods described in FIG. 10 and illustrated in FIG. 14 as MSET training procedure 118. With the instant invention, the model designer may now individually specify those operating modes for which MSET and SPRT training and surveillance is enabled. The training procedure loops through each defined operating mode with the loop controlled by the mode enabled decision procedure 34 and the more modes decision procedure 36. If the operating mode is enabled, a MSET decision submodel 114 is created (this is a specific example of parameter estimation submodel creation procedure 29 and fault detection submodel creation procedure 30 when employing MSET and SPRT) for the operating mode. In order to create the MSET decision submodel 114, the operating mode specific training data subset 28 is first extracted from the training data set 24 using the operating mode determination procedure 26. This operating mode specific training data subset 28 is then used to create the MSET decision submodel 114 using the same procedures used in the MSET training procedure 118 to create an unpartitioned MSET model. Specifically, the MSET procedures used in sequence are the MSET model extraction procedure 90 to produce the process memory matrix 92, the MSET model initialization procedure 94 to produce the inverse similarity matrix 96, and the MSET training data analysis procedure 98 to produce the residual mean and variance vectors 100 used by the SPRT fault detection procedure. Note that this series of procedures is grouped in the general case as the parameter estimation submodel creation procedure 29 and fault detection submodel creation procedure 30. The process is repeated with each loop including a MSET decision submodel storage procedure 116 to add the MSET decision submodel 114 to the MSET decision model 50 for each enabled operating mode. At the conclusion of the training procedure 20, the operating mode partitioned MSET decision model 50 includes an array of individual MSET decision submodels 114, one for each enabled operating mode.

The MSET decision model 50 is a collection of the operating mode specific MSET decision submodels. The MSET decision model 50 includes the following at a minimum:

A set of process memory matrices 92 (D), one for each enabled operating mode;

A set of inverse similarity matrices 96 (Ginv), one for each enabled operating mode; and A set of residual mean and variance vectors 100 (M and V), one for each enabled operating mode.

Working together these decision submodels provide parameter estimation and fault detection over the entire operating mode state space that the designer has selected for surveillance. An additional novel feature of the instant invention is that each of the decision submodels in the MSET decision model 50 may be of unique dimensions that is, each submodel may contain unique numbers of modeled signal parameters and process memory matrix vectors. A decision submodel's dimensions may be different than the dimensions selected for any other operating mode thereby permitting the unobvious benefit of further optimizing the MSET method and system for the surveillance requirements of each individual operating mode of the asset. This is important because certain modes of process operation are often more performance or safety critical than others.

An additional novel feature of the instant invention is that in general each of the submodels in the decision model 50 may also be specified with unique parameter estimation and fault detector settings for each operating mode. This provides the unobvious benefit of optimizing surveillance sensitivity and performance by operating mode. Examples of optimization by operating mode include, but are not limited to, the following:

Selection of the parameter estimation and training algorithm by operating mode;

Selection of the fault detection algorithm by operating mode;

Selection of the fault detection procedure false alarm probability, missed alarm probability, system disturbance magnitude values, or other threshold constants by operating mode;

Selection of the fault classification procedure algorithm and associated thresholds and constants by operating mode.

Figure 15:
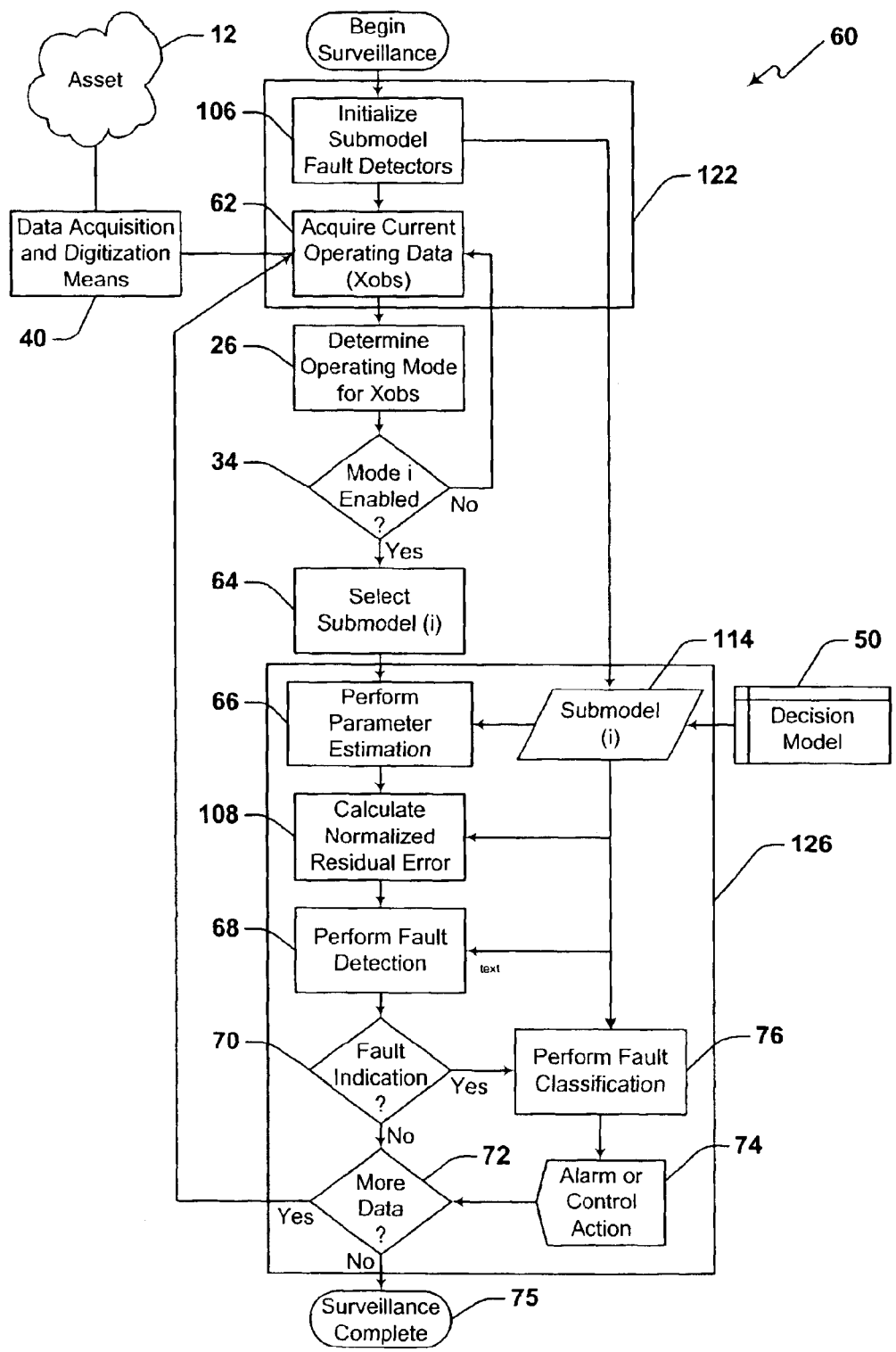
FIG. 15 is a schematic functional flow diagram of the surveillance procedure for an embodiment using an operating mode partitioned collection of MSET parameter estimation submodels in an embodiment of the invention.

Novel Improvements to the Parameter Estimation Procedure:

FIG. 15 illustrates a novel method and system for the surveillance procedure 60 using the MSET decision model 50 as delineated hereinabove. The surveillance procedure 60 includes and modifies the surveillance methods described in FIG. 11 and illustrated in FIG. 15 as MSET surveillance procedure 122, 126. With the instant invention, the model designer may now individually specify those operating modes for which MSET surveillance is enabled.

At the beginning of the surveillance procedure, the fault detection procedures are initialized for each enabled decision submodel. Initialization of each MSET decision submodel 114 uses the same fault detector initialization procedure 106 used for initialization of the unpartitioned model 102. The surveillance procedure thereafter includes an open-ended loop for data acquisition and surveillance processing that is terminated by the more data decision procedure 72.

During surveillance, each new vector of observed signal data values, $X_{obs}$, is acquired using the data acquisition procedure 40 and the observation acquisition procedure 62. Next, the operating mode determination procedure 26 is used to determine the operating mode for each new data observation, $X_{obs}$, acquired from the asset 12. If the new data observation is determined by the mode enabled decision procedure 34 to represent an operating mode that is not enabled for surveillance, no further processing is required until the next data observation is acquired from the asset 12. Conversely, if the new data observation is determined to represent an enabled operating mode, the correct MSET decision submodel 114 is selected from the MSET decision model 50 using the decision submodel selection procedure 64 and all required decision submodel data is loaded into the computer memory. From this point, surveillance processing occurs using the same procedures previously described for the MSET method until a fault indication is encountered. The method of the instant invention uniquely includes the fault classification procedure 76 that was not previously used in conjunction with MSET. Once surveillance processing is completed, the procedure returns to acquire a new data observation from the asset 12.

An unobvious benefit of only performing processing for selected operating modes is that the MSET decision model does not need to provide parameter estimation capabilities for those operating modes that do not require on-line surveillance. For example, it may be desirable to exclude certain modes of operation (or non-operation) from the MSET decision model even though such modes are included within the training data. The ability to explicitly exclude operating modes that do not require surveillance simplifies the training data acquisition procedures and minimizes the on-line processing time required for a parameter estimation based surveillance method.

While an MSET procedure is described herein above, any type of parameter estimation procedure can be used with the instant invention. The novelty described infra is not a modification or improvement to the MSET procedure, but is rather a new means of using any parameter estimation procedure so as to more effectively accomplish the asset surveillance objective.

SPRT Fault Detection Procedure:

Parameter estimation techniques, such as delineated hereinabove, can provide an extremely accurate estimate of asset signals. The difference between the current estimates and the current signal observations provides a set of residual values used as the indicator for sensor and equipment faults. Instead of using standard threshold limits to detect fault conditions (i.e., declaring a fault indication when a signal's residual value exceeds a preset threshold), we have demonstrated excellent fault detection performance using a sequential probability ratio test (SPRT) fault detection procedure 68 in conjunction with the present invention.

The SPRT algorithm is one instance of a family of likelihood ratio tests that improve the threshold detection process by providing more definitive information about validity using statistical hypothesis testing. The SPRT technique is based on user-specified false alarm and missed alarm probabilities, allowing control over the likelihood of missed detection or false alarms. The SPRT technique provides a superior surveillance tool because it is sensitive not only to disturbances in the signal mean, but also to very subtle changes in the statistical quality (variance, skewness, bias) of the signals. For sudden, gross failures of a sensor or component, the SPRT will indicate the disturbance as fast as a conventional threshold limit check. However, for slow degradation, the SPRT can detect the incipience or onset of the disturbance long before it would be apparent with conventional threshold limit checks.

The SPRT fault detection procedure monitors successive observations of a process by analyzing the stochastic components of the signal's residuals given by equation (4), above. Let $R_n$ represent the residual signal at a given moment $t_n$ in time. Then the sequence of values $\{R_n\}=\{R_0, R_1, \ldots R_n\}$ should be normally distributed with mean 0, when the asset is operating normally.

The first test utilized by the SPRT is a test for a change in the sequence mean, which declares that the signal is degraded if the sequence $\{R_n\}$ exhibits a non-zero mean, e.g., a mean of either $\pm M$ where M is the user-assigned system disturbance magnitude for the mean test. The SPRT will decide between two hypotheses: $H_1$, where the residual signal forms a Gaussian probability density function with mean M and variance $\sigma^2$; or $H_0$, where the residual signal forms a Gaussian probability density function with mean 0 and variance $\sigma^2$. If the SPRT accepts $H_1$, we declare that the residual signal is degraded (a fault is detected).

The SPRT fault detection procedure operates as follows. At each time step, a test index is calculated and compared to two threshold limits A and B. The test index is related to the likelihood ratio ($L_n$), which is the ratio of the probability that hypothesis $H_1$ is true to the probability that hypothesis $H_0$ is true:

$$L_n = \frac{\text{Probability of sequence}\{R_n\}\text{given } H_1 \text{ true}}{\text{Probability of sequence}\{R_n\}\text{given } H_0 \text{ true}} \quad (8)$$

If the likelihood ratio is greater than or equal to the upper threshold limit (i.e., $L_n \geq B$), then it can be concluded that hypothesis $H_1$ is true. If the likelihood ratio is less than or equal to the lower threshold limit (i.e., $L_n \leq A$), then it can be concluded that hypothesis $H_0$ is true. If the likelihood ratio falls between the two limits (i.e., $A<L_n<B$), then neither hypothesis can be concluded to be true and sampling continues.

The SPRT technique allows the user to specify the targeted likelihood of missed detection or false alarm. The following expressions relate the threshold limits to the misidentification probabilities:

$$A = \frac{\beta}{1-\alpha} \text{ and } B = \frac{1-\beta}{\alpha} \quad (9)$$

where $\alpha$ is the probability of accepting $H_1$ when $H_0$ is true (i.e., the false alarm probability) and $\beta$ is the probability of accepting $H_0$ when $H_1$ is true (i.e., the missed detection probability).

Assuming that the residual signal $\{R_n\}$ is normally distributed, the likelihood ratio $L_n$ is given by:

$$L_n = \exp\left[\frac{-1}{2\sigma^2}\sum_{k=1}^{n} M(M-2r_k)\right] \quad (10)$$

Defining the SPRT index for the mean test to be the exponent in equation (10), $$SPRT_{mean} = \frac{-1}{2\sigma^2}\sum_{k=1}^{n} M(M-2r_k) = \frac{M}{\sigma^2}\sum_{k=1}^{n}\left(r_k - \frac{M}{2}\right) \quad (11)$$

Then by taking the natural logarithms of equations (9) and (10) the sequential sampling and decision strategy can be concisely represented as:

If $SPRT_{mean} \leq \ln(\beta/(1-\alpha))$, then accept hypothesis $H_0$ as true, If $\ln(\beta/(1-\alpha)) \leq SPRT_{mean} \leq \ln((1-\beta)/\alpha)$, then continue sampling, and If $SPRT_{mean} \geq \ln((1-\beta)/\alpha)$, then accept hypothesis $H_1$ as true.

Two indices are calculated for each of the sequential hypothesis tests. For the mean test, an index is calculated for both positive and negative values of the system disturbance magnitude, M. The system disturbance magnitude for the mean test specifies the number of standard deviations the residual signal must shift in the positive or negative direction to trigger an alarm.

The implementation of SPRT is originally described in Wald and Wolfowitz, "Optimum Character of the Sequential Probability Ratio Test," Ann. Math. Stat., 19, 326 (1948), disclosure of which is incorporated herein by reference.

Limitations of Prior Fault Detection Procedures

Threshold limit tests, SPRTs and related techniques for fault detection are of great practical use in the field of asset surveillance and equipment condition monitoring. Many practitioners report their applications and value in a wide range of deployments. The majority of such deployments use threshold limit tests; however, more recently SPRTs and related techniques have come into significant use.

A limitation of all prior fault detection techniques has been the inevitable trade off between false alarm rate and missed detection rate. When set too sensitively, the fault detector alarms as desired when actual fault conditions occur but might also alarm when normal process variations exceed the detector's alarm limits (false alarms). When set too conservatively, the fault detector does not false alarm as readily but the detection of an actual fault condition is most often delayed or missed.

The trade off between false alarm rate and missed detection rate is aggravated when the asset is monitored over a range of operating modes. In practice, transient modes and certain operating modes will commonly imbue greater levels of uncertainty in the observed asset signals due to noise, bias, lead/lag, and other effects than will other operating modes. The practical result is increased uncertainty in both the current observed signal and in the parameter estimation model developed from training data signals. This leads to larger residuals in some asset operating modes than in others. Using a single set of alarm limits for fault detection results in higher false alarm rates for noisy operating modes and higher missed alarm rates for less noisy operating modes.

Novel Improvements to the Fault Detection Procedure

Since fault detection tests commonly operate on a mathematical function of the residuals or other evaluation of the observed signal, the alarm limits used for the fault detection tests are more accurate and consistent when a separate set of alarm limits are provided for each operating mode of the asset. The method and system of the instant invention uniquely provides this capability.

While a SPRT procedure is described herein above, any type of fault detection procedure can be used with the instant invention. The novelty described infra is not a modification or improvement to the SPRT procedure, but is rather a new means of using any existing fault detection procedure so as to more effectively accomplish the asset surveillance objective.

BBN Fault Classification Procedure

Bayesian belief networks (BBNs) are applied in Decision Theory under various names, including Causal Probabilistic Networks, Causal Nets, and Probabilistic Influence Diagrams. BBN methods provide accurate calculations of expected false alarm and missed alarm rates, are resilient to missing information (e.g., instrumentation failures), and gracefully handle multiple failures. BBNs are based on the calculus of probabilities and provide the mathematical formalism whereby engineering judgment may be expressed as the degree of belief in an outcome given a set of observations. They have been used in a wide variety of applications to represent probabilistic knowledge for automated reasoning. Using Bayesian probability theory, it is possible to capture engineering knowledge about the dependencies between variables and to propagate consistently and quantitatively the impact of evidence for diagnosing the current condition of an asset. Specifically, belief networks are graphical representations of a joint probability distribution in which the graph nodes represent discrete-valued random variables and the arcs between nodes represent influences between variables.

The BBN is one example of a fault classification procedure 76 that might be used in conjunction with the instant invention. Other examples include, but are not limited to, procedural logic, rule-based expert systems, blackboard expert systems, decision trees, determined similarity methods, various forms of probabilistic networks and neural networks. We use a belief network to capture our knowledge about an asset and its operation. A key characteristic of a BBN is its ability to deal with the inherent uncertainty in our knowledge about a monitored asset. The process of building an application-specific belief network is as follows:

Define the nodes—define the model variables to be observed or predicted;

Define the network topology—define the user's knowledge of the conditional dependence and independence between nodes;

Define the network's probability tables—quantify statistical knowledge, uncertainty, and the user's engineering judgments.

Once this knowledge is expressed, the belief network can perform fault classification by calculating the probability states of the predicted nodes from the tables of conditional and marginal probabilities and the states of the observed nodes.

Bayesian belief networks allow us to express our beliefs with a degree of uncertainty. In most cases, cause and effect relationships are not absolute, instead we hold a certain degree of belief in these relationships. For example, if we say "Birds fly." we accept that for the most part birds do, in fact, fly. However, ostriches don't fly, neither do penguins, birds with broken wings, or dead or injured birds. These exceptions prevent us from saying with 100% certainty that "Birds fly." It is much more accurate and more natural to say that we believe that "Birds fly most of the time." It is this ability to quantify the degree of belief in a proposition, which makes the BBN useful for a fault classification procedure.

Belief Networks Have Four Necessary Characteristics:

1. A belief network is built from nodes that represent variables that can take on multiple values or states. These nodes may represent the state of the sensors or fault detectors in the model, the cause of any fault, or a decision to be made based on the evidence for a fault.
2. Each of these nodes is connected to at least one other node by a directed link. The intuitive meaning of these links is that the parent has a direct influence on the child. For example, there is a greater probability that a bird will fly if it is not injured. These relationships are probabilistic as opposed to being deterministic and are the reason for a link between the "Birds fly" node and the "Injured" node. A lack of arcs indicates that the two variables are probabilistically independent. That is, one has no effect on the other. If birds fly regardless of the state of the stock market, there will be no link between "Birds Fly" and "Stock Market". We can also say that two nodes, which have one or more common parents but no link between them, are conditionally independent. Finally, a node is conditionally independent of its indirect predecessors given its immediate predecessors.
3. Each node has a conditional probability table that quantifies the effects of the parents on the children. For example, given that a bird is flying, what is the probability that it is injured? Nodes with no parents have a prior probability table.
4. There may be no directed cycles in the belief network.

A BBN model enables the probabilistic classification of asset fault events on the basis of the probabilities of other observable events. The belief network specifically enables expert judgment to be formalized so that one can specify a series of links of the form the 'truth of statement A supports my belief in statement B', and can also specify how much the truth of A strengthens this belief in B compared, for example, to how much some other truth C would weaken this belief in B. This information is described mathematically by giving the probabilities of the states of A conditional on those of B, or vice-versa, or via correlation coefficients between the states of A and B.

Bayesian belief networks are mathematically based on the science of probability. Bayes' law is based on the product rule which states that the probability of A and B is equal to the probability of A given B times the probability of B:

$$P(A \hat{} B) = P(A|B)P(B) \tag{12}$$

similarly, $$P(A \hat{} B) = P(B|A)P(A) \tag{13}$$

Combining these two equations yields Bayes' law:

$$P(A|B) = \frac{P(B|A)P(A)}{P(B)} \tag{14}$$

In the equation above, A denotes a particular fault and B is a fault indication event or alarm that has occurred. P(B) is the probability of event B occurring, and P(B|A) is the probability of B occurring given that A has already occurred. For example, given that a sensor has failed (event A), P(B|A) is the probability that the signal's fault detector will alarm (event B). P(B) is referred to as an a priori probability and P(B|A) is referred to as a conditional probability. If these probabilities are known, then we can calculate the probability of A occurring given that B has occurred, P(A|B).

In general, the indication that an event has occurred has multiple pieces of evidence. In that case, it can also be shown that if B is a set of events, $B_i$ then $$P(A|B) = \alpha P(A) \prod_i P(B_i|A) \tag{15}$$

where $\alpha$ is the normalizing constant.

When there are multiple levels to a belief net, we apply this same formula recursively to the parents, as:

$$P(x_1, x_2, \ldots, x_n) = \prod_i P(x_i | \Pi x_i) \tag{16}$$

where $\Pi x_i$ is the parent set of $x_i$.

The theory underlying the formulation and use of belief networks and related techniques for probabilistic reasoning is detailed in Judea Pearl, "Probabilistic Reasoning in Intelligent Systems: Networks of Plausible Inference," Morgan Kaufmann, 1988, the disclosure of which is incorporated herein by reference.

Limitations of Prior Fault Classification Procedures

Expert systems, belief networks and related techniques for probabilistic reasoning have been of limited practical use in the field of asset surveillance and equipment condition monitoring. While many authors and practitioners suggest their value, deployments are limited to cases where the asset behavior is steady and predictable. The majority of such deployments use rule-based expert systems having simple backward chaining schemes to classify faults on the basis of a limited number of observable data features.

Gross suggests the value of an AI (artificial intelligence) diagnostic/prognostic system in U.S. Pat. No. 5,764,509 and again in U.S. Pat. No. 6,181,975. However, Gross does not report a reduction to practice or state claims for such an AI diagnostic/prognostic technique despite the apparent desirability of doing so. Moreover, Gross does not conceive of the novelty described infra for operating mode partitioning of an AI diagnostic/prognostic system.

Takeuchi describes a rule-based diagnostic/prognostic system in U.S. Pat. No. 5,009,833. While Takeuchi claims operation of the rule-base on either observed or simulated data, he does not conceive of the novelty of comparing the observed signals to estimated signals for the purpose of fault detection nor does he conceive of the novelty of using the fault detection results as the observable inputs to his expert system. Moreover, Takeuchi does not conceive of the novelty described infra for operating mode partitioning of the rule-based diagnostic/prognostic system.

Gross describes a rule-based diagnostic system in U.S. Pat. Nos. 5,223,207, 5,459,675 and 5,761,090. Gross describes a SPRT fault detection means that operates on the residuals formed from redundant physical sensor signals. The SPRT fault detection means provides the observable inputs to his expert system. However, Gross does not conceive of the novelty of comparing the observed signals to estimated signals for the purpose of fault detection. Moreover, Gross does not conceive of the novelty described infra for operating mode partitioning of the fault detection means or of the rule-based diagnostic system In U.S. Pat. No. 5,274,572, O'Neill describes a blackboard expert system for asset surveillance but does not conceive of the novelty described infra for operating mode partitioning of the blackboard expert system. In U.S. Pat. No. 5,392,320, Chao describes a rule-based expert system for asset surveillance but does not conceive of the novelty described infra for operating mode partitioning of the rule-based expert system. In U.S. Pat. No. 5,402,521, Niida describes a neural network system for asset surveillance but does not conceive of the novelty described infra for operating mode partitioning of the neural network system. In U.S. Pat. No. 5,465,321, Smyth describes a hidden Markov model system for asset surveillance but does not conceive of the novelty described infra for operating mode partitioning of the hidden Markov model. In U.S. Pat. No. 5,680,409, Qin describes a principal component analysis system for asset surveillance but does not conceive of the novelty described infra for operating mode partitioning of the principal component analysis model.

Heger describes a Bayesian belief network (BBN) system for asset surveillance in U.S. Pat. No. 6,415,276 but does not conceive of the novelty described infra for operating mode partitioning. U.S. Pat. No. 6,415,276 provides a discussion of the use of belief networks for fault classification and is incorporated in its entirety herein by reference.

Novel Improvements to the BBN Fault Classification Procedure

Each of the fault classification procedures described in the section above might be improved by the novelty described infra for operating mode partitioning. Fault classification is improved by operating mode partitioning because operating mode partitioning allows a unique and possibly different set of faults to be classified within each operating mode and further allows the signature and probability of each fault type to be set differently within each operating mode. For example, faults having low probability of occurrence in one operating mode and a high probability of occurrence in another operating mode are more effectively classified separately. Further, the fault indication patterns that are indicative of an unacceptable asset condition might be set differently in one operating mode than in another (see for example, FIG. 7).

It is noteworthy that none of the practitioners enumerated above conceive of a method or system consisting of a unique combination of the following three elements:

1. A parameter estimation method and system for producing a current estimate of signal data values correlative to an observation of signal data values acquired from an asset;
2. A fault detection method and system for comparing one or more of the current estimates of signal data values to the corresponding observed signal data values acquired from an asset to produce fault indications; and
3. A fault classification method and system for determining the presence, cause and/or explanation of an unacceptable asset status or condition based on the fault indication results.

Moreover, it is noteworthy that none of these practitioners conceives of any method or system that further includes the fourth element as follows:

4. An operating mode partitioning method and system for providing more accurate and efficient performance of any of the three elements enumerated above by partitioning the characteristics of at least one of the three elements according to the expected operating modes of the asset.

Neural Network Method and System for Determining Operating Mode of Asset:

A method to determine the operating mode of the asset 12 is required for both the training procedure 20 and the surveillance procedure 60 using an operating mode partitioned decision model 50. For each new data observation, the operating mode determination procedure 26 must classify the observation as belonging to exactly one of a plurality of defined operating modes thereby allowing the required decision submodel to be selected for training or surveillance. The operating mode determination procedure 26 may use any form of algorithm that can determine the current operating mode of the asset 12 based on one or more data observations from the asset. The specific implementation or type of the operating mode determination procedure 26 does not affect or modify the operation of the instant invention.

In an embodiment of the invention, a Learning Vector Quantization (LVQ) neural network is used for the operating mode determination procedure 26. The LVQ neural network procedure is generally applicable to a wide range of assets. An LVQ neural network model is created for a specific asset using conventional neural network training algorithms to learn the inherent operating mode relationships within a set of historical process operating data. The trained LVQ model is then used to perform the operating mode determination procedure when presented with each new data observation. Because the LVQ neural network is trained by pattern matching a vector of observations from historical data, this type of neural network will always determine the most similar operating mode when presented with a new data observation.

An LVQ neural network is a two-layer, pattern classification neural network in which each output node represents a particular class or category.

Figure 16:
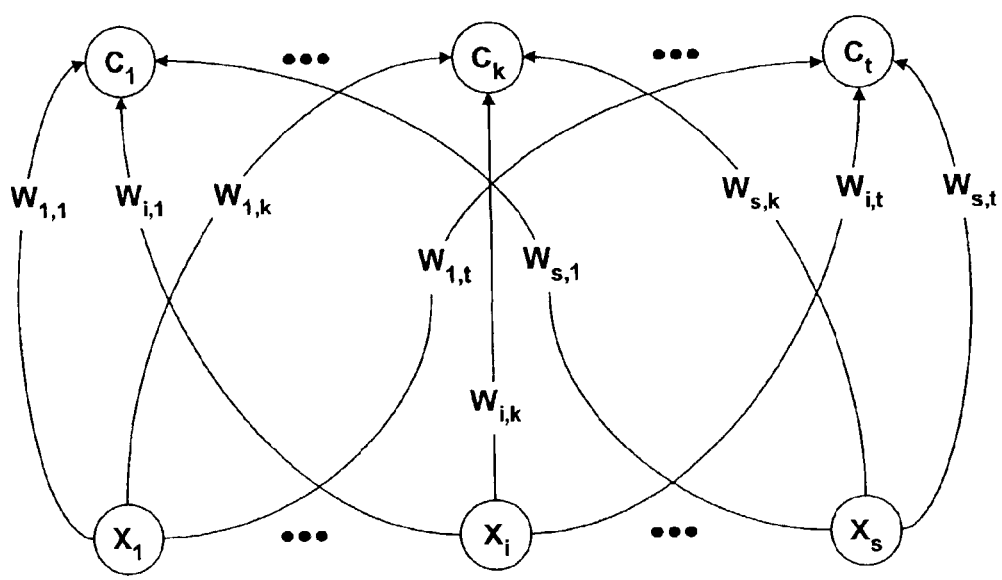
FIG. 16 is a schematic architecture diagram of a learning vector quantization neural network useful for determining the operating mode of an asset in an embodiment of the invention.

FIG. 16 illustrates the architecture of an LVQ neural network. An LVQ network is one of a group of related pattern classification neural network models that can be used to cluster a set of s-element input vectors $\{X\}=\{x_1, \ldots, x_i, \ldots, x_s\}$ into t clusters. The input nodes of the neural network draw data either directly from sensor signals or from the output of a mathematical function applied to one or more sensor signals. An input vector is defined as the set of data values, one value for each input node that is derived from the sensor signals at a given moment in time. The output nodes of the network correspond to one of the classes (herein, the operating modes) recognized by the neural network. During operation of the neural network, an input vector is presented to the network, passes through the network, and activates one of the t output nodes ($y_1, \ldots, y_j, \ldots, y_t$). Each of the output nodes corresponds to one of the classes recognized by the neural network. The LVQ neural network returns the class corresponding to the activated output node, thereby determining the current operating mode of the asset.

The input nodes are connected to the output nodes by a set of connection weights. The subset of connection weights that connect all of the input nodes to one of the output nodes is called a weight vector. For example, output node $y_j$ is connected to the input nodes by weight vector $\{W_j\}=\{w_{1,j}, \ldots, w_{i,j}, \ldots, w_{s,j}\}$. An LVQ neural network that contains s input nodes and t output nodes would contain a total of t weight vectors, with each weight vector containing s connection weights.

An LVQ neural network is designed to recognize a predefined set of classes. Each one of the classes corresponds to a distinct operating mode of the asset under surveillance. During training of an LVQ neural network, the designer decides how many output nodes will be used to model each of the operating modes classified by the network. More than one output node can be used to represent a class (operating mode) recognized by the neural network. By using more than one node to represent a class, the number of neural network connection weights dedicated to that class is increased. This improves the ability of the neural network to recognize an operating mode of the asset. For each of the r classes, the designer specifies the number of output nodes that will model that class.

A supervised training scheme is used for training an LVQ neural network. In this scheme, training is accomplished by presenting a sequence of matched pairs of input vectors and target vectors to the neural network, causing some of the network's connection weights to be adjusted with each presentation of a training pair. The target vector $\{T\}=\{t_1, \ldots, t_i, \ldots, t_t\}$ is a set of binary values, one value for each output node in the network. An element of a target vector has a value of one if the corresponding output node represents the correct class for the input vector. Conversely, an element of a target vector has a value of zero if the corresponding output node represents an incorrect class for the input vector.

For each training pair presented to the LVQ network, the Euclidean distance between the input vector and each of the weight vectors is calculated. The Euclidean distances are then ordered, from smallest to largest. Only the weight vectors that produce the smallest two distances in the ordered sequence are allowed to learn. This form of learning is called competition, because only those weight vectors that produce the best scores (i.e., producing the minimum Euclidean distances) are modified during an iteration of the training algorithm. Three commonly used learning methods for training an LVQ neural network are herein designated LVQ1, LVQ2.1, and LVQ3.

In the first learning method (LVQ1), only the weight vector that is closest to the current input vector (i.e., the weight vector that produces the minimum Euclidean distance) is allowed to learn. For each matched pair of input and training vectors presented to an LVQ network during training, the Euclidean distance between the input vector and each of the weight vectors is calculated and the output node connected to the weight vector that produces the minimum Euclidean distance is identified. If the output node that produces the minimum Euclidean distance corresponds to the correct operating mode, the connection weights for the output vector are positively reinforced as follows. Let the subscript j represent the output node whose weight vector produces the minimum Euclidean distance. If the target value for that output node is 1 (i.e., $t_j=1$), then the weight vector for the output node ($W_j$) is updated by $$\vec{W}_j = \vec{W}_j + \lambda(\vec{X} - \vec{W}_j) \quad (17)$$

where X is the current input vector and $\lambda$ is a scalar parameter called the learning rate that varies from 0 to 1. If the output node whose weight vector produces the minimum Euclidean distance corresponds to the incorrect operating mode (i.e., $t_j=0$), the connection weights for the output vector are negatively reinforced by $$\vec{W}_j = \vec{W}_j - \lambda(\vec{X} - \vec{W}_j) \quad (18)$$

In the second (LVQ2.1) and third (LVQ3) learning methods, the two weight vectors that are closest to the current input vector are identified. These two weight vectors may be positively or negatively reinforced depending upon a number of conditions. The most important of these conditions is that the two weight vectors are modified only if they are roughly equidistant from the input vector. A user-defined control parameter ($\epsilon$), called the window size, is used to determine whether or not the two weight vectors are of comparable distances from the input vector. The window condition test that must be satisfied by the two closest weight vectors is that the ratio of distance between the closest weight vector and the input vector ($d_{c1}$) to the distance between the second closest weight vector and the input vector ($d_{c2}$) must fall within the window. Namely, $$\frac{d_{c1}}{d_{c2}} > 1 - \varepsilon \text{ and } \frac{d_{c2}}{d_{c1}} < 1 + \varepsilon \quad (19)$$

The window size is a small user-defined constant with typical values in the range $0.1 < \epsilon < 0.5$.

In the LVQ2.1 algorithm, a second condition that must be met is that one of the two closest weight vectors connects to an output node of the same class as the input vector. While at the same time, the other weight vector must connect to an output node of a class that differs from the class of the input vector. If both the window and class conditions are met, then the weight vector whose output node belongs to the same class as the input vector is positively reinforced according to equation (17). Also, the weight vector whose output node belongs to a class that differs from that of the input vector is negatively reinforced according to equation (18).

In the LVQ3 algorithm, the two weight vectors that are closest to the input vector are allowed to learn as long as the same window and class conditions as in the LVQ2.1 algorithm are met. The LVQ3 algorithm contains an additional learning mode. If the two weight vectors that are closest to the input vector meet the window condition (i.e., the conditions in equation (19) are met), and if both weight vectors connect to output nodes that are of the same class as the input vector, then both weight vectors are positively reinforced. Both weight vectors are updated by $$\vec{W} = \vec{W} + \delta\lambda(\vec{X} - \vec{W}) \quad (20)$$

where $\delta$ is a user-defined parameter, called the LVQ3 multiplier, that reduces the learning rate. The LVQ3 multiplier is a small constant with typical values in the range $0.1 < \delta < 0.5$.

The concept behind the LVQ2.1 and LVQ3 learning methods is that as the input vectors used for training are presented to the neural network, learning occurs only when an input vector is close to two of the weight vectors. In this case, the input vector is near the boundary between two weight vectors. Learning occurs in the LVQ2.1 algorithm only if one of the weight vectors belongs to the same output class as the input vector and the other weight vector belongs to a different class. The weight vector belonging to the correct class is positively reinforced and the other vector is negatively reinforced. The LVQ3 algorithm contains the same conditions as the LVQ2.1 algorithm. But an additional condition in the LVQ3 algorithm allows the network to learn, at a slower rate, if both weight vectors belong to the same class as the input vector. Over the course of the iterative training procedure, this technique works to sharply define the boundaries between the vector spaces recognized by each weight vector.

A set of input vectors and corresponding target vectors are used to train the LVQ neural network. The set of input and target vectors is presented to the network and the connection weights are adjusted depending upon the learning algorithm selected. Then, the learning rate parameter ($\lambda$) is decreased by a small amount and the set of input and target vectors is passed through the network again. The cycle is repeated until the learning rate decreases to zero or until the error rate for the neural network converges. Each training cycle of data presentation and learning rate reduction is called an epoch. The maximum number of epochs ($n_{eps}$) to be performed by the training algorithm is a user-defined control parameter. The learning rate decreases linearly with epoch number, with the learning rate decreasing to zero when the maximum number of epochs is reached. The initial value of the learning rate ($\lambda_0$) is a user-defined control parameter that, along with the maximum the number of epochs, determines the rate at which the learning rate is decreased. Specifically, the learning rate is decreased by a factor of $n_{eps}/\lambda_0$ at the end of each epoch.

During each training epoch, the error rate for the neural network is calculated. The error rate is defined to be the fraction of input vectors that are incorrectly classified by the neural network. An input vector is correctly classified if the weight vector that is closest to it connects to an output node of the same class as the input vector. As each input vector in the training set is passed through the LVQ neural network during a training epoch, the program notes if the input vector was correctly or incorrectly classified. The error rate is then given by the ratio of the number of incorrectly classified input vectors to the total number of input vectors in the training set. By keeping track of the error rate, the training algorithm can be halted as soon as the neural network stops learning.

The learning methods devised for the LVQ neural network are fine-tuning procedures. Only slight modifications are made to the network weight vectors during any training epoch. Therefore to minimize the number of epochs needed to train the neural network, the initial values of the weight vectors must be chosen wisely. The simplest method of initializing the weight vectors is to randomly select t vectors from the set of input vectors used to train the neural network and use them as initial values for the weight vectors, where t is the number of output nodes in the network. Although this initialization method works, a better method, which in general reduces the number of epochs needed to adequately train the network is to use the K-means clustering algorithm to set the initial values of the weight vectors. The K-means clustering algorithm is a method that will divide a vector space into K clusters and identify the centers of each cluster. The K-means clustering algorithm can be used to divide the input vectors used to train the LVQ network into t clusters and use the centers of the clusters as the initial values for the weight vectors.

The K-mean clustering algorithm is used to initialize the weight vectors as follows. For each of the r classes recognized by the network, the input vectors that belong to each class are identified and collected into r arrays. Next the output nodes that belong to each class are identified. By definition, the number of output nodes that belong to each class is given by the nodes-per-class vector ($N_{class}$). Then for each class, the K-means clustering algorithm is used to cluster the input vectors that belong to the class into a number of clusters that equals the number of output nodes that belong to the class. For instance for class j, the K-means clustering algorithm is used to divide the input vectors into $nout_j$ clusters and to evaluate the centers of the clusters. The cluster centers for class j are used to initialize the weight vectors whose output nodes belong to the class. The K-means clustering algorithm evaluates cluster centers for the class by minimizing the Euclidean distances between each of the input vectors in the class and the cluster center nearest to each. Thus, each cluster center is the mean value of the group of input vectors in a cluster domain. The K-means clustering algorithm was found to improve the recall capabilities of the neural network over the random initialization scheme, at a minimal increase in the computational cost of the training calculations.

A trained LVQ neural network operates as follows. At a point in time, a current data observation is acquired from the asset 12 and an input vector is constructed. The Euclidean distance between the input vector and each of the weight vectors is calculated. The weight vector producing the minimum Euclidean distance is found and its corresponding output node is activated. The neural network declares the operating mode corresponding to the activated output node to be the current operating mode of the asset 12 under surveillance.

In Use and In Operation Using A MSET Parameter Estimation Model and A Neural Network for Determining the Operating Mode of the Asset Operating mode partitioned decision processing was first reduced to practice by applicant in the performance of NASA Contract NAS4-99012. Testing performed under this contract conclusively demonstrated the reduction to practice for and unobvious benefits of the instant invention. The contract final report and new technology disclosure documents by applicant, delivered to the United States Government under this contract and listed herein below, further describe one embodiment and its reduction to practice, the disclosure of which is incorporated in its entirety herein by reference.

NASA SBIR Phase I Final Report, "System State Determination for Real-Time Sensor Validation," NASA Contract NAS4-99012, 12 Jun. 1999. Publication or disclosure restricted to US Government personnel for four years pursuant to Code of Federal Regulations 48 CFR 52.227-20.

New Technology Report for NASA Contract NAS4-99012, "Phase Partitioning the Multivariate State Estimation Technique (MSET) Process for Improved Parameter Estimation Performance and Processing Speed," Expert Microsystems, Inc. Document Control Number 2000-4446, 24 Jan. 2000. Publication or disclosure restricted to US Government personnel for four years pursuant to Code of Federal Regulations 48 CFR 52.227-20.

New Technology Report for NASA Contract NAS4-99012, "System State Classification Using A Learning Vector Quantization (LVQ) Neural Network," Expert Microsystems, Inc. Document Control Number 2000-4447, 24 Jan. 2000. Publication or disclosure restricted to US Government personnel for four years pursuant to Code of Federal Regulations 48 CFR 52.227-20.

In the performance of NASA Contract NAS4-99012, a sensor validation software module was designed to validate seventeen (17) mission critical telemetry signals for the Space Shuttle Main Engine (SSME), as listed in FIG. 18. These signals were selected based on their importance for real-time telemetry monitoring of the three Space Shuttle Main Engines during vehicle ascent to orbit. The names listed in FIG. 18 use standard SSME nomenclature. Data from ten nominal Space Shuttle flights, with flights and engine positions as listed in FIG. 19, were selected as the training data for the MSET submodels and LVQ neural network used in the performance of this work.

A series of parametric studies were performed to determine the LVQ neural network configuration and training constants that provide the best performance for SSME operating mode determination. The neural network configuration and training constants selected for applicant's reduction to practice are defined in FIG. 17. Ten SSME flight data sets, defined in FIG. 19, were used to train the neural network. The operating mode determination capability of the LVQ neural network was shown to be excellent with operating mode classification error rates of less than 2% observed in testing with additional SSME flight data sets that were not used for training the neural network. Specifically, FIG. 20 illustrates three versions of the sensor validation software module. The first sensor validation software module, herein denoted the PD module, was created by the methods of the instant invention with a process memory matrix (D) size of 150 vectors for each operating mode partitioned MSET submodel in the MSET decision model. The PD module's MSET decision submodels were created using an LVQ neural network for the operating mode determination procedure. The second sensor validation software module, herein denoted the A150 module, was created by the unpartitioned MSET model creation procedure with a process memory matrix (D) size of 150 vectors used in the unpartitioned MSET model. This enabled a direct comparison of surveillance performance between the operating mode partitioned (instant invention) and unpartitioned models given a constant processing time. The third sensor validation software module, herein denoted the A300 module, was created by the unpartitioned MSET model creation procedure with a process memory matrix (D) size of 300 vectors used in the unpartitioned MSET model. The A300 module enabled improved surveillance performance for the unpartitioned MSET model case, albeit at the cost of greater processing time.

FIG. 20 further lists the parameter estimation model and fault detector configurations used for feasibility testing.

The operating mode partitioned sensor validation module (denoted PD) incorporated an MSET decision model partitioned into seven (7) modes representative of the primary operating modes of the SSME. The rules used for partitioning the training data for the SSME operating modes are provided in FIG. 21. The two unpartitioned sensor validation modules (denoted A150 and A300) were prepared using exactly the same training data without the benefit of operating mode partitioning.

The Argonne National Laboratory System State Analyzer (SSA) type pattern recognition operator was used in all of the MSET models. The fault detection models were all based on the SPRT mean positive and mean negative test methods. SPRT is a statistically derived test statistic with an explicit, non-zero false alarm probability. For this reason, SPRT fault detectors are generally used in combination with a multi-cycle fault decision algorithm to filter out the possible one-cycle SPRT alarms. The fault decision procedure was configured using a four (4) out of seven (7) multi-cycle decision algorithm. This fault decision procedure will declare a sensor failure whenever any 4 of the last 7 observation cycles produce any type of one-cycle SPRT fault detection alarm.

Performance testing clearly demonstrated the feasibility and benefits of using the operating mode partitioned MSET decision model for real-time sensor signal validation. Metrics used to evaluate the test results included the following:

Total One Cycle Alarm Count—This is a measure of the total number of SPRT fault detector generated alarms for a single simulation run. For nominal cases, this is expected to be a near zero number. For failure simulation cases, the number will be non-zero. This metric provides a measure of the overall performance of the fault detection procedure.

Average Parameter Estimation Error Percentage—This is a measure of the globally averaged parameter estimation error. The global averaged error is the sum of the single cycle error for all sensors and data observations divided by the total number of sensors and data observations. This metric provides a measure of the overall performance of the parameter estimation procedure.

Average One Cycle Processing Time—This is a measure of the globally averaged single cycle validation processing time. The one cycle processing time is the sum of the processing time for all validated data observations divided by the total number of validated data observations. The processing time is calculated as the elapsed time between the time of the test driver's call to the sensor validation module's surveillance procedure and the time that the surveillance procedure returns its results to the test driver.

Time to Failure Detection (Failure Simulations Only)—This is a measure of the elapsed time between the first observation containing sensor failure data and the observation for which the sensor validation module declares the sensor failed. Time to fault detection depends on the diagnostic capability of the sensor validation module, the time of failure occurrence and the nature and magnitude of the sensor failure. The data herein report the elapsed mission time between the initiation of a slow drift in the signal and the time that the drift failure was detected. For consistency, all test cases herein used a drift magnitude of 0.2% of the nominal, full power level value of the sensor signal applied per second of engine operating time.

Signal Error at Failure Detection (Failure Simulations Only)—This is a measure of the total accumulated drift error in a sensor signal at the time of failure detection. The data reported herein normalize the error at the time of detection in terms of a percentage of the nominal, full power level value of the sensor signal.

The results tabulated in FIGS. 22 through 27 demonstrate the very significant improvement in sensor validation performance achieved using the operating mode partitioned MSET decision model in accordance with the instant invention. The operating mode partitioned MSET decision model provided better fault detection sensitivity, lower parameter estimation error, and much faster processing time in comparison to the unpartitioned MSET models. The operating mode partitioned MSET decision model exhibited zero (0) false alarms and zero (0) missed alarms during all testing performed. The results tabulated in FIGS. 22 and 23 were generated using an LVQ neural network for the operating mode determination procedure.

Two test series were performed for comparison of the operating mode partitioned sensor validation module to the unpartitioned modules. In the first series, an unpartitioned model with a process memory matrix of 300 vectors was constructed (denoted A300). The operating mode partitioned model (denoted PD) used a process memory matrix of 150 vectors for each individual operating mode. When compared to the 300 vector unpartitioned model, the operating mode partitioned MSET decision model in accordance with the instant invention demonstrated:

34% reduction in parameter estimation error;
73% reduction in per cycle processing time;
73% reduction in time to detect a sensor signal drift;
73% reduction in the total signal error at drift failure detection.

In addition, the 300 vector unpartitioned model missed two subtle noise failures that were properly detected by the operating mode partitioned decision model in accordance with the instant invention.

In the second series, the operating mode partitioned decision model was compared to an unpartitioned model of equivalent run-time speed. To accomplish this, an unpartitioned model with a process memory matrix of 150 vectors was constructed (denoted A150). When compared to the 150 vector unpartitioned model, the operating mode partitioned decision model in accordance with the instant invention demonstrated:

42% reduction in parameter estimation error;
Equivalent per cycle processing time;
77% reduction in time to detect a sensor signal drift;
76% reduction in the total signal error at drift failure detection.

In addition, the 150 vector unpartitioned model produced two sensor failure false alarms and missed one noise failure in cases that were properly detected by the operating mode partitioned decision model in accordance with the instant invention.

The operating mode partitioned decision model provides better fault detection sensitivity because the operating mode specific MSET decision submodels are better able to estimate the current value of each observed parameter. This capability of the operating mode partitioned decision model is demonstrated by the reduction achieved in the parameter estimation error. Reduced parameter estimation error allows the SPRT thresholds for the fault detection model to be set to lower values thereby making the fault detection model more sensitive to the early indications of sensor failure (fewer missed alarms). This phenomenon proportionally reduces the time to drift failure detection as illustrated by comparison of the results reported in FIG. 23 to the results reported in FIG. 25 and FIG. 27.

Parameter estimation error may be traded off against processing time by increasing the number of vectors in the process memory matrix. As is evident by comparison of FIG. 24 and FIG. 26, doubling the process memory matrix size increased the single cycle processing time by a factor of four ($2^2$). Operating mode partitioning provides an effectively larger process memory matrix without the concomitant penalty in processing time. For example, the operating mode partitioned SSME sensor validation module (PD) includes seven active operating modes with process memory matrices sized at 150 vectors per mode. This provides an effective process memory matrix size of 1050 vectors with processing speed equivalent to a process memory matrix containing 150 vectors. A single unpartitioned model of equivalent accuracy would be 49 ($7^2$) times slower than the operating mode partitioned decision model.

Processing speed results demonstrated the real-time monitoring capability of the operating mode partitioned decision model. Single observation processing times of 5-msec (200 samples/second) were demonstrated with the seventeen (17) sensor SSME sensor validation module running on a 300-MHz Pentium II processor. It is reasonable to allocate between 2 and 50-msec per data cycle for sensor validation processing in SSME real-time control applications. The results of this testing show these goals are only attainable with operating mode partitioning of the MSET model in accordance with the instant invention. The unobvious benefits of the instant invention are therefore demonstrated by this reduction to practice.

Alternate Embodiment and In Use and Operation Using A MSET Decision Model for Parameter Estimation and A Rule-Based Logic Sequence for Determining the Operating Mode of the Asset:

In another embodiment, the same MSET decision model methods and procedures described hereinabove were used with a rule-based logic sequence for the operating mode determination procedure 26. A rule-based mode determination procedure is generally specific to a single type of asset and may be implemented in a plurality of forms. A rule-based mode determination procedure may use expert system or procedural logic depending on the nature and complexity of the operating modes of the asset. In one embodiment herein, procedural logic representing the rules specified in FIG. 21 for determining the operating mode of the SSME was reduced to practice using C language procedural software as follows.

```
----------Begin Source Code Listing----------
/* SSME operating mode determiner function */
/* Copyright 1999 by Expert Microsystems, Inc. */
/* All Rights Reserved */
#define START_COMMAND 33024.0
#define SHUTDOWN_COMMAND 35328.0
#define COMMAND_ISSUED(COMVAL,DATUM) ((DATUM>(COMVAL - 1.0))
        && (DATUM <(COMVAL + 1.0)))
enum SSME_modes SSME_mode_determiner (double *data, enum Boolean initialize)
{
    float pc; /* Combustion chamber pressure */
    float vehcom; /* Vehicle command code */
    float compc; /* Commanded chamber pressure */
    static float last_PL=0.0;
    static int cycles_in_start=0;
    static float last_compc=0.0;
    static enum SSME_modes last_state=PREFIRE;
    if(initialize) {
        last_PL = 0.0;
        cycles_in_start = 0;
        last_compc = 0.0;
        last_state = PREFIRE;
        return PREFIRE;
```

-continued

```
    };
    pc = data[PID63]; /* Chamber pressure is PID63 */
    vehcom = data[PID280]; /* Vehicle command is PID280 */
    compc = data[P1D287]; /* Commanded chamber pressure is PID287 */
    /* Take care of special cases first...*/
    if (last_state == PREFIRE) {
        if (COMMAND_ISSUED (START_COMMAND, vehcom)) {
            /* If we're waiting for START and receive START, then we're
            in TRANSIENT. */
            last_state = START01;
            return START01;
        } else {
            /* Keep waiting. */
            last_state = PREFIRE;
            return PREFIRE;
        }
    } else if (last_state == SHUTDOWN || COMMAND_ISSUED
    (SHUTDOWN_COMMAND, vehcom)) {
        /* Once SHUTDOWN is detected, stay in SHUTDOWN until re-initialized. */
        last_state = SHUTDOWN;
        return SHUTDOWN;
    }
    if(last_state==START01) {
        if(++cycles_in_start<25) { /* 0 to 1.0 sec */
            last_compc = compc;
            last_state = START01;
            return START01;
        } else {
            last_state = START12;
            return START12;
        }
};
if(last_state==START12) {
    if(++cycles_in_start<50) { /* 1.0 to 2.0 sec*/
        last_compc = compc;
        last_state = START12;
        return START12;
    } else {
        last_state = START24;
        return START24;
    };
};
if(last_state==START24) {
    if(++cycles_in_start<25*4) { /* 2.0 to 4.00 sec minimum */
        last_compc = compc;
        last_state = START24;
        return START24;
    };
};
/* ELSE... mainstage operation. */
if((last_state==STEADY_LOW || last_state==STEADY_FULL)
&&fabs(compc-last_compc)<3.35) {
    last_PL = pc;
    last_compc = compc;
    if(compc <2500.0) {
        last_state = STEADY_LOW;
        return STEADY_LOW
    } else {
        last_state = STEADY_FULL;
        return STEADY_FULL
    }
} else {/* In transient */
    if(fabs (compc - pc) <= (5 * 3.35)) {
        /* Transition to steady-state. */
        last_PL = pc;
        last_compc = compc;
        if(compc <2500.0) {
            last_state STEADY_LOW;
            return STEADY_LOW;
        } else {
            last_state = STEADY_FULL;
            return STEADY_FULL
        }
    } else if(last_state==START24) {
        last_PL = pc;
        last_compc = compc;
        return last_state
    } else if(compc>last_compc || pc<compc) {
        last_PL = pc;
```

-continued

```
            last_compc = compc;
            last_state = UPTHRUST;
            return UPTHRUST;
        } else {
            last_PL = pc;
            last_compc = compc;
            last_state = DOWNTHRUST;
            return DOWNTHRUST;
        };
    };
}
----------End Source Code Listing----------
```

Figure 28:
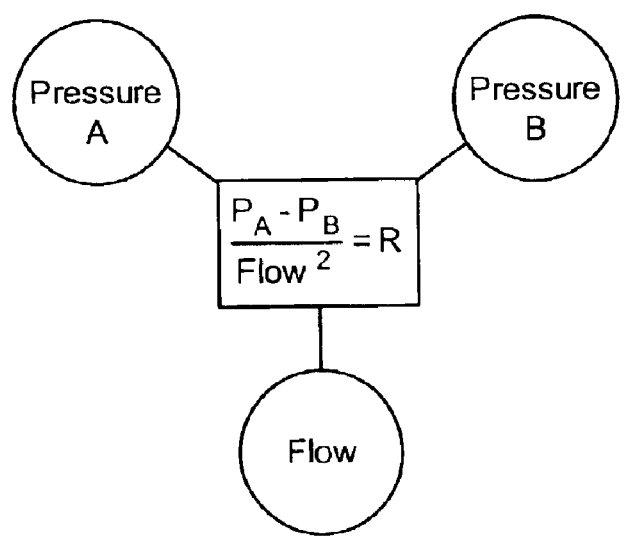
FIG. 28 illustrates a mathematical parameter estimation model of a type used for Space Shuttle Main Engine telemetry data surveillance in an another embodiment.

Reduction to practice and performance testing was accomplished using the MSET parameter estimation techniques and rule-based operating mode determination procedure described hereinabove. Substantially identical test results were achieved using the rule-based method and the LVQ neural network method for the operating mode determination procedure 12. This was expected because both methods implemented the same operating mode determination criteria, as defined in FIG. 21, albeit using very different means. Reduction to practice using both neural network and rule-based methods illustrates that the instant invention may employ any one of a plurality of operating mode determination procedures 26 to achieve the benefits described herein. These techniques were also demonstrated using mathematical models, as shown in FIG. 28.

In Use and In Operation Using A Bayesian Belief Network for Classifying the Condition of an Asset and A Rule-Based Logic Sequence for Determining the Operating Mode of the Asset In one application, the novel surveillance method and system of the instant invention that combines methods for parameter estimation, fault detection, and fault classification was used for determining the status of instrument and system assets in smart, autonomous sensors and control components developed for the X-33 Single Stage to Orbit Demonstrator Hydrogen Detection System. The instant invention was demonstrated by applicant in the performance of this work under NASA Contract NAS13-01001. Testing performed under this contract conclusively demonstrated the reduction to practice for and unobvious benefits of the instant invention. The contract final report and new technology disclosure documents by applicant, delivered to the United States Government under this contract and listed herein below, further describe one preferred embodiment and its reduction to practice, the disclosure of which is incorporated in its entirety herein by reference.

NASA SBIR Phase I Final Report, "Autonomous Control System Components," NASA Contract NAS13-01001, November 2001. Publication or disclosure restricted to US Government personnel for four years pursuant to Code of Federal Regulations 48 CFR 52.227-20.

New Technology Report for NASA Contract NAS13-01001, "A Surveillance System and Method having Probabilistic Fault Detection and Classification," Expert Microsystems, Inc. Document Control Number 2001-4473, November 2001. Publication or disclosure restricted to US Government personnel for four years pursuant to Code of Federal Regulations 48 CFR 52.227-20.

Figure 29:
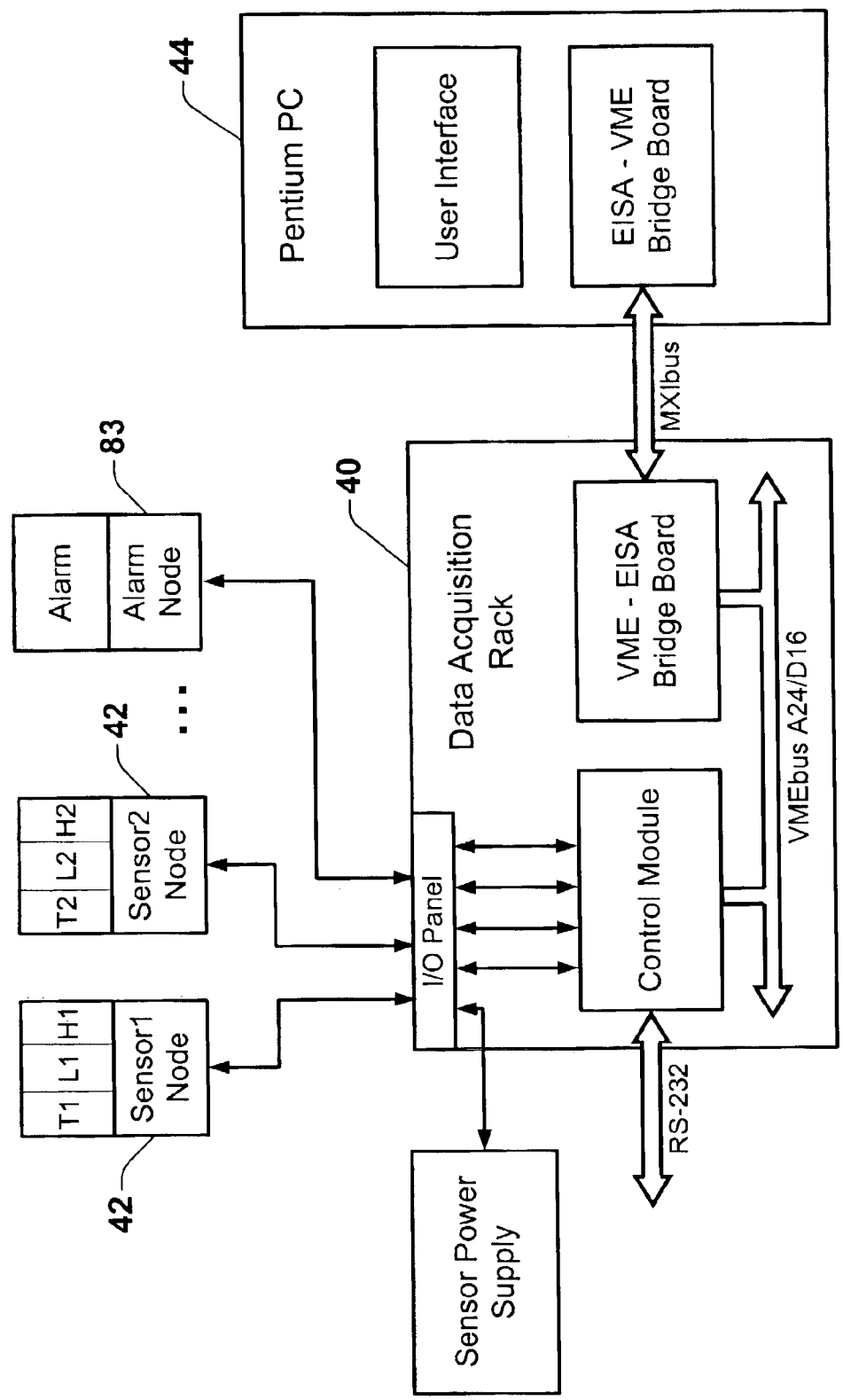
FIG. 29 is a schematic functional flow diagram of a surveillance system having two X-33 Single Stage to Orbit Demonstrator vehicle hydrogen sensors.

In the performance of NASA Contract NAS13-01001, a test setup was configured for exposing two redundant hydrogen sensor assemblies to varying concentrations of $H_2$ gas. Each of these sensor assemblies contains two $H_2$ sensor elements (designated LR and HR), one temperature sensor element (designated T), and one heater control element. The test system computer 44 used the data acquisition means 40 to monitor the signal sources 42 consisting of the three sensor elements on each of the two sensors as shown in FIG. 29 and actuated the alarm 83 if hydrogen levels exceeded safety limits. The decision model 50 was comprised of an MSET parameter estimation model 52, a SPRT fault detection model 54, and a BBN fault classification model 56. The MSET parameter estimation model and SPRT fault detection models were used to provide alarm indications for signals that were behaving abnormally. As each observation was analyzed, the SPRT returned an array of ones and zeros indicating whether each signal's reading was normal or abnormal. The Bayesian belief network (BBN) used the SPRT output as positive findings to determine the state for each of its alarm indication leaf nodes. The BBN used this state information to determine the probability of any of the specified possible causes of the fault, thereby classifying the fault.

BBN Configuration

The BBN applies the output from each fault detector associated with one of its alarm indication leaf nodes as a positive finding for the leaf node. The BBN combines this information from all of its leaf nodes to determine the probability of any of the specified possible causes of the fault. The BBN fault classification submodel 57 configuration and probability tables can be different in each operating mode. However, in this case a similar BBN fault classification submodel configuration was used in each of the two system operating modes. The configuration was as follows.

Six fault nodes were created to determine the specific sensor element that had failed. These were designated HR1 element, LR1 element, T1 element, HR2 element, LR2 element, and T2 element. Each sensor element node had two possible states, good (not faulty) and bad (faulty). Two additional fault nodes were created to determine whether the entire sensor had failed. These were named Sensor1 and Sensor2. They also took on the states good and bad. If a node is in a good state, the implication is that the associated asset item is operating acceptably. For each of the fault nodes, we assign a prior probability. This is the probability that the proposition is true. For example, we believe that Sensor1 and Sensor2 are reliable under the test conditions, so we believe they will behave correctly 95% of the time. This implies that they will behave incorrectly 5% of the time. This may be due to any number of reasons, e.g., not supplying power to the sensor, damage to the sensor's cables, etc. The reasons for this failure are not of interest, only that each sensor can be expected to operate correctly 95% of the time. We believe the probability of a bad element to be greater that the probability of a bad sensor, so we assigned a 10% prior probability to each of the elements failing. Conversely, there is 90% prior probability that each element has not failed.

Each of the alarm indication nodes is a leaf node. Each leaf node is a child of at least one parent, and a conditional probability is required for each of the combinations of parent states. That is, given the state of each of the parents, there is a probability that the alarm leaf node will be in either the "normal" or "abnormal" state. Each fault node indicating a bad element has an associated alarm leaf node as a child. Each "bad sensor" node has three of the leaf nodes as children. Therefore, each leaf node has two parents. The conditional probability tables require one entry for each state of the node for each combination of the node's parent's states. This yields a conditional probability table for each node that requires 8 separate entries.

Conditional probabilities for the leaf nodes were divided into three conditions. If all of the parent states were "good", the probability that each of the child nodes were in a normal state was very high (95%). If either the associated sensor or the element were "bad", the probability that the sensor was behaving abnormally was also high (95%). If both the sensor and the element were "bad" the probability that the sensor was behaving abnormally was higher than if only one or the other were "bad", so a 99% probability of failure was assigned.

The MSET/SPRT submodel combination provides one example of a means to perform parameter estimation and fault detection in order to determine the state of the alarm indication leaf nodes. The fault detectors each return a normal or abnormal value for their associated alarm indication nodes every time an observation is processed. Each of these values is treated as a positive finding on the associated alarm node. A positive finding is a value that may be applied with 100% certainty, or a probability of 1. That is, we are positive that this alarm node is reporting a "normal" or "abnormal" condition.

Figure 30:
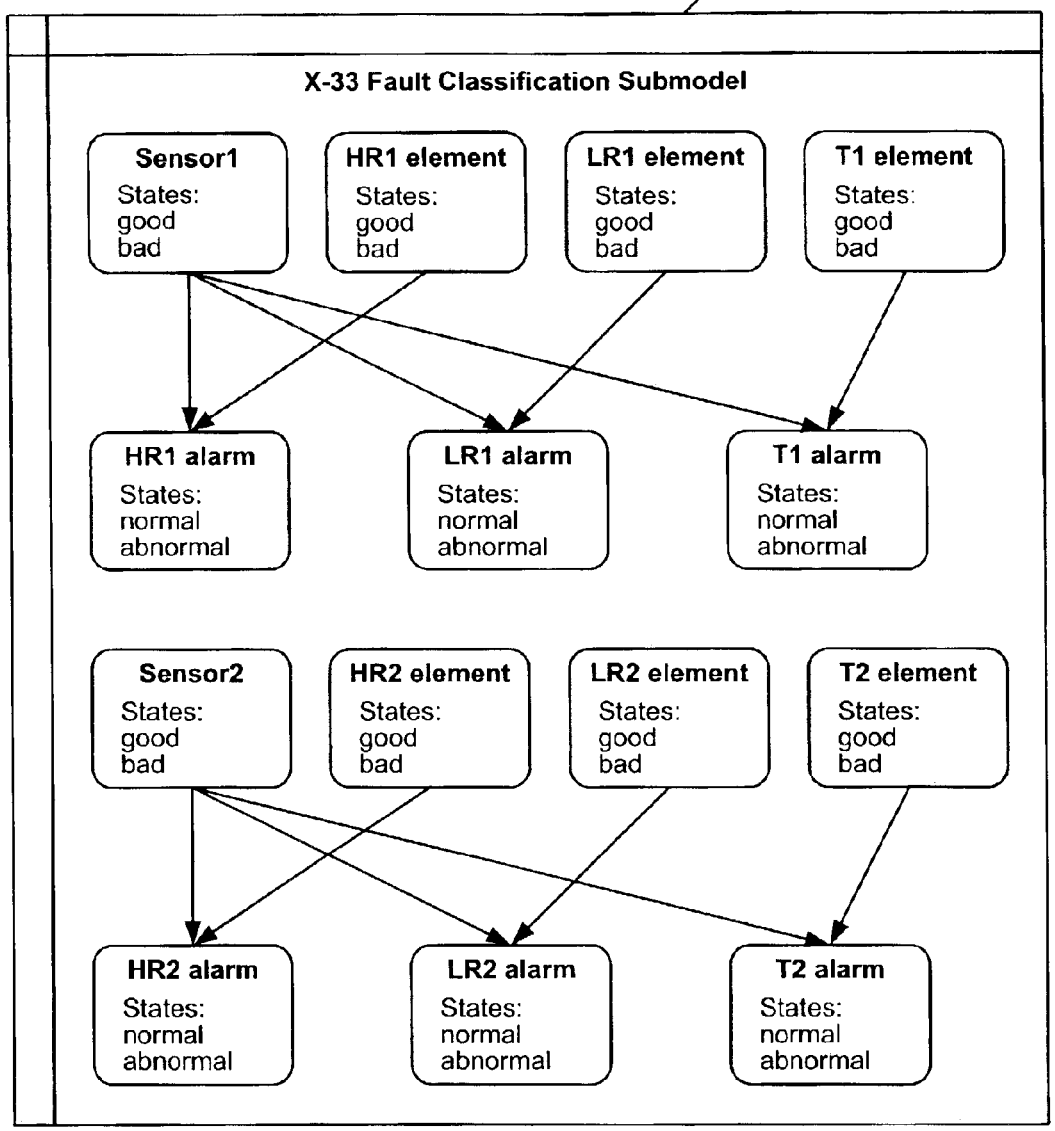
FIG. 30 is a functional schematic of a fault classification submodel for a system having two X-33 Single Stage to Orbit Demonstrator vehicle hydrogen sensors.

The BBN fault classification submodel is diagrammed in FIG. 30. The complete set of prior probability and threshold values for the BBN nodes are listed in FIG. 31 for Sensor1 and FIG. 32 for Sensor2. The threshold values simply define the posterior probability value above which the node will be considered to be in an unacceptable condition. When the posterior probability value for the node exceeds the threshold, the BBN will classify the node and thereby the associated asset item as faulty.

Test Procedure and Results

The system was exposed to $H_2$ at 0%, 0.1%, 0.5%, 1.0%, 5.0%, 10.0% and 100.0% concentrations during normal operation. Training data was collected during these exposures from each of these elements at one-second intervals. Test data was taken several months later at 3.57% $H_2$ and 0% $H_2$ using the same sensors and test configuration. Next, these data were adjusted to create additional sets of training and test data wherein the effect of hydrogen tank venting in the vicinity of the sensors was simulated. Tank venting has the effect of increasing the background hydrogen concentration in the vicinity of the sensors and can cause the hydrogen detection system to produce undesirable false alarms or missed alarms.

An operating mode determination procedure 26 was used to classify each observation on the basis of the tank vent valve state. The procedure classified the operating mode as OPERATING whenever the tank valve indication was less than 50% open and the operating mode as VENTING whenever the tank valve indication was more than 50% open.

Two MSET parameter estimation submodels 53 were trained on the training data, one for OPERATING and one for VENTING. Two SPRT fault detection submodels 55 were calibrated for each included sensor on the basis of their corresponding MSET submodel estimates taken over the training data for their respective operating modes. Each fault detector returned an array of ones and zeros indicating whether each sensor element's reading was normal or abnormal.

Test results demonstrated that the BBN is effective for diagnosing faults detected by the parameter estimation and fault detection procedures. Nominal (OPERATING) test data consisted of data obtained during exposure to 3.57% $H_2$, and during exposure to 0% $H_2$ using the sensors that had been previously used to acquire the training data. As expected, the system accurately predicted the data and generated no alarms.

In order to further test the operating mode partitioned BBN fault classification model, we overlaid drift errors on selected signal data, forcing the MSET/SPRT algorithms to generate fault indications. These simulated faults and their resulting fault classification probabilities are summarized in FIGS. 33 through 34. Beliefs (fault classification probabilities) are listed with the most probable causes at the top of the list. In each case, the operating mode partitioned BBN fault classification model correctly diagnosed the cause of the fault indications. The OPERATING mode test data in FIG. 33 illustrates that when faults occur on three of the sensor's elements, the most likely cause of failure is the failure of the entire sensor. When one or two of the sensor's elements are abnormal, the most likely cause is element failure. As expected, when more than one element fails on a sensor, the probability of the sensor having failed is increased, but a much larger increase occurs with the third element failing. The VENTING mode test data in FIG. 34 illustrates the same results.

For comparison, a hydrogen detection system model was configured and run over the same OPERATING and VENTING test data, but without the benefit of the operating mode determination procedure 26. That is, the decision model was trained and operated as a single mode unpartitioned model. In this case, performance was satisfactory for the OPERATING test data, which yielded the same decision results as the partitioned model as shown in FIG. 35. However, the unpartitioned model failed to correctly classify all of the simulated faults when processing the VENTING test data as shown in FIG. 36. In the VENTING test cases, the drift error in signal L1 is not detected. This leads to a missed alarm for L1 when the only fault occurs on L1 and to an incorrect diagnosis of the failure of sensor 1 when H1, L1, and T1 simultaneously drift high.

These comparative tests demonstrate the improvement in decision accuracy that results from the unique methods of the subject invention.

While an MSET parameter estimation procedure is described herein above, any type of parameter estimation procedure can be used with the instant invention. The novelty described infra is not a modification or improvement to the MSET procedure, but is rather a new means of using any existing parameter estimation procedure so as to more effectively accomplish the fault classification objective.

While a SPRT fault detection procedure is described herein above, any type of fault detection procedure can be used with the instant invention. The novelty described infra is not a modification or improvement to the SPRT procedure, but is rather a new means of using any existing fault detection procedure so as to more effectively accomplish the fault classification objective.

While a BBN fault classification procedure is described herein above, any type of fault classification procedure can be used with the instant invention. The novelty described infra is not a modification or improvement to the BBN procedure, but is rather a new means of using any existing fault classification procedure so as to more effectively accomplish the fault classification objective.

Accordingly, in one aspect the present invention provides a surveillance system and method having fault classification and operating mode partitioning.

In another aspect the present invention provides a system and method for performing high sensitivity surveillance of a wide variety of assets including industrial, utility, business, medical, transportation, financial, and biological processes and apparatuses wherein such process and/or apparatus asset preferably has at least two distinct modes of operation.

In another aspect the present invention provides a system and method for determining the status of an asset.

In another aspect the present invention provides a system and method for performing control of an asset.

In another aspect the present invention provides a system and method which partitions a parameter estimation model for a process surveillance scheme into two or more coordinated submodels each providing improved parameter estimation for a single operating mode or related subset of operating modes of the process.

In another aspect the present invention provides a system and method which partitions a fault detection model for a process surveillance scheme into two or more coordinated submodels each providing improved fault detection for a single operating mode or related subset of operating modes of the process.

In another aspect the present invention provides a system and method which partitions a fault classification model for a process surveillance scheme into two or more coordinated submodels each providing improved fault classification for a single operating mode or related subset of operating modes of the process.

In another aspect the present invention provides a system and method which partitions a parameter estimation model, a fault detection model, and a fault classification model for a process surveillance scheme into two or more coordinated submodels together providing improved diagnostic decision making for a single operating mode or related subset of operating modes of the process.

In another aspect the present invention provides a system and method which creates an improved parameter estimation model for a process surveillance scheme using recorded operating data for an asset to train a parameter estimation model.

In another aspect the present invention provides a system and method as characterized above which provides an improved system and method for surveillance of signal sources, detecting a fault or error state of the signal sources, and determining the cause of the fault or error state of the signal sources enabling responsive action thereto.

In another aspect the present invention provides the system and method which provides an improved system and method for surveillance of on-line, real-time signals, or off-line accumulated signal data.

In another aspect the present invention provides a system and method for generating an improved virtual signal estimate for at least one process parameter given an observation of at least one actual signal from the asset.

In another aspect the present invention provides a system and method as characterized above which provides an improved system and method for ultra-sensitive analysis and modification of asset processes and apparatuses using at least one parameter estimation technique for the generation of at least one virtual signal parameter.

In another aspect the present invention provides a system and method as characterized above which provides an improved system and method for ultra-sensitive analysis and modification of asset processes and apparatuses using at least one fault detection technique for comparing at least one virtual signal parameter to at least one observed signal parameter.

In another aspect the present invention provides a system and method as characterized above which provides an improved system and method for ultra-sensitive analysis and modification of asset processes and apparatuses using at least one fault detection technique for assessing at least one observed signal parameter.

In another aspect the present invention provides a system and method as characterized above which provides an improved system and method for ultra-sensitive analysis and modification of asset processes and apparatuses using at least one diagnostic decision making technique for assessing the status of the asset using at least one observed signal parameter.

In another aspect the present invention provides a system and method as characterized above which provides an improved system and method for ultra-sensitive analysis and modification of asset processes and apparatuses using at least one diagnostic decision making technique for assessing the status of the asset using at least one virtual signal parameter.

In another aspect the present invention provides a system and method as characterized above which provides an improved system and method for ultra-sensitive analysis and modification of asset processes and apparatuses wherein the diagnostic decision technique used for assessing the status of the asset is a Bayesian network.

In another aspect the present invention provides a system and method as characterized above which provides an improved system and method for ultra-sensitive analysis and modification of asset processes and apparatuses wherein the diagnostic decision technique used for assessing the status of the asset is an expert system or other rule based system.

In another aspect the present invention provides a system and method as characterized above which provides an improved system and method for ultra-sensitive analysis and modification of asset processes and apparatuses wherein the diagnostic decision technique used for assessing the status of the asset is a neural network.

In another aspect the present invention provides a system and method to classify the operating mode of an asset wherein the classification is performed using an expert system having any one of a plurality of structures, training procedures, and operating procedures.

In another aspect, the present invention provides a system and method to classify the operating mode of an asset wherein the classification is performed using a neural network having any one of a plurality of structures, training procedures, and operating procedures.

In another embodiment of the invention, an asset surveillance system is comprised of: an operating mode partitioned fault classification model 56 of an asset 12 comprised of a plurality of fault classification submodels 57 each having an asset operating mode $M_i$ associated thereto; a fault indication means 70 for determining one or more fault indications given a set of observed asset signals from the asset 12; means for determining at least one operating mode $M_i$ of the asset 12 for the set of observed asset signals; a first selection means for selecting at least one of the fault classification submodels 57 from the operating mode partitioned fault classification model 56 as a function of at least the one determined operating mode $M_i$ for providing a fault classification of determined fault indications for performing asset surveillance. The fault indication means further includes an operating mode parameter estimation model 52 comprised of a plurality of parameter estimation submodels 53 each having an asset operating mode $M_i$ associated thereto and a second selection means for selecting at least one of the parameter estimation submodels 53 from the operating mode partitioned parameter estimation model 52 as a function of at least the one determined operating mode $M_i$. The fault indication means further includes means for processing the observed asset signals as a function of at least the one selected parameter estimation submodel for defining parameter estimated data. Additionally, the fault indication means includes an operating mode partitioned fault detection model 54 comprised of a plurality of fault detection submodels 55 each having an asset operating mode $M_i$ associated thereto. Furthermore, the fault indication means further includes a third selection means for selecting at least one of the fault detection submodels 55 from the operating mode partitioned fault detection model 54 as a function of at least the one determined operating mode $M_i$. Moreover, the fault indication means further includes means for processing the observed asset signals as a function of at least the one selected fault detection submodel 55 for determining the one or more fault indications used for providing the fault classification of determined fault indications by the first selection means selecting at least one of the fault classification submodels 57 from the operating mode partitioned fault classification model 56 as a function of at least the one determined operating mode $M_i$ for providing the fault classification of determined fault indications for performing asset surveillance.

In another embodiment of the invention, a method for determining asset status includes the steps of creating 31 an operating mode partitioned fault classification model 56 comprised of a plurality of fault classification submodels 57 each having an asset operating mode $M_i$ associated thereto; acquiring 62 a set of observed signal data values from an asset; determining 70 at least one fault indication as a function of the observed signal data values; determining 26 at least one operating mode $M_i$ of the asset 12 for the set of observed asset signals; selecting 76 at least one fault classification submodel 57 from the operating mode partitioned fault classification model 56 as a function of at least the one determined operating mode $M_i$, and using at least the one fault indication and at least the one selected fault classification submodel 57 for classifying faults 76 for performing asset surveillance.

In another embodiment of the invention, a method for determining asset status includes the steps of partitioning a decision model 50 into a plurality of partitions e.g., 52, 54, 56, each partition having an operating mode $M_i$ associated thereto: employing a plurality of different methods 53, 55, 57 from a plurality of parameter estimation methods 52, a plurality of fault detection methods 54, and a plurality of fault classification methods 56 for different partitions; determining at least one operating mode $M_i$ of an asset 12; selecting at least one of the plurality of partitions as a function of the determined operating mode for tailoring the plurality of parameter estimation methods 52, the plurality of fault detection methods 54, and the plurality of fault classification methods 56 to asset surveillance as a function of the at least one determined operating mode $M_i$.

In another embodiment of the invention, a method for determining asset status includes the steps of acquiring a set of observed signal data values from an asset; producing a calculated set of estimated signal data values correlative to the set of observed signal data values acquired from the asset; comparing the set of observed signal data values to the calculated set of estimated signal data values; determining a presence of a disagreement between the set of observed signal data values and the calculated set of estimated signal data values on the basis of the comparison step, and determining a cause of a determined presence of disagreement between the set of observed signal data values and the calculated set of estimated signal data values for performing asset surveillance. The method further including the step of using a Bayesian Belief Network (BBN) fault classification method for determining a presence of an unacceptable asset status or fault condition on the basis of a disagreement between the set of observed signal data values and the calculated set of estimated signal data values derived from the comparison step. The method further including the step of performing asset control as a function of the classified asset status or fault condition.

In another embodiment of the invention, a method for determining asset status includes the steps creating 30 a fault detection model 54 comprised of a plurality of fault detection submodels 55 each having an operating mode $M_i$ associated thereto; creating 31 a fault classification 56 model comprised of a plurality of fault classification submodels 57 each having an operating mode $M_i$ associated thereto; acquiring a set of observed signal data values from an asset 12; determining at least one operating mode of the asset 12 for the set of observed signal data values; selecting 64 at least one fault detection submodel from the fault classification model as a function of at least the one determined operating mode $M_i$; determining 70 at least one fault indication as a function of the observed signal data values; selecting 64 at least one fault classification submodel 57 from the fault classification model 56 as a function of at least the one determined operating mode $M_i$, and using at least the one fault indication and at least the one selected fault classification submodel 57 for classifying faults 76 for performing asset surveillance. The method further including the step of creating 29 a parameter estimation model 52 comprised of a plurality of parameter estimation submodels 53 each correlative to at least one training data subset partitioned from an unpartitioned training data set 24 and each having an operating mode $M_i$ associated thereto and wherein the step of determining 70 at least one fault indication as a function of the observed signal data values includes the step of determining at least one fault indication as a function of both the estimated signal values and the observed signal data values.

In another embodiment of the invention, a system for determining asset status is comprised of: a parameter estimation model 52 comprised of a plurality of parameter estimation submodels 53 each correlative to at least one training data subset partitioned from an unpartitioned training data set 24 and each having an operating mode $M_i$ associated thereto; a fault detection model 54 comprised of a plurality of fault detection submodels 55 each having an operating mode $M_i$ associated thereto; a fault classification 56 model comprised of a plurality of fault classification submodels 57 each having an operating mode $M_i$ associated thereto; means for acquiring a set of observed signal data values from an asset 12; means for determining at least one operating mode of the asset 12 for the set of observed signal data values; means for selecting 64 at least one parameter estimation submodel 53 from the parameter estimation model 52 as a function of at least the one determined operating mode $M_i$; means for calculating a set of estimated signal values from at least one selected parameter estimation submodel 53; means for selecting 64 at least one fault detection submodel from the fault classification model as a function of at least the one determined operating mode $M_i$; means for determining 70 at least one fault indication as a function of both the estimated signal values and observed signal data values; means for selecting 64 at least one fault classification submodel 57 from the fault classification model 56 as a function of at least the one determined operating mode $M_i$, and means for using at least the one fault indication and at least the one selected fault classification submodel 57 for classifying faults 76 for performing asset surveillance.

Moreover, having thus described the invention, it should be apparent that numerous structural modifications and adaptations may be resorted to without departing from the scope and fair meaning of the instant invention as set forth hereinabove and as described hereinbelow by the claims.

I claim:

1. An asset surveillance system, comprising in combination:
    an operating mode partitioned fault classification model of an asset comprised of a plurality of fault classification submodels each having an asset operating mode associated thereto;
    a fault indication means for determining one or more fault indications given a set of observed asset signals from the asset;
    means for determining at least one operating mode of the asset for the set of observed asset signals;
    a first selection means for selecting at least one of the fault classification submodels from the operating mode partitioned fault classification model as a function of at least the one determined operating mode for providing a fault classification of determined fault indications for performing asset surveillance.

2. The system of claim 1 wherein said fault indication means further includes an operating mode partitioned parameter estimation model comprised of a plurality of parameter estimation submodels each having an asset operating mode associated thereto and a second selection means for selecting at least one of the parameter estimation submodels from the operating mode partitioned parameter estimation model as a function of at least the one determined operating mode.

3. The system of claim 2 wherein said fault indication means further includes means for processing the observed asset signals as a function of at least the one selected parameter estimation submodel for defining parameter estimated data.

4. The system of claim 3 wherein said fault indication means includes an operating mode partitioned fault detection model comprised of a plurality of fault detection submodels each having an asset operating mode associated thereto.

5. The system of claim 4 wherein said fault indication means further includes a third selection means for selecting at least one of the fault detection submodels from the operating mode partitioned fault detection model as a function of at least the one determined operating mode.

6. The system of claim 5 wherein said fault indication means further includes means for processing the parameter estimated data as a function of at least the one selected fault detection submodel for determining the one or more fault indications used for providing the fault classification of determined fault indications by said first selection means selecting at least one of the fault classification submodels from the operating mode partitioned fault classification model as a function of at least the one determined operating mode for providing the fault classification of determined fault indications for performing asset surveillance.

7. The system of claim 1 wherein the fault classification of determined fault indications predicts asset failures.

8. The system of claim 7 wherein the fault classification of determined fault indications predicts specific asset failures including one or more sensor failures.

9. The system of claim 7 wherein the fault classification of determined fault indications predicts specific asset failures including one or more equipment failures.

10. The system of claim 7 wherein the fault classification of determined fault indications predicts specific asset failures including an undesirable process operating condition.

11. The system of claim 1 further including means for performing asset control as a function of the fault classification of determined fault indications.

12. An asset surveillance method, the steps including:
    creating an operating mode partitioned fault classification model comprised of a plurality of fault classification submodels each having an asset operating mode associated thereto
    acquiring a set of observed signal data values from an asset;
    determining at least one fault indication as a function of the observed signal data values;
    determining at least one operating mode of the asset for the set of observed asset signals;
    selecting at least one fault classification submodel from the operating mode partitioned fault classification model as a function of at least the one determined operating mode, and
    using at least the one fault indication and at least the one selected fault classification submodel for classifying faults for performing asset surveillance.

13. The method of claim 12 further including the step of performing asset control as a function of the classified faults.

14. The method of claim 12 further including the step of predicting asset failures as a function of the classified faults.

15. The method of claim 12 further including the step of predicting asset failures including one or more sensor failures.

16. The method of claim 12 further including the step of predicting asset failures including one or more equipment failures.

17. The method of claim 12 further including the step of predicting asset failures including an undesirable process operating condition.

18. An asset surveillance method, the steps including:
    partitioning a decision model into a plurality of partitions, each partition having an operating mode associated thereto:
    employing a plurality of different methods from a plurality of parameter estimation methods, a plurality of fault detection methods, and a plurality of fault classification methods for different partitions;
    determining at least one operating mode of an asset;
    selecting at least one the plurality of partitions as a function of the determined operating mode for tailoring the plurality of parameter estimation methods, the plurality of fault detection methods, and the plurality of fault classification methods for asset surveillance as a function of the at least one determined operating mode.

19. The method of claim 18 further including the step of performing asset control as a function of the classified faults.

20. The method of claim 18 further including the step of predicting asset failures as a function of the classified faults.

21. The method of claim 18 further including the step of predicting asset failures including one or more sensor failures.

22. The method of claim 18 further including the step of predicting asset failures including one or more equipment failures.

23. The method of claim 18 further including the step of predicting asset failures including an undesirable process operating condition.

24. An asset surveillance method, the steps including:
acquiring a set of observed signal data values from an asset;
producing a calculated set of estimated signal data values correlative to the set of observed signal data values acquired from the asset;
comparing the set of observed signal data values to the calculated set of estimated signal data values;
determining a presence of a disagreement between the set of observed signal data values and the calculated set of estimated signal data values on the basis of the comparison step, and
determining a cause of a determined presence of disagreement between the set of observed signal data values and the calculated set of estimated signal data values for performing asset surveillance.

25. The method of claim 24 further including the step of using a Bayesian Belief Network (BBN) fault classification method for determining a cause of a disagreement between the set of observed signal data values and the calculated set of estimated signal data values on the basis of the comparison step.

26. The method of claim 24 further including the step of performing asset control as a function of the classified faults.

27. An asset surveillance method, the steps including: a method for determining asset status includes the steps of:
creating a fault detection model comprised of a plurality of fault detection submodels each having an operating mode associated thereto;
creating a fault classification model comprised of a plurality of fault classification submodels each having an operating mode associated thereto;
acquiring a set of observed signal data values from an asset;
determining at least one operating mode of the asset for the set of observed signal data values;
selecting at least one fault detection submodel from the fault detection model as a function of at least the one determined operating mode;
determining at least one fault indication as a function of the observed signal data values;
selecting at least one fault classification submodel from the fault classification model as a function of at least the one determined operating mode, and
using at least the one fault indication and at least the one selected fault classification submodel for classifying faults for performing asset surveillance.

28. The method of claim 27 further including the step of creating a parameter estimation model comprised of a plurality of parameter estimation submodels each having an operating mode associated thereto.

29. The method of claim 28 further including the step of selecting at least one parameter estimation submodel from the parameter estimation model as a function of at least the one determined operating mode.

30. The method of claim 29 further including the step of calculating a set of estimated signal values from at least one selected parameter estimation submodel.

31. The method of claim 30 wherein the step of determining at least one fault indication as a function of the observed signal data values includes the step of determining at least one fault indication as a function of both the estimated signal values and the observed signal data values.

32. An asset surveillance system, comprising in combination:
a parameter estimation model comprised of a plurality of parameter estimation submodels each having an operating mode associated thereto;
a fault detection model comprised of a plurality of fault detection submodels each having an operating mode associated thereto;
a fault classification model comprised of a plurality of fault classification submodels each having an operating mode associated thereto;
means for acquiring a set of observed signal data values from an asset;
means for determining at least one operating mode of the asset for the set of observed signal data values;
means for selecting at least one parameter estimation submodel from the parameter estimation model as a function of at least the one determined operating mode;
means for calculating a set of estimated signal values from at least one selected parameter estimation submodel;
means for selecting at least one fault detection submodel from the fault classification model as a function of at least the one determined operating mode;
means for determining at least one fault indication as a function of the estimated signal values and observed signal data values;
means for selecting at least one fault classification submodel from the fault classification model as a function of at least the one determined operating mode, and
means for using at least the one fault indication and at least the one selected fault classification submodel for classifying faults for performing asset surveillance.

* * * * *